US012704620B2

(12) United States Patent
Charvat et al.

(10) Patent No.: US 12,704,620 B2
(45) Date of Patent: Aug. 11, 2026

(54) TERAHERTZ SENSORS AND RELATED SYSTEMS AND METHODS

(71) Applicant: TeraDar, Inc., Cambridge, MA (US)

(72) Inventors: Gregory L. Charvat, Guilford, CT (US); Nicholas Saiz, San Jose, CA (US); Matthew Carey, Watertown, MA (US)

(73) Assignee: TeraDar, Inc., Boston, MA (US)

( * ) Notice: Subject to any disclaimer, the term of this patent is extended or adjusted under 35 U.S.C. 154(b) by 44 days.

(21) Appl. No.: 18/804,820

(22) Filed: Aug. 14, 2024

(65) Prior Publication Data

US 2024/0402323 A1 Dec. 5, 2024

Related U.S. Application Data

(63) Continuation of application No. 17/845,266, filed on Jun. 21, 2022, now Pat. No. 12,105,181.

(Continued)

(51) Int. Cl.

*H01Q 1/22* (2006.01)
*G01S 7/06* (2006.01)

(Continued)

(52) U.S. Cl.

CPC .............. *G01S 13/08* (2013.01); *G01S 7/062* (2013.01); *G01S 7/412* (2013.01); *G01S 13/89* (2013.01); *H01Q 1/2283* (2013.01); *H01Q 1/38* (2013.01)

(58) Field of Classification Search

CPC .......... G01S 13/08; G01S 7/062; G01S 7/412; G01S 13/89; G01S 13/44;

(Continued)

(56) References Cited

U.S. PATENT DOCUMENTS 7,284,421 B2 10/2007 Martin
8,836,573 B2 9/2014 Yanagihara et al.

(Continued)

FOREIGN PATENT DOCUMENTS

CN 105118774 A 12/2015
CN 106972232 A 7/2017

(Continued)

OTHER PUBLICATIONS

Invitation to Pay Additional Fees for International Application No. PCT/US2022/034266 mailed Oct. 21, 2022.

(Continued)

*Primary Examiner* — David E Lotter
(74) *Attorney, Agent, or Firm* — Wolf, Greenfield & Sacks, P.C.

(57) ABSTRACT

An active radio-frequency (RF) sensing technology for determining the relative and/or absolute state (e.g., position, velocity, and/or acceleration) of a target object (e.g., a person, a car, a truck a lamp post, a utility pole, a building) is described. The sensors described herein operate in the Terahertz band (300 GHz to 3 THz). An active RF sensing device comprises a substrate and first and second semiconductor dies mounted on the substrate. The first semiconductor die has an RF transmit antenna array integrated thereon, and the transmit antenna array comprises a first plurality of RF antennas configured to generate an RF signals having frequency content in the 300 GHz-3 THz band. The second semiconductor die has an RF receive antenna array integrated thereon, and the receive antenna array comprises a second plurality of RF antennas configured to receive RF signals having frequency content in the 300 GHz-3 THz band.

20 Claims, 58 Drawing Sheets

Related U.S. Application Data

(60) Provisional application No. 63/214,387, filed on Jun. 24, 2021, provisional application No. 63/214,458, filed on Jun. 24, 2021, provisional application No. 63/214,373, filed on Jun. 24, 2021, provisional application No. 63/214,427, filed on Jun. 24, 2021.

(51) Int. Cl.
*G01S 7/41* (2006.01)
*G01S 13/08* (2006.01)
*G01S 13/89* (2006.01)
*H01Q 1/38* (2006.01)

(58) Field of Classification Search
CPC .......... G01S 2013/93271; G01S 7/032; G01S 13/343; G01S 13/345; G01S 13/931; H01Q 1/2283; H01Q 1/38; H01Q 1/3233; H01Q 19/062
See application file for complete search history.

(56) References Cited

U.S. PATENT DOCUMENTS

| | | | |
|---|---|---|---|
| 10,761,187 | B2 | 9/2020 | Santra et al. |
| 10,976,428 | B2 | 4/2021 | Tavassolian et al. |
| 11,249,192 | B2 | 2/2022 | Crouch et al. |
| 11,656,325 | B2 | 5/2023 | Arbabian et al. |
| 11,656,353 | B2 | 5/2023 | Li et al. |
| 11,733,369 | B2 | 8/2023 | Chen et al. |
| 11,953,617 | B2 | 4/2024 | Teague et al. |
| 12,051,206 | B2 | 7/2024 | Chen et al. |
| 12,105,181 | B2 | 10/2024 | Charvat et al. |
| 12,210,086 | B2 | 1/2025 | Shin et al. |
| 12,436,256 | B2 | 10/2025 | Charvat et al. |
| 12,463,322 | B1 | 11/2025 | Wang et al. |
| 2005/0225481 | A1* | 10/2005 | Bonthron ................ G01S 13/08 342/175 |
| 2007/0089502 | A1 | 4/2007 | Martin |
| 2010/0141527 | A1 | 6/2010 | Lalezari |
| 2011/0156100 | A1 | 6/2011 | Chang et al. |
| 2011/0304498 | A1 | 12/2011 | Yanagihara et al. |
| 2012/0132832 | A1 | 5/2012 | Dekorsy et al. |
| 2013/0016003 | A1 | 1/2013 | Stirling-Gallacher et al. |
| 2015/0070207 | A1 | 3/2015 | Millar et al. |
| 2019/0189606 | A1 | 6/2019 | Kamphuis et al. |
| 2019/0317190 | A1 | 10/2019 | Santra et al. |
| 2019/0379119 | A1 | 12/2019 | He et al. |
| 2019/0383926 | A1 | 12/2019 | Crouch et al. |
| 2020/0033445 | A1 | 1/2020 | Raphaeli et al. |
| 2020/0074233 | A1 | 3/2020 | Englard et al. |
| 2020/0074266 | A1 | 3/2020 | Peake et al. |
| 2020/0256947 | A1 | 8/2020 | Motoda |
| 2020/0259240 | A1 | 8/2020 | Moallem |
| 2021/0011121 | A1 | 1/2021 | Arbabian et al. |
| 2021/0026355 | A1 | 1/2021 | Chen et al. |
| 2021/0109209 | A1 | 4/2021 | Li et al. |
| 2021/0255314 | A1 | 8/2021 | Tavassolian et al. |
| 2022/0113394 | A1 | 4/2022 | Shin et al. |
| 2022/0200124 | A1 | 6/2022 | Eastep et al. |
| 2022/0285331 | A1 | 9/2022 | Wang et al. |
| 2022/0308165 | A1 | 9/2022 | Teague et al. |
| 2022/0384299 | A1 | 12/2022 | Gong et al. |
| 2022/0399310 | A1 | 12/2022 | Sharma et al. |
| 2022/0406751 | A1 | 12/2022 | Elsherbini et al. |
| 2022/0413114 | A1 | 12/2022 | Charvat et al. |
| 2022/0413126 | A1 | 12/2022 | Charvat et al. |
| 2022/0413141 | A1 | 12/2022 | Charvat et al. |
| 2023/0143433 | A1 | 5/2023 | Chen et al. |
| 2023/0144266 | A1 | 5/2023 | Mann et al. |
| 2026/0003053 | A1 | 1/2026 | Charvat et al. |

FOREIGN PATENT DOCUMENTS

| | | | |
|---|---|---|---|
| JP | 2019-033366 | A | 2/2019 |
| KR | 20110107493 | A | 10/2011 |
| TW | 202109063 | A | 3/2021 |
| WO | WO 2013/055272 | A1 | 4/2013 |
| WO | WO 2014/035342 | A1 | 3/2014 |
| WO | WO 2021/079361 | A1 | 4/2021 |

OTHER PUBLICATIONS

International Search Report and Written Opinion for International Application No. PCT/US2022/034266 mailed Dec. 13, 2022.
International Preliminary Report on Patentability for International Application No. PCT/US2022/034266 mailed Jan. 4, 2024.
Carrara et al., Spotlight synthetic aperture radar. Signal Processing Algorithms. 1995. 570 pages.
Charvat et al., Time-of-flight microwave camera. Scientific reports. Oct. 5, 2015;5(1):1-6.
Gorham et al., SAR image formation toolbox for MATLAB. Algorithms for Synthetic Aperture Radar Imagery XVII. Proc. of SPIE vol. 7699. Apr. 2010. 14 pages.
Jakowatz et al., Spotlight-mode synthetic aperture radar: a signal processing approach. Springer. 1996. 443 pages.
U.S. Appl. No. 17/845,266, filed Jun. 21, 2022, Charvat et al.
U.S. Appl. No. 17/845,215, filed Jun. 21, 2022, Charvat et al.
U.S. Appl. No. 17/845,264, filed Jun. 21, 2022, Charvat et al.
PCT/US2022/034266, Oct. 21, 2022, Invitation to Pay Additional Fees.
PCT/US2022/034266, Dec. 13, 2022, International Search Report and Written Opinion.
PCT/US2022/034266, Jan. 4, 2024, International Preliminary Report on Patentability.
Extended European Search Report dated Oct. 31, 2025 in connection with European Application No. 25195888.0.
Extended European Search Report dated Feb. 11, 2025 in connection with European Application No. 24210116.0.
Furqan et al., A 120-GHz Wideband FMCW Radar Demonstrator Based on a Fully-Integrated SiGe Transceiver with Antenna-in-Package. IEEE MTT-S International Conference on Microwaves for Intelligent Mobility (ICMIM). May 19, 2016:pp. 1-4.
Jovanovic et al., Realization of Antenna Array at K Band with Tailored Azimuth and Elevation Beamwidths. IEEE 14th International Conference on Advanced Technologies, Systems and Services in Telecommunications (TELSIKS). Oct. 23, 2019:pp. 148-151.

* cited by examiner

| Type of precipitation | Range of $R$ (mm/h) | Intensity |
|---|---|---|
| Drizzle | $R < 0.1$ | Light |
| | $0.1 \leq R < 0.5$ | Moderate |
| | $R \geq 0.5$ | Heavy |
| Rain | $R < 2.5$ | Light |
| | $2.5 \leq R < 10$ | Moderate |
| | $10 \leq R < 50$ | Heavy |
| | $R \geq 50$ | Extreme |

FIG. 2B

| Specification description | System specifications (examples) |
|---|---|
| Range Resolution | 8 mm |
| Angular Resolution | 0.1 degrees |
| Range (Vehicle) (20 Hz) | 200 m (@ 60 dBm/km atmospheric attenuation); 140 m (@ 100 dBm/km atmospheric attenuation); |
| Range (Pedestrian) (20 Hz) | 100 m (@ 60 dBm/km atmospheric attenuation); 80 m (@ 100 dBm/km atmospheric attenuation); |
| Refresh Rate | 2-50 Hz (Dynamic) |
| Form Factor | 7-11 cm wide, 3-7 cm long, 3-7 cm deep |
| Weather | Functional in Rain, Snow, Sleet, Fog or Dust |
| Temperature/Humidity | -40 to +80C Temperature; 0-100% Humidity |
| Glare | No effect |
| Output | 3D Point-cloud with classification, down-selection and diagnostic data |

FIG. 4

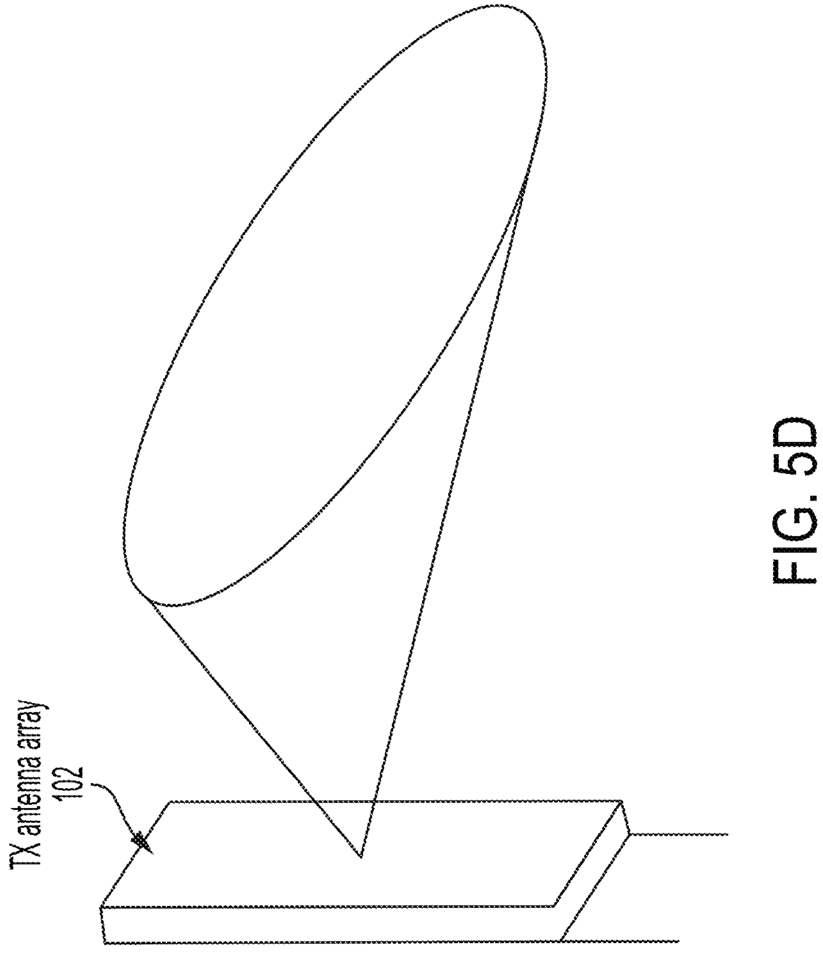
FIG. 5D
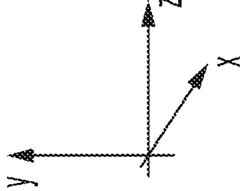

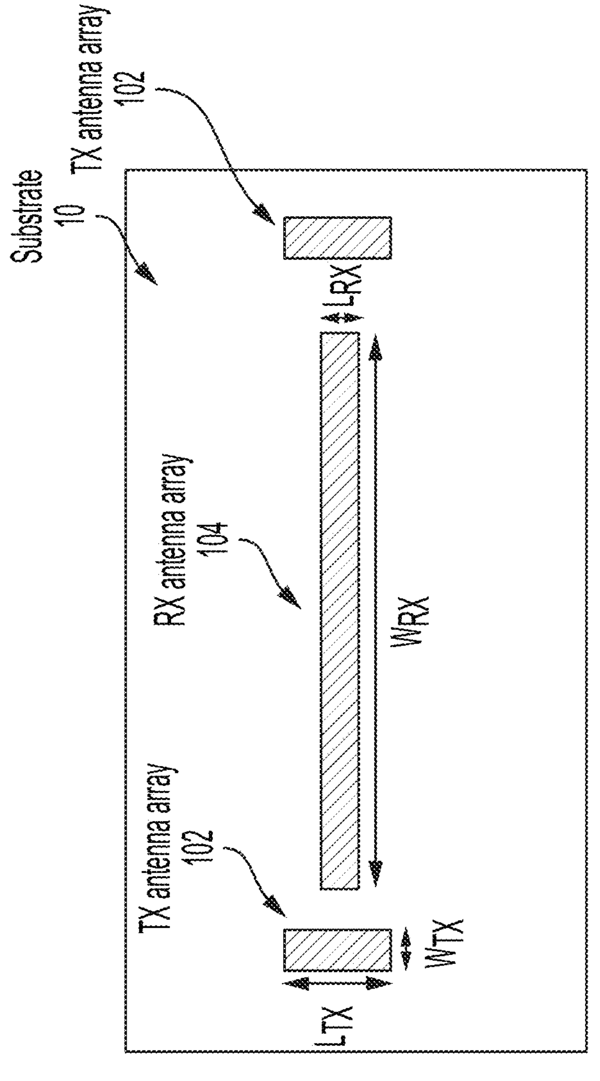
FIG. 5J
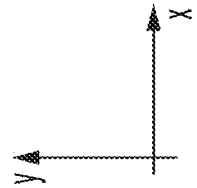

TX antenna array
102
1
2
3
4
5
6
104
RX antenna array

TX antenna array
102
1
2
3
4
5
6
104
RX antenna array

Pulse
Envelope
t

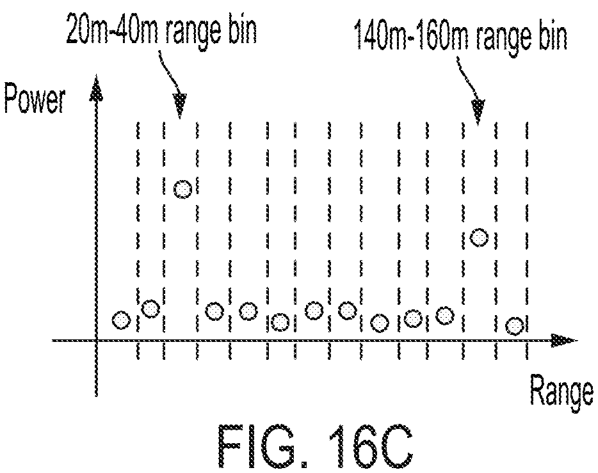
FIG. 16C
Power
Range
FIG. 16D
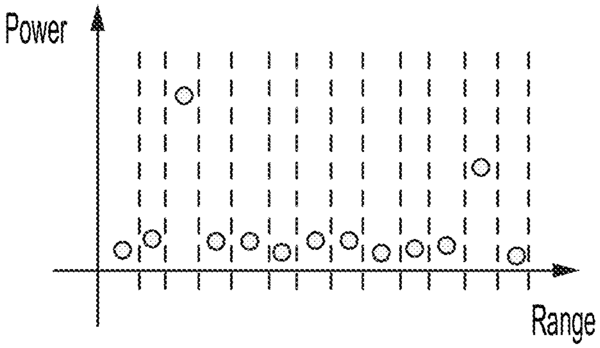
FIG. 16E

TERAHERTZ SENSORS AND RELATED SYSTEMS AND METHODS

CROSS-REFERENCE TO RELATED APPLICATION

This application is a continuation of and claims priority under 35 U.S.C. § 120 to U.S. patent application Ser. No. 17/845,266, entitled "TERAHERTZ SENSORS AND RELATED SYSTEMS AND METHODS," filed on Jun. 21, 2022, which claims the benefit of priority under 35 U.S.C. § 119(e) of U.S. Provisional Patent Application Ser. No. 63/214,373, entitled "TERAHERTZ SENSORS AND RELATED SYSTEMS AND METHODS," filed on Jun. 24, 2021, U.S. Provisional Patent Application Ser. No. 63/214,387, entitled "TERAHERTZ SENSORS AND RELATED SYSTEMS AND METHODS," filed on Jun. 24, 2021, U.S. Provisional Patent Application Ser. No. 63/214,427, entitled "TERAHERTZ SENSORS AND RELATED SYSTEMS AND METHODS," filed on Jun. 24, 2021, and U.S. Provisional Patent Application Ser. No. 63/214,458, entitled "TERAHERTZ SENSORS AND RELATED SYSTEMS AND METHODS," filed on Jun. 24, 2021, each of which is incorporated by reference herein in its entirety.

BACKGROUND

Autonomous vehicles, such as self-driving cars, are vehicles equipped with sensors capable of sensing the surrounding environment, which helps the vehicles move without human intervention. Autonomous vehicles have been under development for decades. It is estimated that vehicles that are autonomous to at least some degree will represent more than half of all vehicles produced by 2024. In recent years, billions have been invested in the pursuit of fully autonomous vehicles. Notwithstanding, the development and deployment of fully autonomous vehicles require significant advances in technology.

SUMMARY

Some embodiments relate to a device comprising a substrate defining a plane extending in first and second directions substantially orthogonal to one another; a first radio-frequency (RF) antenna array mounted on the substrate and having a first aperture, the first aperture having a first width extending in the first direction and a first length extending in the second direction, the first length being larger than the first width; and a second RF antenna array mounted on the substrate and having a second aperture, the second aperture having a second width extending in the first direction and a second length extending in the second direction, the second length being less than the second width. This arrangement allows In some embodiments, the device further comprises RF transmit circuitry coupled to the first RF antenna array and configured to cause the first RF antenna array to transmit first RF signals for determining a distance to a target object; RF receive circuitry coupled to the second RF antenna array and configured to receive second RF signals from the second RF antenna array, the second RF signals generated as a result of the first RF signals being reflected by the target object; and processing circuitry, coupled to the RF receive circuitry, configured to determine a distance between the device and a target object.

In some embodiments, the processing circuitry is further coupled to the RF transmit circuitry.

In some embodiments, the first RF antenna array comprises a first plurality of antennas sized to transmit Terahertz RF signals, wherein the Terahertz RF signals have frequency content in a frequency band of 300 GHz-3 THz, and the second RF antenna array comprises a second plurality of antennas sized to receive Terahertz RF signals.

In some embodiments, the Terahertz RF signals have a bandwidth in the range of 10 GHz-60 GHz.

In some embodiments, the first plurality of antennas comprises between 4 and 128 antennas.

In some embodiments, the second plurality of antennas comprises between 32 and 1024 antennas.

In some embodiments, the device further comprises a first semiconductor die mounted on the substrate, the first semiconductor die comprising the first RF antenna array, wherein the first plurality of antennas is integrated on the first semiconductor die.

In some embodiments, the device further comprises a second semiconductor die mounted on the substrate, the second semiconductor die comprising the second RF antenna array, the second plurality of antennas integrated on the second semiconductor die.

In some embodiments, the device further comprises a first semiconductor die mounted on the substrate, the first semiconductor die comprising the first RF antenna array, the first RF antenna array comprising a first plurality of antennas integrated on the first semiconductor die, the first plurality of antennas sized to transmit Terahertz RF signals having frequency content in the 300 GHz-3 THz frequency band; and a second semiconductor die mounted on the substrate, the second semiconductor die comprising the second RF antenna array, the second RF antenna array comprising a second plurality of antennas integrated on the second semiconductor die, the second plurality of antennas sized to receive Terahertz RF signals having frequency content in the 300 GHz-3 THz frequency band.

In some embodiments, the first semiconductor die further comprises the transmit circuitry and a first redistribution layer coupling the first plurality of antennas to the transmit circuitry.

In some embodiments, the second semiconductor die further comprises the receive circuitry; and a second redistribution layer coupling the second plurality of antennas to the receive circuitry.

In some embodiments, the first semiconductor die comprises a first semiconductor type and the second semiconductor type comprises a second semiconductor type different from the first semiconductor type.

In some embodiments, the first semiconductor die comprises a III-V semiconductor.

In some embodiments, the first semiconductor die comprises indium phosphide.

In some embodiments, the second semiconductor die comprises silicon.

In some embodiments, the first semiconductor die comprises indium phosphide and the second semiconductor die comprises silicon.

In some embodiments, the length of the first aperture is between 5 mm and 5 cm and the width of the first aperture is between 0.1 mm and 5 mm.

In some embodiments, the length of the second aperture is between 0.1 mm and 5 mm and the width of the second aperture is between 1 cm and 18 cm.

In some embodiments, the first RF antenna array has a quasi-linear arrangement.

In some embodiments, the second RF antenna array has a quasi-linear arrangement.

In some embodiments, the first RF antenna array has a linear arrangement.

In some embodiments, the second RF antenna array has a linear arrangement.

In some embodiments, the first RF antenna array comprises a first plurality of antennas sized to transmit RF signals having frequency content in a frequency band of 650-690 GHz, and the first aperture is sized so that the first RF antenna array has an angular field of view in the first direction that is between 50 and 150 in the frequency band of 650-690 GHz.

In some embodiments, the first RF antenna array comprises a first plurality of antennas sized to transmit RF signals having frequency content in a frequency band of 650-690 GHz, and the first aperture is sized so that the first RF antenna array has an angular field of view in the second direction that is between 200 and 900 in the frequency band of 650-690 GHz.

In some embodiments, the device further comprises signal generation circuitry configured to generate reference signals and to provide the reference signals to the first RF antenna array and to the RF receive circuitry.

In some embodiments, the signal generation circuitry comprises a signal generator configured to generate an initial RF signal; and frequency up-conversion circuitry, coupled to the signal generator, configured to generate the reference signal by up-converting the initial RF signal.

In some embodiments, the frequency up-conversion circuitry comprises a plurality of frequency multipliers for up-converting the initial RF signal in stages.

In some embodiments, the device further comprises a first semiconductor die mounted on the substrate, wherein the first semiconductor die comprises the first RF antenna array and at least a portion of the frequency up-conversion circuitry, and wherein the signal generator is mounted on the substrate.

In some embodiments, the signal generator is mounted on the substrate and the frequency up-conversion circuitry is mounted on the substrate.

In some embodiments, the initial RF signal has a time-varying center frequency.

In some embodiments, the time-varying center frequency of the initial RF signal changes linearly over time.

In some embodiments, the time-varying center frequency of the initial RF signal changes non-linearly over time.

Some embodiments relate to a device, comprising a substrate; a first semiconductor die, mounted on the substrate, having a radio-frequency (RF) transmit antenna array integrated thereon; a second semiconductor die, mounted on the substrate, having an RF receive antenna array integrated thereon; and signal generation circuitry at least partially mounted on the substrate, the signal generation circuitry coupled to the first semiconductor die and to the second semiconductor die.

In some embodiments, the signal generation circuitry comprises an oscillator configured to generate a first signal; a signal generator configured to generate a second signal having a time-varying center frequency by frequency modulating the first signal; and frequency-up conversion circuitry configured to generate a third signal by up-converting the second signal.

In some embodiments, the first signal has a center frequency in a range of 1 GHZ-20 GHz, and wherein the frequency up-conversion circuitry is configured to up-convert the second signal by a factor between 30 and 80.

In some embodiments, the time-varying center frequency of the second signal changes linearly over time.

In some embodiments, the time-varying center frequency of the second signal changes non-linearly over time.

In some embodiments, the oscillator and the signal generator are mounted on the substrate and a first portion of the frequency-up conversion circuitry is integrated on the first semiconductor die.

In some embodiments, a second portion of the frequency-up conversion circuitry is mounted on the substrate.

In some embodiments, the frequency-up conversion circuitry comprises a first plurality of frequency multipliers coupled to the RF transmit antenna array, wherein the first plurality of frequency multipliers is configured to up-convert respective input signals by a frequency multiplication factor; and a second plurality of frequency multipliers coupled to the RF receive antenna array, wherein the second plurality of multipliers is configured to up-convert respective input signals by the frequency multiplication factor.

In some embodiments, the first plurality of frequency multipliers is integrated on the first semiconductor die and the second plurality of multipliers is integrated on the second semiconductor die.

In some embodiments, the first and second pluralities of frequency multipliers are mounted on the substrate.

In some embodiments, the signal generation circuitry further comprises a power divider and the frequency up-conversion circuitry comprises a plurality of frequency multipliers, wherein the power divider is configured to provide the second signal to at least some of the plurality of frequency multipliers.

In some embodiments, the frequency multipliers are coupled to respective antennas of the transmit RF antenna array, and wherein the power divider is configured to cause the antennas of the RF transmit antenna array to transmit RF signals in phase with respect to one another.

In some embodiments, the frequency multipliers are coupled to respective antennas of the transmit RF antenna array, and wherein the signal generation circuitry further comprising a plurality of phase shifters configured to cause the antennas of the RF transmit antenna array to transmit RF signals in phase with respect to one another.

In some embodiments, the plurality of frequency multipliers comprises a plurality of harmonic frequency multipliers.

In some embodiments, the RF transmit antenna array comprises a plurality of RF antennas configured to transmit RF signals having frequency content in a frequency band of 300 GHz-3 THz.

Some embodiments relate to a device, comprising a substrate; a first semiconductor die, mounted on the substrate, having a radio-frequency (RF) transmit antenna array integrated thereon, the transmit antenna array comprising a first plurality of RF antennas sized to transmit first RF signals having frequency content in a frequency band of 300 GHz-3 THz; and a second semiconductor die, mounted on the substrate, having an RF receive antenna array integrated thereon, the receive antenna array comprising a second plurality of RF antennas sized to receive second RF signals having frequency content in the frequency band.

In some embodiments, the antennas of the first plurality of RF antennas are sized to transmit the first RF signals having frequency content in a frequency band of 650-690 GHz.

In some embodiments, the device further comprises signal generation circuitry configured to generate reference signals having a frequency bandwidth of 10 GHz-60 GHZ and to provide the signals to the RF transmit antenna array, wherein the RF transmit antenna array is configured to transmit the first RF signals in response to receiving the reference signals from the signal generation circuitry.

In some embodiments, the first RF antenna array has a frequency bandwidth of 10 GHz-60 GHz.

In some embodiments, the first semiconductor die further comprises RF transmit circuitry coupled to the RF transmit antenna array and configured to cause the RF transmit antenna array to transmit the first RF signals; and a redistribution layer coupling the first plurality of RF antennas to the transmit circuitry.

In some embodiments, the device further comprises processing circuitry coupled to the RF receive antenna array and configured to determine a distance between the device and a target object using the second RF signals.

In some embodiments, the processing circuitry is further coupled to the RF transmit antenna array.

In some embodiments, the substrate defines a plane extending in first and second directions substantially orthogonal to one another, and wherein the RF transmit antenna array is configured to transmit the first RF signals in a third direction outside the plane.

In some embodiments, the third direction is substantially perpendicular to the plane.

In some embodiments, the second plurality of RF antennas is arranged to generate differential signals in response to receiving the second RF signals.

In some embodiments, the second semiconductor die further comprises: a plurality of analog-to-digital converters (ADCs) coupled to the second plurality of RF antennas, the plurality of ADCs being configured to digitize third RF signals generated by the second plurality of RF antennas in response to receiving the second RF signals.

In some embodiments, the second semiconductor die further comprises a plurality of sub-harmonic mixers coupled to the second plurality of RF antennas and the plurality of ADCs, the sub-harmonic mixers being configured to generate output signals by mixing the second RF signals with the reference signals generated by the signal generation circuitry and to provide the outputs signals to the plurality of ADCs.

In some embodiments, the plurality of sub-harmonic mixers comprises a plurality of third-harmonic mixers configured to mix the second RF signals with third-harmonics of the plurality of reference signals.

In some embodiments, the plurality of sub-harmonic mixers comprises differential inputs coupled to respective RF antennas of the second plurality of antennas.

In some embodiments, the plurality of sub-harmonic mixers further comprises single-ended inputs configured to receive the reference signals generated by the signal generation circuitry.

In some embodiments, the second semiconductor die further comprises a plurality of down-conversion mixers positioned between the plurality of sub-harmonic mixers and the plurality of ADCs, wherein the down-conversion mixers are configured to mix the output signals with the reference signals generated by the signal generation circuitry.

Some embodiments relate to a device, comprising a substrate; a first semiconductor die of a first semiconductor type, mounted on the substrate, having a radio-frequency (RF) transmit antenna array integrated thereon using a first semiconductor manufacturing process; and a second semiconductor die of a second semiconductor type, mounted on the substrate, having an RF receive antenna array integrated thereon using a second semiconductor manufacturing process different from the first semiconductor manufacturing process.

Some embodiments relate to a device, comprising a substrate; a first semiconductor die of a first semiconductor type, mounted on the substrate, having a radio-frequency (RF) transmit antenna array thereon; and a second semiconductor die of a second semiconductor type, mounted on the substrate, having an RF receive antenna array thereon; wherein the first semiconductor type is different from the second semiconductor type.

In some embodiments, the second semiconductor type is a silicon-based semiconductor type, and the first semiconductor type is not a silicon-based semiconductor type.

In some embodiments, the first semiconductor type is a III-V semiconductor type.

In some embodiments, the first semiconductor type is an indium phosphide (InP) semiconductor type.

In some embodiments, the second manufacturing type is CMOS-compatible.

In some embodiments, the second semiconductor type is a silicon/germanium-based semiconductor type.

In some embodiments, the first semiconductor type has by an electron mobility between 3000 $cm^2V^{-1}s^{-1}$ and 5500 $cm^2V^{-1}s^{-1}$ at 300 K.

In some embodiments, the first semiconductor type has a current gain cutoff frequency ($f_t$) between 0.3 THz and 1 THz.

In some embodiments, the first semiconductor type has a maximum oscillation frequency ($f_{max}$) between 0.7 THz and 1.5 THz.

In some embodiments, the first semiconductor type has a breakdown electric field ($E_{bd}$) between $4\times10^5$ $Vcm^{-1}$ and $6\times10^5$ $Vcm^{-1}$.

In some embodiments, the device further comprises processing circuitry coupled to the RF transmit antenna array and to the RF receive antenna array and configured to determine a distance between the device and a target object.

In some embodiments, the RF transmit antenna array comprises a plurality of RF antennas, and wherein the device further comprises signal generation circuitry configured to generate a first signal and a power divider configured to provide the first signal to the first plurality of RF antennas.

In some embodiments, the power divider is configured to provide the first signal with a same phase to the first plurality of RF antennas.

In some embodiments, the RF transmit antenna array comprises a plurality of antennas, and wherein the device further comprises signal generation circuitry configured to generate a first signal and a plurality of phase shifters configured to provide the first signal with a same phase to the first plurality of RF antennas.

In some embodiments, the RF transmit antenna array is sized to transmit an RF signal in a frequency band of 300 GHz-3 THz.

In some embodiments, the RF transmit antenna array is configured to transmit the RF signal with a power level in a range of 10 dBm-30 dBm in the frequency band.

Some embodiments relate to a device, comprising a substrate; a first semiconductor die, mounted on the substrate, having a radio-frequency (RF) transmit antenna array integrated thereon; a second semiconductor die, mounted on the substrate, having an RF receive antenna array integrated thereon; and a focusing element mounted on the substrate and configured to focus RF signals towards the RF receive antenna array.

In some embodiments, the focusing element is transparent in a frequency band of 300 GHz-3 THz.

In some embodiments, the focusing element is configured to focus, towards the RF receive antenna array, RF signals having frequency content in a frequency band of 300 GHz-3 THz.

In some embodiments, the focusing element at least partially covers the RF receive antenna array and at least partially covers the RF transmit antenna array.

In some embodiments, the focusing element is a first focusing element at least partially covering the RF receive antenna array, and wherein the device further comprises a second focusing element at least partially covering the RF transmit antenna array.

In some embodiments, the focusing element comprises a cylindrical lens having a primary axis extending parallel to a first axis.

In some embodiments, the RF receive antenna array has an aperture having a width extending parallel the first axis and a length extending parallel to a second axis substantially orthogonal to the first axis, the width being larger than the length.

In some embodiments, the focusing element is formed from silicon.

In some embodiments, the focusing element comprises a spherical or elliptical lens.

Some embodiments relate to a device comprising: a substrate, a radio-frequency (RF) transmit antenna array, mounted on the substrate, and configured to transmit a first RF signal having a power level (e.g., effective isotropically radiated power or EIRP) between 10 dBm and 30 dBm, the first RF signal having frequency content in a frequency band of 300 GHZ-3 THz; an RF receive antenna array, mounted on the substrate, and configured to receive a second RF signal resulting from reflection of the first RF signal from a target object; and processing circuitry coupled to the RF transmit antenna array and to the RF receive antenna array, the processing circuitry being configured to determine the distance of the target object relative to the device using the second RF signal, wherein the processing circuitry has a noise figure (NF) between 10 dB and 40 dB.

In some embodiments, the RF transmit array has a frequency bandwidth of 15 GHZ-25 GHz and a range resolution between 6 mm and 10 mm.

In some embodiments, the RF transmit antenna array has an aperture between 1 $cm^2$ and 5 $cm^2$ and an angular resolution between 0.4° and 1° in the frequency band.

In some embodiments, the substrate has an area between 10 $cm^2$ and 60 $cm^2$.

In some embodiments, the processing circuitry is configured to update the determination of the distance at a refresh rate between 0.1 Hz and 100 Hz.

In some embodiments, the device further comprises a first semiconductor die mounted on the substrate, the first semiconductor die comprising the RF transmit antenna array, the RF transmit antenna array comprising a first plurality of antennas integrated on the first semiconductor die.

In some embodiments, the device further comprises a second semiconductor die mounted on the substrate, the second semiconductor die comprising the RF receive antenna array, the RF receive antenna array comprising a second plurality of antennas integrated on the second semiconductor die.

In some embodiments, the device further comprises a first semiconductor die mounted on the substrate, the first semiconductor die comprising the RF transmit antenna array, the RF transmit antenna array comprising a first plurality of antennas integrated on the first semiconductor die; and a second semiconductor die mounted on the substrate, the second semiconductor die comprising the RF receive antenna array, the RF receive antenna array comprising a second plurality of antennas integrated on the second semiconductor die.

In some embodiments, the first semiconductor die comprises indium phosphide and the second semiconductor die comprises silicon.

In some embodiments, the RF transmit antenna array comprises a first linear antenna array.

In some embodiments, the first linear antenna array comprises between 4 and 128 antennas.

In some embodiments, the RF receive antenna array comprises a second linear antenna array.

In some embodiments, the second linear antenna array comprises between 64 and 1024 antennas.

In some embodiments, the RF transmit antenna array comprises a plurality of transmit antennas, each transmit antenna being configured to transmit electromagnetic energy having a power level between 1 dBm and 2 dBm in the frequency band.

In some embodiments, the device further comprises a focusing element mounted on the substrate and configured to focus a portion of the second RF signal to the RF receive antenna array.

Some embodiments relate to a method of imaging a target object using a device comprising a radio-frequency (RF) transmit antenna array and an RF receive antenna array, the RF transmit antenna array having a first plurality of transmit antennas and a second plurality of transmits antennas. The method may comprise transmitting, using the first plurality of antennas, a first RF signal having frequency content in a frequency band of 300 GHz-3 THz; transmitting, using the second plurality of antennas, a second RF signal having frequency content in the frequency band; generating a first image at least in part by receiving, using the RF receive antenna array, a third RF signal produced by reflection of the first RF signal from the target object; generating a second image at least in part by receiving, using the receive antenna array, a fourth RF signal produced by reflection of the second RF signal from the target object; and determining a state of the target object using the first and second images.

In some embodiments, the first RF signal has frequency content in a frequency band of 650 GHz-690 GHz.

In some embodiments, transmitting the second RF signal is performed subsequent to transmitting the first RF signal.

In some embodiments, generating the first image comprises determining a phase of the third RF signal; generating the second image comprises determining a phase of the fourth RF signal; and determining the state of the target object comprises determining a difference between the phase of the third RF signal and the phase of the fourth RF signal.

In some embodiments, the transmit antenna array is oriented in a first direction and the receive antenna array in oriented in a second direction perpendicular to the first direction.

In some embodiments, determining a state of the target object comprises determining a position of the target object relative to the device.

BRIEF DESCRIPTION OF DRAWINGS

Various aspects and embodiments will be described with reference to the following figures. It should be appreciated that the figures are not necessarily drawn to scale.

FIG. 2B is a table that relates the type and intensity of precipitation to the rain rate (R).

FIG. 4 is a table illustrating example system specifications, in accordance with some embodiments of the technology described herein.

FIG. 5D is a perspective view of a transmit antenna array, in accordance with some embodiments of the technology described herein.

FIG. 5E-2 is a top view of a substrate including a transmit antenna array and a receive antenna array, in accordance with some embodiments of the technology described herein.

FIG. 5J is a cross sectional view of another transmitter antenna die including a pair of TX antenna arrays, in accordance with some embodiments of the technology described herein.

FIGS. 16C-16E are plots illustrating the power of received signals as a function of range, in accordance with some embodiments of the technology described herein.

DETAILED DESCRIPTION

I. Terahertz-Based Active Sensing

Figure 1A:
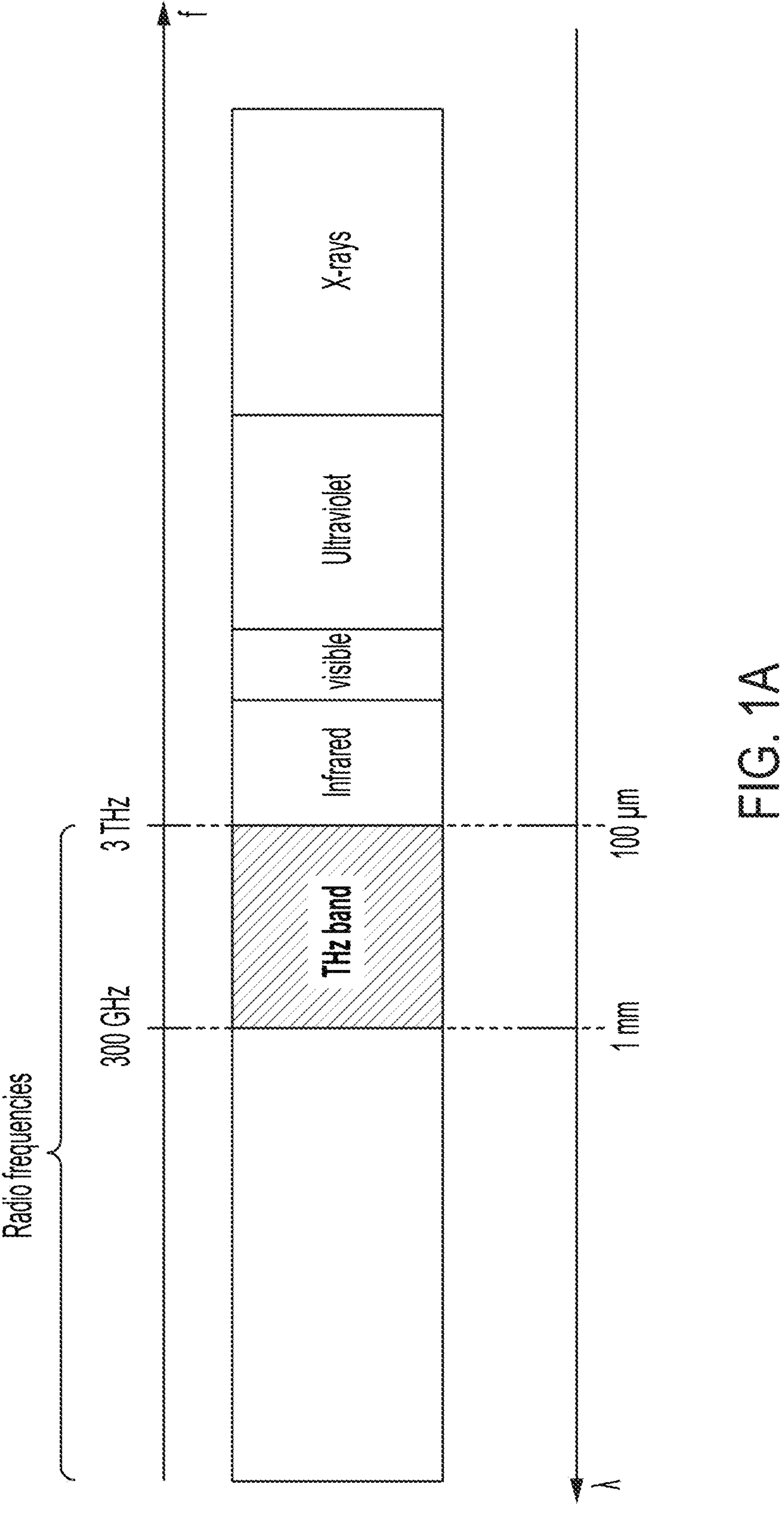
FIG. 1A is a diagram illustrating the location of the Terahertz band along the electromagnetic spectrum.

The inventors have developed an active radio-frequency (RF) sensing technology, operating in the Terahertz band, for determining the relative and/or absolute state (e.g., position, velocity, and/or acceleration) of a target object (e.g., a static target object such as street furniture, a lamp post, a utility pole, a building, or a dynamic target object such as a person, a car, a truck, etc.). The terms "radio-frequency" and "RF" are used herein to refer to electromagnetic signals having frequency content in the 0-3 THz band. The term "Terahertz" is used herein to refer to radio-frequency signals having frequency content in the 300 GHz-3 THz band (including the end points). This is illustrated in FIG. 1A.

The RF technology developed by the inventors includes novel RF sensors, signal processing architectures, algorithms, and software. The RF technology developed by the inventors and described herein may be used in a variety of applications. For example, the RF technology may be used in the context of autonomous vehicles, such as autonomous cars, for determining the relative and/or absolute state of one or more target objects in the surrounding environment of the autonomous vehicle (e.g., the relative and/or absolute state of one or more cars, people or other objects within a threshold distance of the autonomous vehicle). However, the technology described herein may be used in connection with any type of vehicle, including for example land-based vehicles (e.g., cars, trucks, bicycles, motor bicycles and other wheel-based vehicles, and trains and other rail-based vehicles), air-based vehicles (e.g., airplanes, helicopters, drones, etc.), space-based vehicles (e.g., satellites, space vessels, etc.), water-based vehicles (ships, boats, barges, etc.) and any other types of vessels configured to carry a load (e.g., people, animals, plants, equipment, materials, etc.).

Figure 1B:
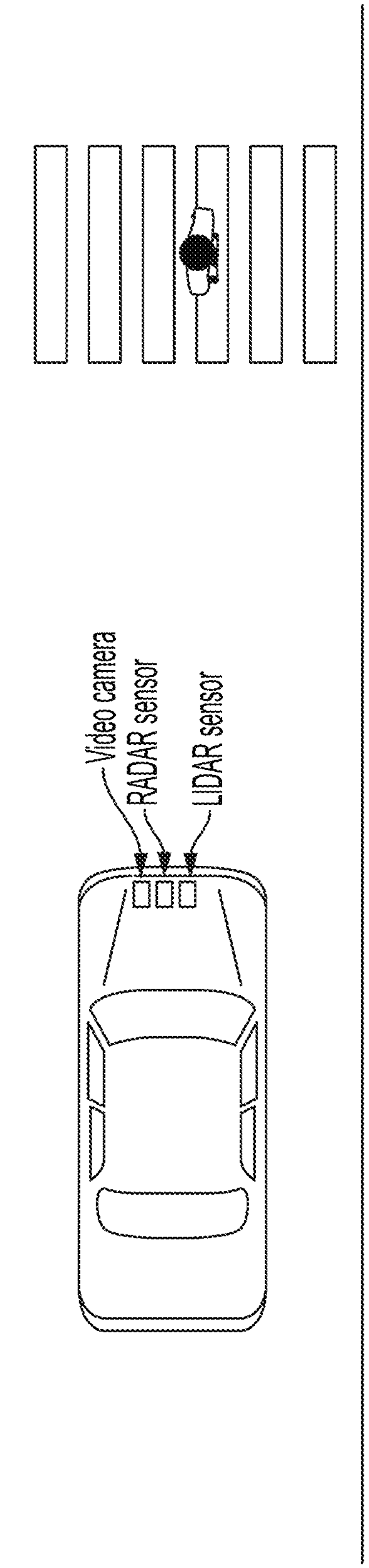
FIG. 1B is a schematic diagram illustrating an autonomous vehicle including different types of sensors.

Building reliable sensing capabilities for autonomous vehicles has been a major challenge for decades. Unfortunately, engineers have not identified a single type of sensor capable of effectively monitoring the surrounding environment in all conditions (e.g., rain, snow, fog, night, dense environments, etc.). As a result, the conventional approach is to equip vehicles with multiple types of sensors rather than relying on a single type of sensor. For example, as shown in FIG. 1B, a vehicle may be equipped with optical sensors (e.g., video cameras, infrared cameras), radio-frequency sensors (e.g., RADAR sensors), and LIDAR sensors. This approach is based on the idea that having a diverse set of sensors provides better coverage than what any sensor can provide individually, as each sensor has advantages and disadvantages.

Optical sensors, for example, allow vehicles to maintain a 360° view of the external environment. Significant progress has been made in recent years in camera-related technologies, with ever-increasing resolutions being available at lower prices than previously possible. With the aid of sophisticated post-processing techniques, often involving machine learning, optical sensors can detect and identify objects in the vicinity of a vehicle. The ability of an optical sensor to distinguish colors improves the camera's ability to distinguish dangerous situations from less risky circumstances. For example, a camera can easily identify other vehicles, pedestrians, cyclists, traffic signs and signals, guardrails, etc. Unfortunately, optical sensors are still far from being perfect. First, poor weather conditions (e.g., darkness, rain, snow, fog) significantly reduce image quality, which significantly degrades the optical sensor's ability to detect target objects in the roadway. Image quality is also degraded when there is low contrast among objects or when objects blend in with the background (e.g., during particularly sunny days). Second, cameras generate inherently two-dimensional data, with depth or distance information not being measured directly. Instead, depth or distance information can be obtained only after further signal processing is performed on the collected image and/or video data, which can be computationally demanding.

RADAR (radio detection and ranging) sensors are active detection sensors that use radio frequency signals to determine the relative and/or absolute state (e.g., position, velocity, and/or acceleration) of a target object. A RADAR sensor has at least one transmitter that emits RF signals toward one or more objects and at least one receiver that detects any RF signals reflected by the object(s). The detected RF signals are processed to determine absolute and/or relative (e.g., to the RADAR sensor) position, velocity, acceleration of the object(s). Unlike optical sensors, RADAR sensors are less susceptible to poor weather conditions and directly detect depth or distance information.

Conventional RADAR sensors used in autonomous vehicles operate in the millimeter wave band (i.e., 30 GHz-300 GHz), or at even lower frequencies. For example, one conventional RADAR sensor operates in the 76 GHZ-81 GHz frequency band. Because of the (relatively long) wavelengths implied by operating in this frequency range, conventional RADAR sensors have limited spatial (e.g., range and angular) resolution. Indeed, conventional RADAR sensors used in the automotive context have range resolutions on the order of several centimeters and horizontal angular resolutions of about 10° to 20°. As a result, while conventional RADAR sensors can identify the presence of some target object, they cannot reliably identify the nature or shape of the target object. For example, such a conventional RADAR sensor may be unable to distinguish a pedestrian from a vehicle or a road signal. An angular resolution of about 1° or less is necessary to distinguish the types of target objects typically encountered on roads.

LIDAR (light detection and ranging) sensors operate similarly to RADAR sensors, but at optical frequencies (e.g., in the infrared or visible portions of the electromagnetic spectrum) rather than radio frequencies. The location of an object is determined by transmitting a laser beam and by measuring the time taken for the reflected beam to hit the receiver. Because light has wavelengths that are substantially shorter than the wavelengths at which conventional automotive RADAR sensors operate, LIDAR sensors have finer spatial resolutions.

However, LIDAR sensors also have a number of drawbacks. First, they are significantly more susceptible to rain that RADAR sensors. This is because the size of rain droplets is comparable to the wavelength at which LIDAR sensors operate. In heavy rain, light emitted from the transmitter is scattered by rain droplets, which leads to unwanted echoes. Second, LIDAR sensors are susceptible to sunlight, which leads to detector saturation that, in turn, reduces a LIDAR sensor's ability to detect objects. Thus, LIDAR sensors work better at night.

The inventors have recognized that the conventional approach of using a combination of different types of sensors (e.g., cameras, millimeter wave RADAR sensors, LIDAR sensors) offers limited performance at a very high cost. Combining millimeter-wave RADAR data with LIDAR data is computationally demanding (and as a result, costly), especially because such computations must be performed in real time. Typically, millimeter-wave RADAR data and LIDAR data are combined using sensor fusion algorithms (e.g., iterative state space algorithms such as Kalman filters, extended Kalman filters, particle filters, etc.) that can leverage the benefits of each these technologies to produce meaningful information about the dynamic properties of a target object, such as velocity, angle, and location. Unfortunately, the computational complexity necessary to run fusion algorithms can be prohibitively high, primarily due to their non-linear and iterative nature. As a result, vehicles must be equipped not only with multiple types of sensors, which is expensive in its own right, but also with powerful computers to fuse their measurements, which increases cost further so as to become impractical. Alternatively, using only some of these conventional sensors and/or a less computationally demanding fusion algorithm, results in coverage gaps (e.g., in conditions when the deployed sensors are insufficient or when the computational complexity of fusion algorithms is so high that the refresh rate for updates is too low).

Accordingly, the inventors have developed a new sensing technology for automotive and other autonomous vehicle applications that addresses the above-described shortcomings of conventional sensors and sensor fusion techniques. In particular, the inventors have developed novel RADAR sensors operating in the Terahertz band, which allows the sensors to combine some of the advantages of RADAR and LIDAR sensors (because THz radiation behaves in part similarly to millimeter wave RF signals and in part similarly to infrared light) while avoiding the need to employ computationally expensive fusion algorithms. The sensing technology developed by the inventors can be deployed on vehicles (e.g., cars, whether or not autonomous) to aid with safety and operation and, in some embodiments, may replace conventional RADAR and the LIDAR sensors altogether. It should be noted, however, that, in some embodiments, the sensing technology developed by the inventors may be used in conjunction with one or more conventional sensors (e.g., cameras, RADAR, LIDAR, etc.), as aspects of the technology described herein are not limited in this respect.

Moreover, the sensing technology developed by the inventors improves upon conventional RADAR and LIDAR sensors. For example, because the sensing technology developed by the inventors operates in the Terahertz band, it achieves a spatial resolution that is significantly better than what is possible with conventional RADAR sensors. For example, the sensing technology developed by the inventors achieves range resolutions on the order of 6 mm to 10 mm, and angular resolutions on the order of 0.4° to 1°. This means that these systems can distinguish objects separated along the propagation axis by distances as short as 8 mm, for example, or angularly separated by 0.6°, for example (although in some embodiments the angular resolution may be as low as 0.1°). As described herein, conventional RADAR sensors can only achieve range resolutions on the order of several centimeters and angular resolutions of about 10° to 20°, which is insufficient for automotive and other applications.

Figure 2A:
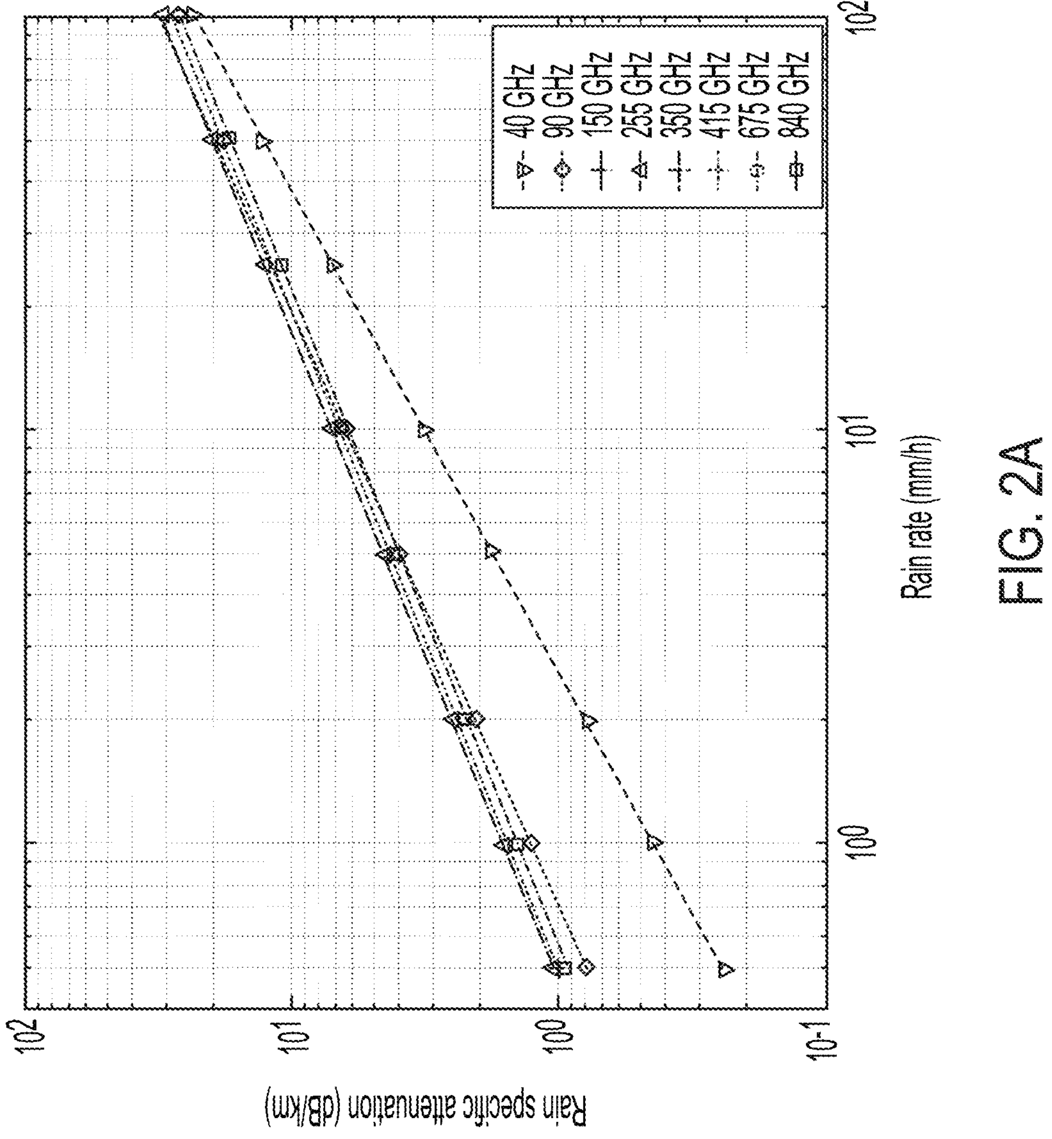
FIG. 2A is a plot illustrating radio-frequency (RF) attenuation as a function of rain rate at different frequencies.

As another example, the sensing technology developed by the inventors is less susceptible than LIDAR sensors to scattering due to rain because Terahertz signals have longer wavelengths relative to infrared signals. Although Terahertz signals are generally more susceptible than millimeter waves to rain, Terahertz signals are less sensitive to variations in rain rate. FIG. 2A is a plot illustrating rain specific attenuation as a function of the rain rate for various frequencies. At lower frequencies, the attenuation tends to be lower, but the slope of the curve tends to be higher. For example, at 40 GHZ, an increase in rain rate from 1 mm/h to 100 mm/h results in an increase in attenuation from 0.3 dB/km to 25 dB/km—a variation that spans almost two orders of magnitude. Thus, the performance of a sensing system operating at 40 GHz can vary substantially from the beginning through the end of a precipitation. Instead, at 840 GHz, the attenuation increases from 1 dB/km at 1 mm/h to 30 dB/km at 100 mm/h—a variation that spans just a little over one order of magnitude. Therefore, the performance of a sensing system operating at 840 GHz is more predictable throughout the duration of a precipitation. FIG. 2B is a table that relates the type and intensity of precipitation to the rain rate (R). Drizzles are considered light at rates less than 0.1 mm/h, moderate at rates between 0.1 mm/h and 0.5 mm/h, and heavy at rates greater than 0.5 mm/h. Rain is considered light at rates less than 2.5 mm/h, moderate at rates between 2.5 mm/h and 10 mm/h, heavy at rates between 10 mm/h and 50 mm/h, and extreme at rates greater than 50 mm/h.

Figure 2C:
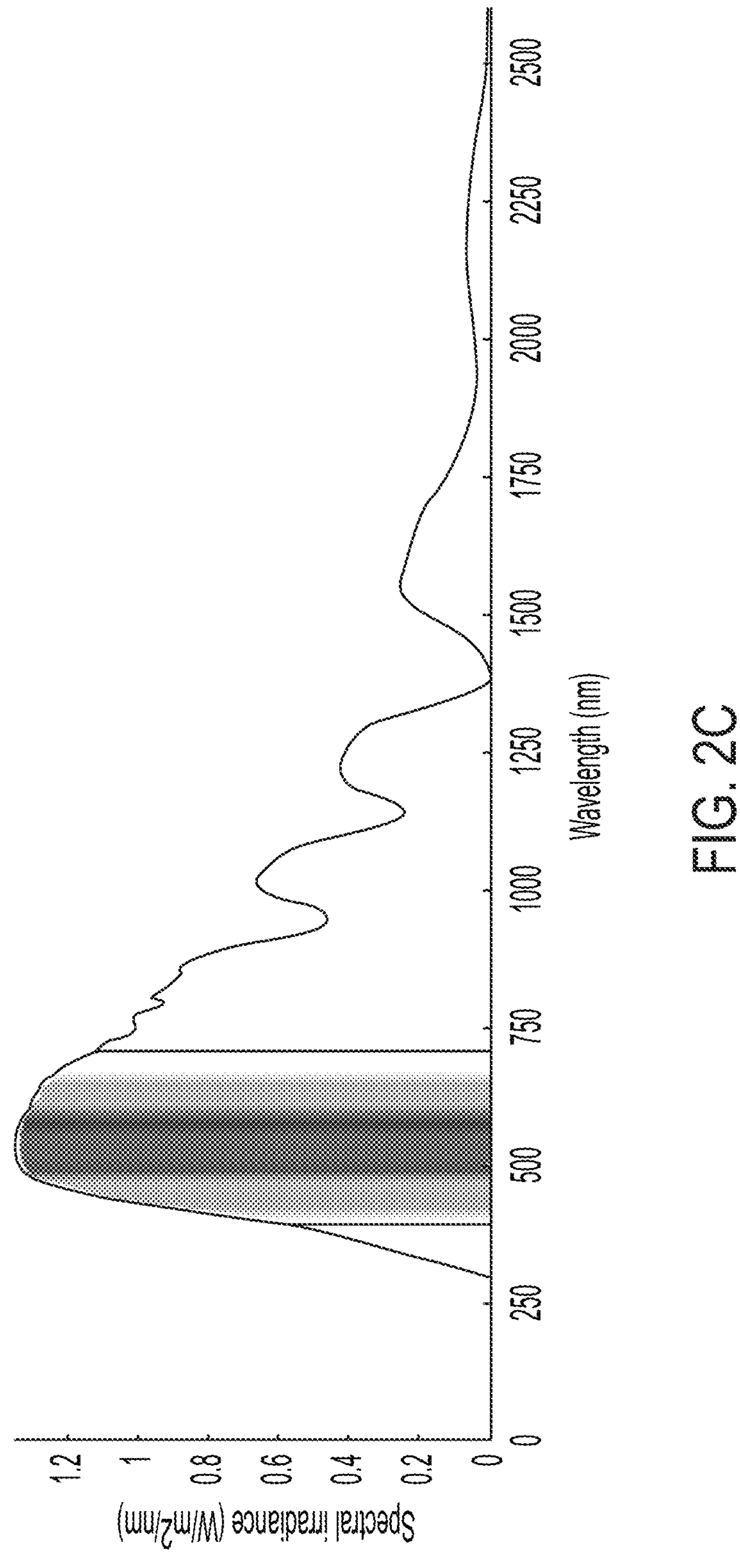
FIG. 2C is a plot illustrating a solar spectral irradiance.

As yet another example, Terahertz-based active sensing systems are less susceptible than LIDAR sensors to sunlight. FIG. 2C is a plot illustrating an example of a solar spectral irradiance as a function of wavelength. As shown in the figure, the vast majority of the solar energy is concentrated in the visible and infrared regions, from about 300 nm to about 2000 nm. This is why LIDAR sensors that operate in this region are particularly susceptible to sunlight. By contrast, Terahertz signals, having wavelengths between 100 μm and 1 mm, are virtually immune to sunlight.

The Terahertz-based active sensing systems described herein may be used in autonomous vehicles as well as in other contexts.

Applications across a variety of industries have been forced to rely on traditional sensors (cameras, LIDAR, and conventional RADAR) despite increasing requirements for advanced autonomy, safety and capability. While functional, these traditional sensors have several problems, as described herein. To enable the next generation of products, new capability is needed to correctly perceive the surrounding environment. The technology described herein unlocks a variety of new applications including new types of medical imaging (e.g., cancer detection and non-ionizing dental imaging prior to treatment). Security applications can also be enhanced by the new types of perception, detecting objections like guns or knives, while preserving privacy of the individual. The technology described herein extends to providing robust perception of autonomous platforms, including any of the vehicles described herein, regardless of the weather, temperature, dust, or lighting. This robustness unlocks true autonomy in a comprehensive, safe manner in a variety of environments.

Other uses are also possible.

Despite the advantages described herein, the inventors have recognized that developing Terahertz-based active sensing systems presents its own challenges, as described below.

II. Atmospheric Attenuation

Figure 3A:
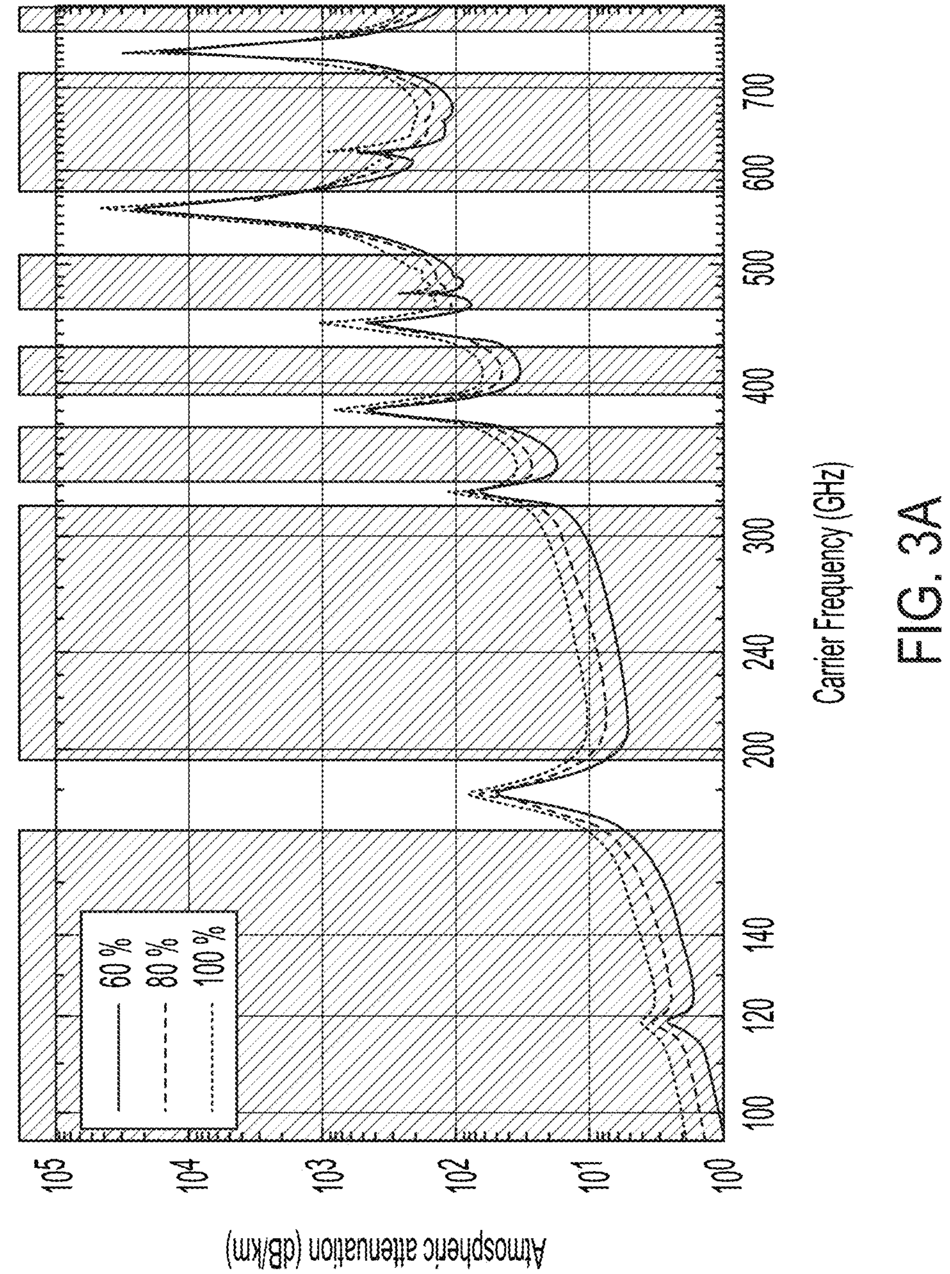
FIG. 3A is a plot illustrating RF atmospheric attenuation as a function of the carrier frequency.

First, Terahertz signals are more susceptible to atmospheric attenuation than millimeter waves or infrared light. Terahertz signals undergo absorption by water vapor and oxygen molecules in the atmosphere. For this reason, atmospheric attenuation degrades with increasing humidity. FIG. 3A is a plot illustrating how atmospheric attenuation varies as a function of frequency at a humidity of 60%, 80% and 100%, respectively. At 100 GHZ, the atmospheric attenuation is well below 3 dB/km, regardless of the humidity. At 300 GHz, the atmospheric attenuation is between 10 dB/km and 40 dB/km. At 700 GHz, the atmospheric attenuation is above 100 dB/km.

Atmospheric attenuation poses a major challenge. By the time an RF signal travels from a transmitter to a target object, and upon reflection, from the target object to the receiver, the power level of the RF signal is attenuated near or below the receiver's noise floor. Therefore, the receiver's ability distinguish RF signals from noise is significantly impaired.

Figure 3B:
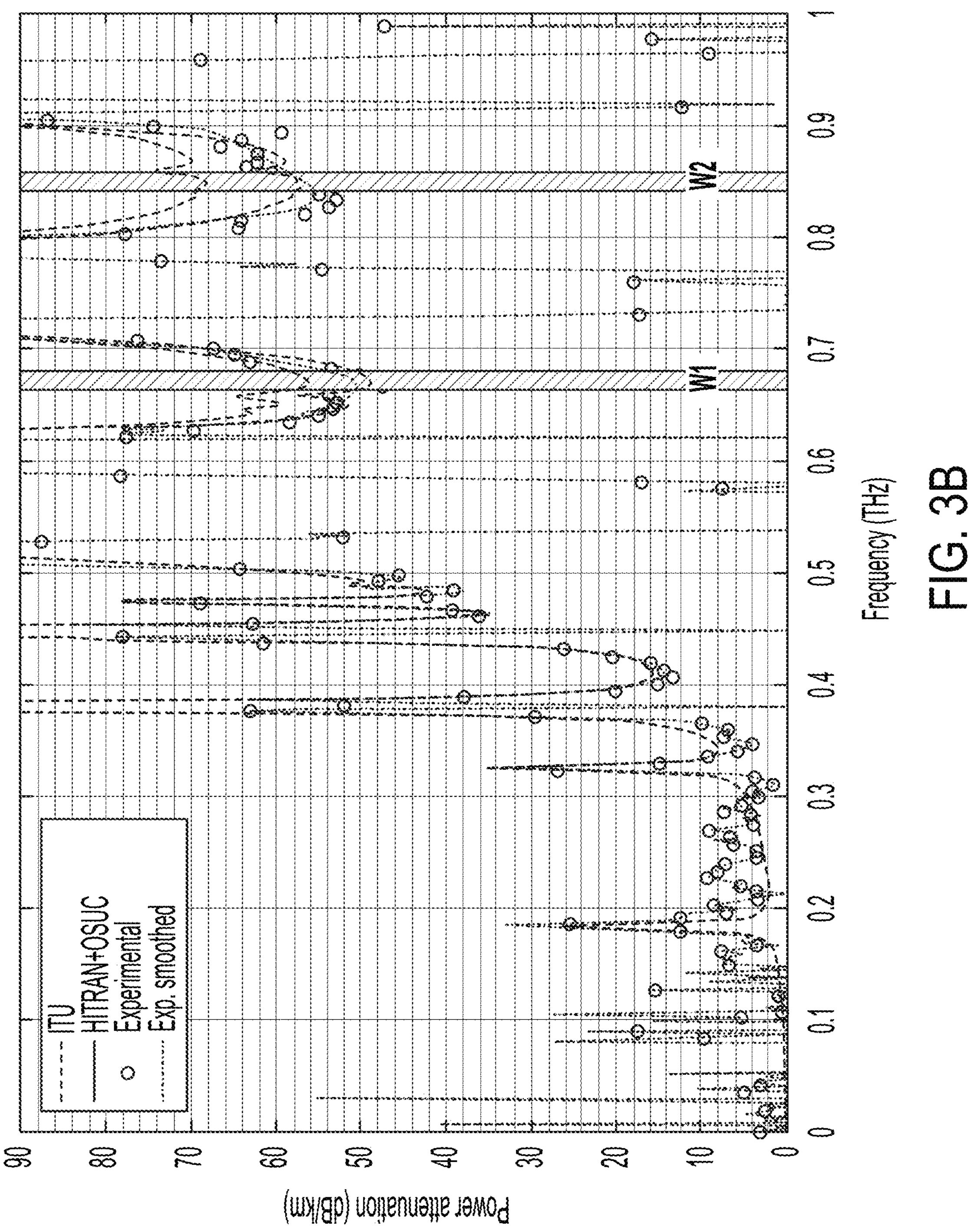
FIG. 3B is a plot illustrating Terahertz sub-bands suitable to perform ranging, in accordance with some embodiments of the technology described herein.

The inventors have identified several solutions to mitigate the effects of atmospheric attenuation. The solutions described herein may be used individually or in combination. One solution stems from the inventors' appreciation that the atmospheric attenuation exhibits local attenuation minima. FIG. 3B is another plot illustrating the atmospheric attenuation as a function of frequency. Again, attenuation can be quite severe, as high as 1000 dB/km in some bands. Notwithstanding, some frequency bands exhibit local minima. For example, the atmospheric attenuation drops substantially in the frequency bands near 425 GHZ, 670 GHZ, and 850 GHz. Recognizing this behavior, active sensing systems according to some embodiments are designed to operate in one or more of these frequency bands in which the atmospheric attenuation exhibits local minima.

Another solution to mitigate the effects of atmospheric attenuation involves transmitting RF signals with high power levels. Transmitting RF signals with high power levels allows a receiver to receive enough energy to operate above the noise floor and to produce acceptable signal-to-noise ratios (SNR) despite the presence of atmospheric attenuation. As an example, transmitters according to some embodiments are designed to emit power levels in excess of 10 dBm in the Terahertz band. Unfortunately, transmitting such power levels at such high frequencies is anything but straightforward. Conventional silicon-based high-frequency electronic amplifiers are ill-suited for this task as they can operate at frequencies of a few tens of Gigahertz at most. In some embodiments, high power transmission can be achieved using semiconductors having large current-gain cutoff frequency and/or a large maximum oscillation frequency.

Semiconductor materials can be described with reference to, among other parameters, the so-called "current-gain cutoff frequency" ($f_t$), and by the so-called "maximum oscillation frequency" ($f_{max}$). These parameters quantify the practical frequency upper bound for useful circuit operation. In some embodiments, active sensing systems use transmitters having dies made of (or at least comprising) semiconductor materials with a current-gain cutoff frequency in excess of 0.3 THz, 0.5 THz, or 0.7 THz, for example. In some embodiments, active sensing systems use transmitters having dies made of (or at least comprising) semiconductor materials with a maximum oscillation frequency in excess of 0.5 THz, 0.7 THz, or 0.9 THz, for example. Indium phosphide (InP) has among the highest current-gain cutoff frequencies and the highest maximum oscillation frequencies among all semiconductor materials. In some embodiments, InP has a current-gain cutoff frequency as high as 1 THz and a maximum oscillation frequency as high as 1.5 THz. Accordingly, some embodiments include InP-based transmitters (though other materials are also possible, as described herein). Transmitters of these types can produce power levels in excess of 10 dBm using relatively small areas (e.g., less than 1 $cm^2$)

Another solution to mitigate the effects atmospheric attenuation involves focal plane arrays designed to increase (e.g., maximize) the amount of energy collected from the reflected radiation. One way to increase the amount of collected energy is to use very large antenna arrays. The larger the antenna array, the larger the energy that the array can collect. Unfortunately, the semiconductor materials used in some embodiments for the transmit circuitry (e.g., InP) may be ill-suited to be used for the receive circuitry because it may not be possible to fabricate very large dies from these materials. Due to the poor mechanical properties of InP, manufacturing large InP dies is generally not feasible. In fact, InP tends to shatter when fabricated in large areas. However, there are other semiconductor materials that are more resilient and therefore allow for substantially larger die areas. Silicon is one of these materials.

Recognizing the aforementioned challenges, the inventors have developed hybrid transceivers, i.e., transceivers in which the transmitter die comprises one semiconductor material (e.g., InP) and the receiver die comprises another semiconductor material (e.g., Si). For example, the transmitter die may be InP-based (such that the die substrate is made of InP and/or the transistors are made of InP). The receiver die may be silicon-based (such that the die substrate is made of silicon or silicon/germanium and/or the transistors are made of silicon or silicon/germanium). This dual semi-conductor material approach enables high-power transmitters on one hand, and large-area receive antennas on the other.

Accordingly, some embodiments relate to a device comprising a substrate, a first semiconductor die of a first semiconductor type (e.g., InP), mounted on the substrate, having an RF transmit antenna array integrated thereon using a first semiconductor manufacturing process; and a second semiconductor die of a second semiconductor type (e.g., Si), mounted on the substrate, having an RF receive antenna array integrated thereon using a second semiconductor manufacturing process different from the first semiconductor manufacturing process.

To further increase the energy collected by a receiver, some embodiments use focusing elements. Focusing elements enable the receiver to collect energy that would otherwise be lost. Focusing elements that may be used in some embodiments include cylindrical and spherical lenses, where the lens is made of a material that is transparent in the Terahertz band.

Accordingly, some embodiments relate to a device, comprising a substrate, a first semiconductor die, mounted on the substrate, having an RF transmit antenna array integrated thereon, a second semiconductor die, mounted on the substrate, having an RF receive antenna array integrated thereon, and a focusing element mounted on the substrate and configured to focus RF signals towards the RF receive antenna array. In some embodiments, the focusing element is transparent in a frequency band of 300 GHz-3 THz. In some embodiments, the focusing element is configured to focus, towards the RF receive antenna array, RF signals having frequency content in a frequency band of 300 GHZ-3 THz. In some embodiments, the focusing element at least partially covers the RF receive antenna array and at least partially covers the RF transmit antenna array. In some embodiments, the focusing element is a first focusing element at least partially covering the RF receive antenna array, and wherein the device further comprises a second focusing element at least partially covering the RF transmit antenna array. In some embodiments, the focusing element comprises a cylindrical lens having a primary axis extending parallel a first axis. In some embodiments, the RF receive antenna array has an aperture having a width extending parallel the first axis and a length extending parallel a second axis substantially orthogonal to the first axis, the width being larger than the length. A second axis is substantially orthogonal (or perpendicular) to a first axis if the angle between the two axes is between 80 degrees and 100 degrees. In some embodiments, the focusing element is formed from silicon. In some embodiments, the focusing element comprises a spherical or elliptical lens.

III. Status of Terahertz Technologies

Another challenge owes to the fact that Terahertz technologies are still in their infancy. To date, there are no practical technologies for the generation and detection of Terahertz radiation. At these frequencies, in fact, technologies for power generation and detection are extremely inefficient. This problem is what scientists generally refer to as "the Terahertz gap." There is a gap between the more mature millimeter wave technologies on the RF side of the spectrum and the well-developed photonic technologies on the infrared side of the spectrum. For this reason, use of the Terahertz band has been limited to very specialized applications, such as submillimeter astronomy. Scientists have tried to bridge the gap for decades. Some devices conventionally used in microwave generation, including vacuum electronic devices, could at least in theory be altered to operate in the Terahertz band. However, most of these devices are still in the prototype form and are not sufficiently reliable to meet the demands of commercial applications.

To obviate the lack of suitable Terahertz generators and detectors, the inventors have developed THz-based sensing systems in which the generation and detection of signals is performed at much lower frequencies. In some embodiments, a signal generator generates a reference signal frequency content in a low-frequency band, and a frequency up-conversion circuit translates the frequency content of the reference signal to the Terahertz band. An antenna transmits the up-converted signal, which, upon reflection from a target object, is received by another antenna. The frequency content of the received signal is down-converted to a lower-frequency band, where it is detected and further processed.

In one example, on the transmitter side, a signal generator outputs a reference signal oscillating at 18.61 GHZ, and a frequency up-conversion circuit up-converts the frequency content of the reference signal to 670 GHz (i.e., with approximately a x36 frequency multiplication factor). On the receiver side, the frequency content of the reference signal is down-converted from 670 GHz back to 18.61 GHz or lower frequencies.

Designing antennas capable of emitting and receiving in the Terahertz band poses its own challenges. Ultimately, the size of an antenna is dictated by the target wavelength. The higher the target frequency (and the lower the target wavelength), the smaller the antenna. As an example, the area of some antennas is approximately on the order of $\lambda^2$, where $\lambda$ is the wavelength associated with the signal center frequency. At 1 THz, for example, the area of the antenna should be on the order of 90,000 $\mu m^2$. Unfortunately, conventional printed circuit board (PCB) based antenna manufacturing techniques may not be able to achieve such small footprints. Microwave and millimeter-wave antennas are conventionally fabricated using printed circuit board assembly (PCBA) techniques. Metal is deposited on a printed circuit board (PCB) and is subsequently patterned using photolithography and etching to define the desired shape. While the resolution of these photolithographic tools is sufficiently fine for the production of microwave and millimeter-wave antennas, it is far from being sufficient to define THz antennas. In general terms, the cutoff for PCBA-based antennas is about 150 GHz-200 GHz. Antennas designed to operate below these frequencies can be fabricated using these techniques, while antennas designed to operate above this frequencies may not.

To obviate this limitation, in some embodiments, Terahertz antennas are fabricated using semiconductor manufacturing processes, and therefore, are integrated on a semiconductor die. Semiconductor manufacturing processes offer much finer lithographic resolutions that what can be achieved with PCBAs manufacturing processes. Thus, some embodiments relate to on-chip Terahertz antennas.

Accordingly, some embodiments relate to a device, comprising a substrate a first semiconductor die, mounted on the substrate, having an RF transmit antenna array integrated thereon, the transmit antenna array comprising a first plurality of RF antennas sized to transmit first RF signals having frequency content in a frequency band of 300 GHz-3 THz; and a second semiconductor die, mounted on the substrate, having an RF receive antenna array integrated thereon, the receive antenna array comprising a second plurality of RF antennas sized to receive second RF signals having frequency content in the frequency band. In some embodiments, the antennas of the first plurality of RF antennas are sized to transmit the first RF signals having frequency content in a frequency band of 650-690 GHz. In some embodiments, the device further comprises signal generation circuitry configured to generate reference signals having a frequency bandwidth of 10 GHZ-60 GHz and to provide the signals to the RF transmit antenna array, wherein the RF transmit antenna array is configured to transmit the first RF signals in response to receiving the reference signals from the signal generation circuitry.

In some embodiments, the first RF antenna array has a frequency bandwidth of 10 GHz-60 GHz. In some embodiments, the first semiconductor die further comprises RF transmit circuitry coupled to the RF transmit antenna array and configured to cause the RF transmit antenna array to transmit the first RF signals; and a redistribution layer coupling the first plurality of RF antennas to the transmit circuitry. In some embodiments, the device further comprises processing circuitry coupled to the RF receive antenna array and configured to determine a distance between the device and a target object using the second RF signals. In some embodiments, the processing circuitry is further coupled to the RF transmit antenna array. In some embodiments, the substrate defines a plane extending in first and second directions substantially orthogonal to one another, and wherein the RF transmit antenna array is configured to transmit the first RF signals in a third direction outside the plane.

In some embodiments, the third direction is substantially perpendicular (e.g., between 80 degrees and 100 degrees) to the plane. In some embodiments, the second plurality of RF antennas is arranged to generate differential signals in response to receiving the second RF signals. In some embodiments, the second semiconductor die further comprises: a plurality of analog-to-digital converters (ADCs) coupled to the second plurality of RF antennas, the plurality of ADCs being configured to digitize third RF signals generated by the second plurality of RF antennas in response to receiving the second RF signals. In some embodiments, the second semiconductor die further comprises a plurality of sub-harmonic mixers coupled to the second plurality of RF antennas and the plurality of ADCs, the sub-harmonic mixers being configured to generate output signals by mixing the second RF signals with the reference signals generated by the signal generation circuitry and to provide the outputs signals to the plurality of ADCs. In some embodiments, the plurality of sub-harmonic mixers comprises a plurality of third-harmonic mixers configured to mix the second RF signals with third-harmonics of the plurality of reference signals. In some embodiments, the plurality of sub-harmonic mixers comprises differential inputs coupled to respective RF antennas of the second plurality of antennas. In some embodiments, the plurality of sub-harmonic mixers further comprises single-ended inputs configured to receive the reference signals generated by the signal generation circuitry. In some embodiments, the second semiconductor die further comprises a plurality of down-conversion mixers positioned between the plurality of sub-harmonic mixers and the plurality of ADCs, wherein the down-conversion mixers are configured to mix the output signals with the reference signals generated by the signal generation circuitry.

IV. Form Factor

Another challenge owes to the small form factor requirements demanded by vehicle manufacturers for sensors. LIDAR sensors and conventional RADAR sensors are typically very compact, such that they can be mounted near the vehicle's headlights. Vehicle manufacturers may be reluctant to employ sensors with larger footprints. Accordingly, the THz sensing systems developed by the inventors and described herein are packaged in small form factors, for example to fit within the size of a conventional business card (e.g., 9 cm×5 cm) or a pair of business cards (e.g., 18 cm×5 cm).

Reducing the size of the device poses a challenge from a system design perspective. There is very limited space inside the package, and yet the package must be sufficiently spacious to accommodate a large transmitter, a large receiver and the electronics needed to perform ranging and/or other measurements. On one hand, it is desirable to use receive antennas with large apertures to collect as much energy as possible. Large transmit antennas are also desirable because the larger the number of emitting antennas, the larger the power level that a transmitter can emit. On the other hand, the small space available inside the package limits the size of the transit and receive antennas, thus requiring that some trade-offs be made.

To reduce the space occupied by the receiver, some embodiments use linear or quasi-linear antenna arrays. A linear antenna array is an N×1 array of antennas, whereas a quasi-linear antenna array is an N×M array of antennas, where N is at least fifty times larger than M, at least forty times larger than M, at least thirty times larger than M, at least twenty times larger than M, at least ten times larger than M, at least five times larger than M, or at least three times larger than M. Although these types of arrays occupy almost the entire width of the board in one direction, they free up large areas for the other system components in the orthogonal direction. Additionally, linear or quasi-linear antenna arrays do not reduce the performance of the receiver too significantly relative to 2D arrays of N×N antennas. In fact, sensing for autonomous vehicles can typically require a large field of view in the horizontal axis, which allows the system to see target objects surrounding the vehicle, while the field of view in the vertical axis need not be nearly as large. Further, some embodiments relate to transmitters that are elongated in the vertical direction, i.e., in the direction substantially orthogonal to the direction in which the receiver extends. In other words, the aperture of the transmitter antenna array is relatively thin in the horizontal direction and relatively long in the vertical direction. This shape enables to transmitter to span wide angles in the horizontal direction at the expense of small angles in the vertical direction (which may be less important in some applications in which target objects move horizontally or longitudinally to a greater extent than they move vertically).

Some embodiments relate to a device comprising a substrate (e.g., a PCB, a package base or other types of supports) defining a plane extending in first and second directions substantially orthogonal to one another, an RF antenna array mounted on the substrate and having a first aperture, the first aperture having a first width extending in the first direction and a first length extending in the second direction, the first length being larger than the first width, and a second RF antenna array mounted on the substrate and having a second aperture, the second aperture having a second width extending in the first direction and a second length extending in the second direction, the second length being less than the second width. In some embodiments, the device further comprises RF transmit circuitry coupled to the first RF antenna array and configured to cause the first RF antenna array to transmit first RF signals for determining a distance to a target object; RF receive circuitry coupled to the second RF antenna array and configured to receive second RF signals from the second RF antenna array, the second RF signals generated as a result of the first RF signals being reflected by the target object; and processing circuitry, coupled to the RF receive circuitry, configured to determine a distance between the device and a target object. In some embodiments, the processing circuitry is further coupled to the RF transmit circuitry. In some embodiments, the first RF antenna array comprises a first plurality of antennas sized to transmit Terahertz RF signals, wherein the Terahertz RF signals have frequency content in a frequency band of 300 GHz-3 THz, and the second RF antenna array comprises a second plurality of antennas sized to receive Terahertz RF signals. In some embodiments, the Terahertz RF signals have a bandwidth in the range of 10 GHZ-60 GHz. In some embodiments, the first plurality of antennas comprises between 4 and 128 (e.g., 10 and 50) antennas. In some embodiments, the second plurality of antennas comprises between 64 and 1024 antennas. In some embodiments, the device further comprises a first semiconductor die mounted on the substrate, the first semiconductor die comprising the first RF antenna array, wherein the first plurality of antennas is integrated on the first semiconductor die. In some embodiments, the device further comprises a second semiconductor die mounted on the substrate, the second semiconductor die comprising the second RF antenna array, the second plurality of antennas integrated on the second semiconductor die. In some embodiments, the device further comprises a first semiconductor die mounted on the substrate, the first semiconductor die comprising the first RF antenna array, the first RF antenna array comprising a first plurality of antennas integrated on the first semiconductor die, the first plurality of antennas sized to transmit Terahertz RF signals having frequency content in the 300 GHz-3 THz frequency band; and a second semiconductor die mounted on the substrate, the second semiconductor die comprising the second RF antenna array, the second RF antenna array comprising a second plurality of antennas integrated on the second semiconductor die, the second plurality of antennas sized to receive Terahertz RF signals having frequency content in the 300 GHz-3 THz frequency band. In some embodiments, the first semiconductor die further comprises the transmit circuitry and a first redistribution layer coupling the first plurality of antennas to the transmit circuitry. In some embodiments, the second semiconductor die further comprises the receive circuitry; and a second redistribution layer coupling the second plurality of antennas to the receive circuitry.

V. Specifications

Illustrative examples of system specifications are illustrated in the table of FIG. 4, in accordance with some embodiments. Of course, not all embodiments are limited to these particular values.

The inventors have developed Terahertz-based active sensing systems that meet the demands of autonomous vehicles. As is clear from the description of the system link budget, the systems developed by the inventors can sense objects located, for example, up to 200 m away from the receiver despite the large atmospheric attenuation present in the Terahertz band. In very dry conditions (e.g., less than 25% humidity), a system may sense objects located more than 200 m away from it.

Some vehicles (e.g., cars and other land-based vehicles) tend to reflect more energy than pedestrians because they have larger cross sections. Therefore, a sensing system can generally see vehicles farther than it can see pedestrians. As an example, a system can range vehicles up to 200 m away in the presence of a 60 dB/km-propagation loss and up to 140 m away in the presence of a 100 dB/km-propagation loss. As another example, a system can range pedestrians up to 100 m away in the presence of a 60 dB/km-propagation loss and up to 80 m away in the presence of a 100 dB/km-propagation loss.

Range resolution is a parameter that quantifies a RADAR sensor's ability to distinguish between targets on the same bearing but at different ranges. The smaller the range resolution, the better the system's ability to distinguish objects at different ranges. A 10 mm-range resolution indicates that targets separated by 10 mm or more in range are distinguishable from one another. The range resolution of a RADAR sensor is given by c/2B, where c is the speed of light in the medium of interest and B is the frequency bandwidth of the signal. Operating in the Terahertz band allows frequency bandwidths that would not be possible with millimeter waves. In one example, a THz sensing system achieves a frequency bandwidth on the order of 15-25 GHz. Given the inversely proportional relationship between range resolution and bandwidth, bandwidths on the order of 15-25 GHz enable range resolutions on the order of just a few millimeters. In some embodiments, the systems described herein provide range resolutions on the order of 6 mm to 10 mm.

Angular resolution is a parameter that quantifies a RADAR sensor's ability to distinguish targets at the same range on different bearings. The smaller the angular resolution, the higher the system's ability to distinguish object. For a conventional RADAR, the angular resolution is equal to the aperture of the antenna beam, which, in turn, is related to the antenna linear dimension and to the signal wavelength. For an antenna having linear dimension L and operating at a wavelength $\lambda$, the beam aperture (in radians) is approximately equal to $1.2\lambda/L$. Because of their lower wavelengths, THz signals can achieve considerably better angular resolution than what can be achieved with millimeter waves. At 670 THz, an antenna having a linear dimension between 5 cm and 20 cm, can achieve between 0.1° and 0.2° in azimuth angular resolution and between 0.2° and 1° in elevation angular resolution. In some embodiments, low angular resolutions may be obtained using transmit antenna array apertures between 1 $cm^2$ and 5 $cm^2$, for example.

The sensitivity of a receiver is a parameter that quantifies the minimum signal strength that a receiver can accurately detect. Because the sensitivity represents how weak an input signal can be to be accurately received by a receiver, the lower the sensitivity, the better. For example, a receiver having a sensitivity of −90 dBm is better than a receiver having a sensitivity of −80 dBm. Some sensing systems developed by the inventors can achieve receiver sensitivities as low as −117.6 dBm for a receiver with a noise figure (NF) of 10 dB, −97.6 dBm for a NF of 20 dB, −90.6 dBm for a NF of 27 dB, −77.6 dBm for a NF of 40 dB. In some embodiments, the NF is between 10 dB and 40 dB. In some embodiments, the NF is between 20 dB and 40 dB. In some embodiments, the NF is between 30 dB and 40 dB.

In some embodiments, the systems described herein may provide a refresh rate (the rate at which a ranging image is refreshed, also referred to as pulse repetition rate) between 2 Hz and 50 Hz.

In some embodiments, the systems described herein may have a form factor with the following dimensions: a width between 7 cm and 11 cm (e.g., 9 cm), a length between 3 cm and 7 cm (e.g., 5 cm) and a depth between 3 cm and 7 cm (e.g., 5 cm).

Some embodiments relate to a device comprising: a substrate, a radio-frequency (RF) transmit antenna array, mounted on the substrate, and configured to transmit a first RF signal having a power level (e.g., EIRP) between 10 dBm and 30 dBm, the first RF signal having frequency content in a frequency band of 300 GHz-3 THz; an RF receive antenna array, mounted on the substrate, and configured to receive a second RF signal resulting from reflection of the first RF signal from a target object; and processing circuitry coupled to the RF transmit antenna array and to the RF receive antenna array, the processing circuitry being configured to determine the distance of the target object relative to the device using the second RF signal, wherein the processing circuitry has a noise figure (NF) between 10 dB and 40 dB. The system may have a signal-to-noise ratio (SNR) of 13.4 dB, which yields a probability of detection of 0.95% and a probability of false alarm of 0.000001%. In some embodiments, the RF transmit array has a frequency bandwidth of 15 GHZ-25 GHz and a range resolution between 6 mm and 10 mm. In some embodiments, the RF transmit antenna array has an aperture between 1 $cm^2$ and 5 $cm^2$ and an angular resolution between 0.4° and 1° in the frequency band. In some embodiments, the substrate has an area between 10 $cm^2$ and 60 $cm^2$.

In some embodiments, the processing circuitry is configured to update the determination of the distance at a refresh rate between 0.1 Hz and 100 Hz.

VI. Hardware Systems

A. System Architecture

Figure 5A:
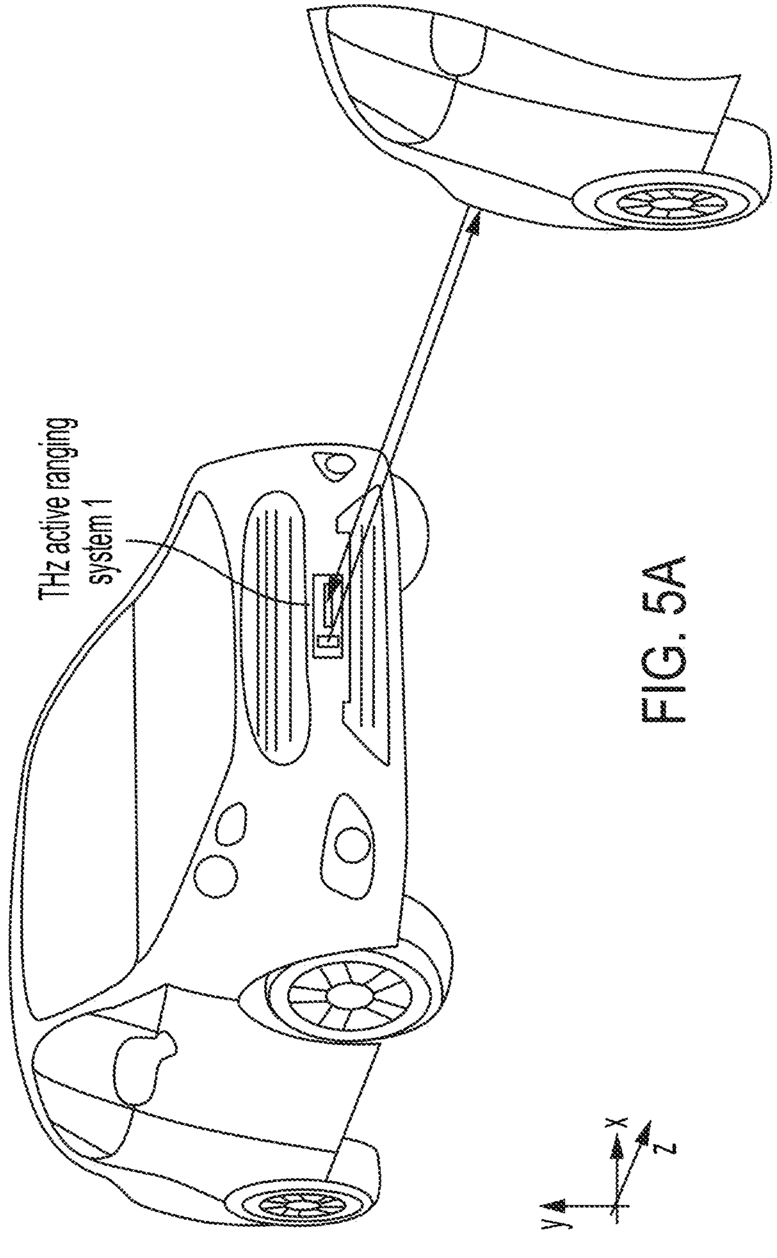
FIG. 5A illustrates a system for Terahertz-based active sensing, in accordance with some embodiments of the technology described herein.

FIG. 5A is a schematic diagram illustrating a vehicle equipped with a Terahertz (THz) active sensing system 1, in accordance with some embodiments. Although THz active sensing system 1 is shown as being attached to the front bumper of a car, embodiments of the present technology are not limited to any particular location. Further, vehicles may be equipped with more than one THz active sensing system 1. For example, a THz active sensing system may be attached to the front side of the vehicle, and another THz active sensing system may be attached to the rear side. Other sensing technologies may be used alongside the THz sensing system(s), including for example one or more optical sensors (e.g., video cameras and infrared cameras), one or more millimeter-wave RADAR sensors, and/or one or more LIDAR sensors.

THz active sensing system 1 includes circuitry for determining the relative and/or absolute state (e.g., position, velocity, and/or acceleration) of a target object using signals having frequency content in the frequency band of 300 GHz-3 THz. THz active sensing system 1 includes a transmitter, a receiver and processing circuitry (e.g., analog and/or digital circuitry). The transmitter transmits signals in directions where target objects are likely to be present. For example, signals may be transmitted along the road in front of a vehicle. The receiver receives signals resulting from the reflection of the transmitted from a target object. In this depiction, the transmitted signals are reflected from the rear side of another vehicle. The processing circuitry uses the received signals to determine the relative and/or absolute state of the target object. In some embodiments, the position of a target object may be determined based on a measurement of distance relative to the known location of the sensing system. In some embodiments, the velocity of a target object may be determined based on multiple measurements of distance, whether obtained from a single THz active sensing system 1 or from multiple THz active sensing systems 1. Similarly, the acceleration of a target object may be determined based on multiple velocity data points. A computer may use the information obtained using the THZ sensing system to automatically control the vehicle in some respect (e.g., to self-drive the vehicle without human intervention or with some degree of human intervention) or to perform other automated operations.

Figures 5B, 5C:
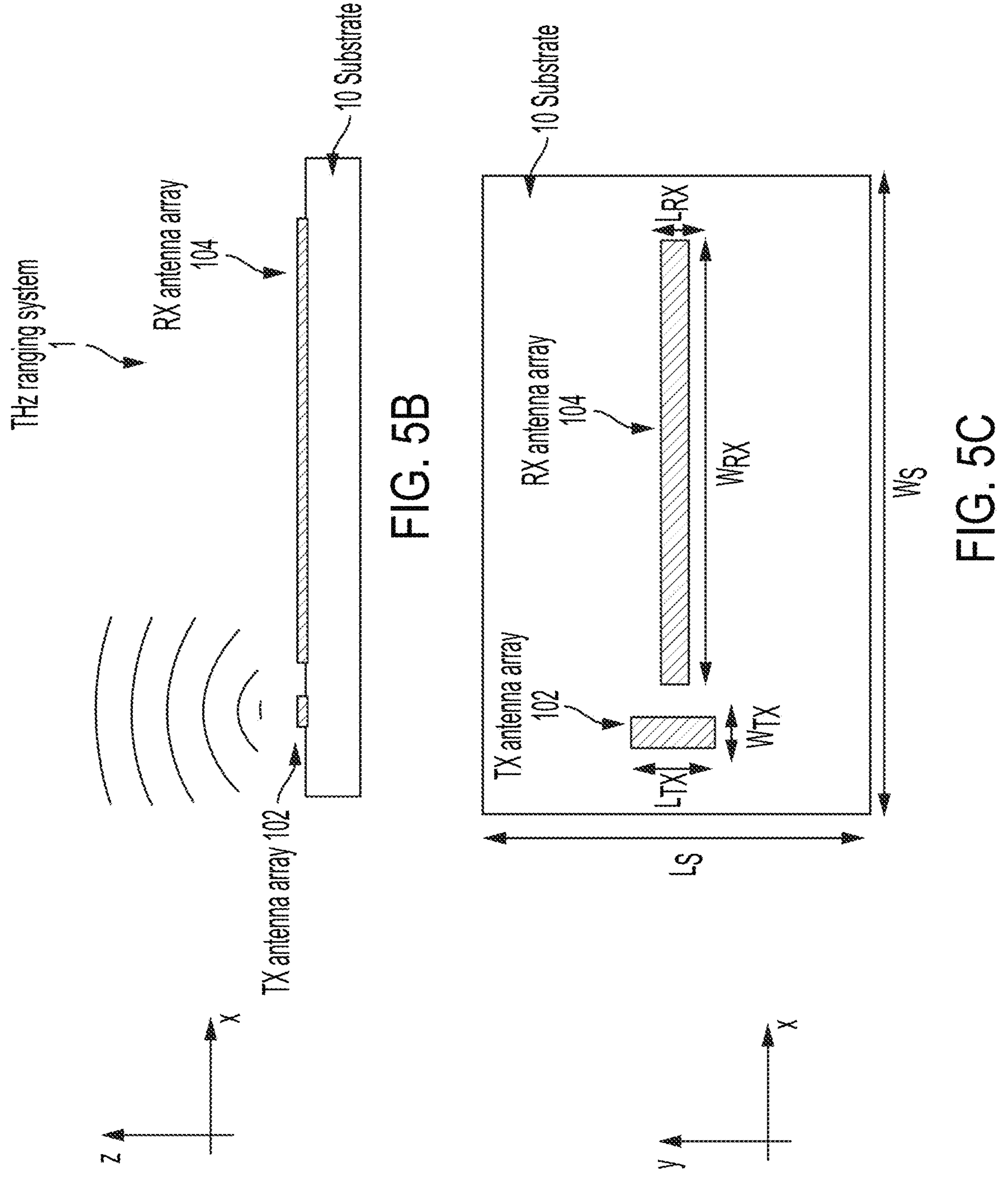
FIGS. 5B-5C are a side view and a top view, respectively, of a Terahertz-based active sensor, in accordance with some embodiments of the technology described herein.

The x-axis will be referred to as the horizontal axis or azimuth axis, the y-axis as the vertical axis or elevation axis, and the z-axis as the longitudinal axis or range axis. FIGS. 5B-5C are a side view and a top view, respectively, of a THz active sensing system 1, in accordance with some embodiments. THz active sensing system 1 includes a substrate 10, a transmitter (TX) antenna array 102 and a receiver (RX) antenna array 104. Substrate 10 may include a printed circuit board (PCB) in some embodiments. In this depiction, substrate 10 has a top surface extending in the xy-plane. THz active sensing system 1 may have a sufficiently small form factor to fit in any suitable part of a vehicle. Substrate 10 has a width $W_S$ extending along the x-axis and a length $L_S$ extending along the y-axis. In some embodiments, width $W_S$ may be between 5 cm and 15 cm, between 9 cm and 13 or between 7 cm and 11 cm. In some embodiments, length $L_S$ may be between 1 cm and 18 cm, between 3 cm and 7 cm or between 4 cm and 6 cm. Other ranges are also possible. In some embodiments, the substrate has an area between 10 $cm^2$ and 60 $cm^2$.

TX antenna array 102 may be sized to emit signals having frequency content in the frequency band of 300 GHz and 3 THz or any frequency band within the 300 GHZ-3 THz band. For example, TX antenna array 102 may be sized to emit signals having frequency content in the frequency band of 650 GHz-690 GHz or 660 GHZ-680 GHz. In some embodiments, TX antenna array 102 has a frequency bandwidth (e.g., 3 dB bandwidth) of 4 GHz-134 GHz, 4 GHZ-100 GHz, 4 GHZ-60 GHz, 10 GHz-100 GHz, 10 GHZ-60 GHz, 10 GHz-30 GHZ, 15 GHZ-60 GHz, 10 GHZ-30 GHz or 15 GHZ-25 GHZ. Similarly, RX antenna array 104 may be sized to receive signals having frequency content in a frequency band of 300 GHz-3 THz or any sub-band of this frequency band. For example, in some embodiments, RX antenna array 104 may be sized to receive signals having frequency content in a frequency band of 650 GHz-690 GHz or 660 GHz-680 GHz. In some embodiments, RX antenna array 104 has a frequency bandwidth of 10 GHZ-60 GHZ, 10 GHz-30 GHz, 15 GHZ-60 GHz, 10 GHZ-30 GHz or 15 GHz-25 GHZ.

A TX antenna array 102 and an RX antenna array 104 may be disposed on substrate 10. For example, TX antenna array 102 and a receiver RX antenna array 104 may be mounted directly on substrate 10, or may be integrated on one or more semiconductor dies that are mounted on substrate 10. TX antenna array 102 may include multiple TX antennas and RX antenna array 104 may include multiple RX antennas. TX antenna array 102 may transmit signals outside the plane defined by the top surface of substrate 10 (e.g., parallel to the z-axis or at an angle relative to the z-axis other than 90°). For example, TX antenna array 102 may be shaped to have a main lobe extending away from the plane defined by the top surface of substrate 10. Similarly, RX antenna array 104 may receive the transmitted signals upon reflection from a target object. For example, RX antenna array 102 may be shaped to have a main lobe extending away from the plane defined by the top surface of substrate 10.

As shown in FIG. 5C, the aperture of TX antenna array 102 has a width $W_{TX}$ extending along the x-axis and a length $L_{TX}$ extending along the y-axis. In some embodiments, length $L_{TX}$ is greater than width $W_{TX}$. For example, length $L_{TX}$ may be more than four times greater than width $W_{TX}$, more than ten times greater than width $W_{TX}$, more than twenty times greater than width $W_{TX}$ or more than thirty times greater than width $W_{TX}$. Length $L_{TX}$ may be between 10 mm and 3 cm, between 10 mm and 5 cm, between 10 mm and 7 cm, between 50 mm and 3 cm, between 50 mm and 5 cm, or between 50 mm and 7 cm. Width $W_{TX}$ may be between 0.1 mm and 3 mm, between 0.1 mm and 5 mm, or 0.1 mm and 10 mm. The aperture of the TX antenna array 102 may be elongated along the y-axis to produce a large horizontal field of view and a small vertical field of view. This is shown in the schematic diagram of FIG. 5D, which illustrates an example of an emission cone for TX antenna array 102. The emission cone is elongated along the x-axis, which results in a large horizontal field of view. By contrast, the emission cone is relatively narrow along the y-axis, which results in a small vertical field of view. The TX antenna array is designed to have such an elongated aperture because, from the view point of the front side of a vehicle, target objects are more likely to span in the horizontal direction than in the vertical direction. Therefore, computer-assisted driving algorithms tend to benefit more from data points at different azimuths than from data points at different elevations. In one example, the angular field of view in the horizontal direction may be between 20° and 90° (e.g., in the 650 GHZ-690 GHz band) and the angular field of view in the vertical direction may be between 5° and 15° (e.g., in the 650 GHz-690 GHz band).

Referring back to FIG. 5C, the aperture of RX antenna array 104 has a width $W_{RX}$ extending along the x-axis and a length $L_{RX}$ extending along the y-axis. In some embodiments, width $W_{RX}$ is greater than length $L_{RX}$. For example, width $W_{RX}$ may be more than five times greater than $L_{RX}$, more than ten times greater than $L_{RX}$, more than twenty times greater than $L_{RX}$ or more than thirty times greater than $L_{RX}$. For example, width $W_{RX}$—may be between 5 mm and 10 cm, between 3 cm and 10 cm or between 5 cm and 10 cm. Length $L_{RX}$ may be between 0.1 mm and 3 mm, between 0.1 mm and 5 mm or between 0.1 mm and 1 cm. The aperture of RX antenna 104 may be elongated along the y-axis to increase the content sensed by the array in the horizontal direction. As explained herein, from the view point of the front side of a vehicle, target objects tend to span the horizontal axis more than they span the vertical axis. This is shown in the schematic diagram of FIG. 5E-1, which illustrates an RX antenna array 104 capturing signals reflected from multiple directions along the horizontal axis. This depiction represents a scenario in which signals are reflected from different angles. In some embodiments, as described in detail herein, one or more focusing elements may be used to perform viewpoint diversification.

Figures 1, 5E:
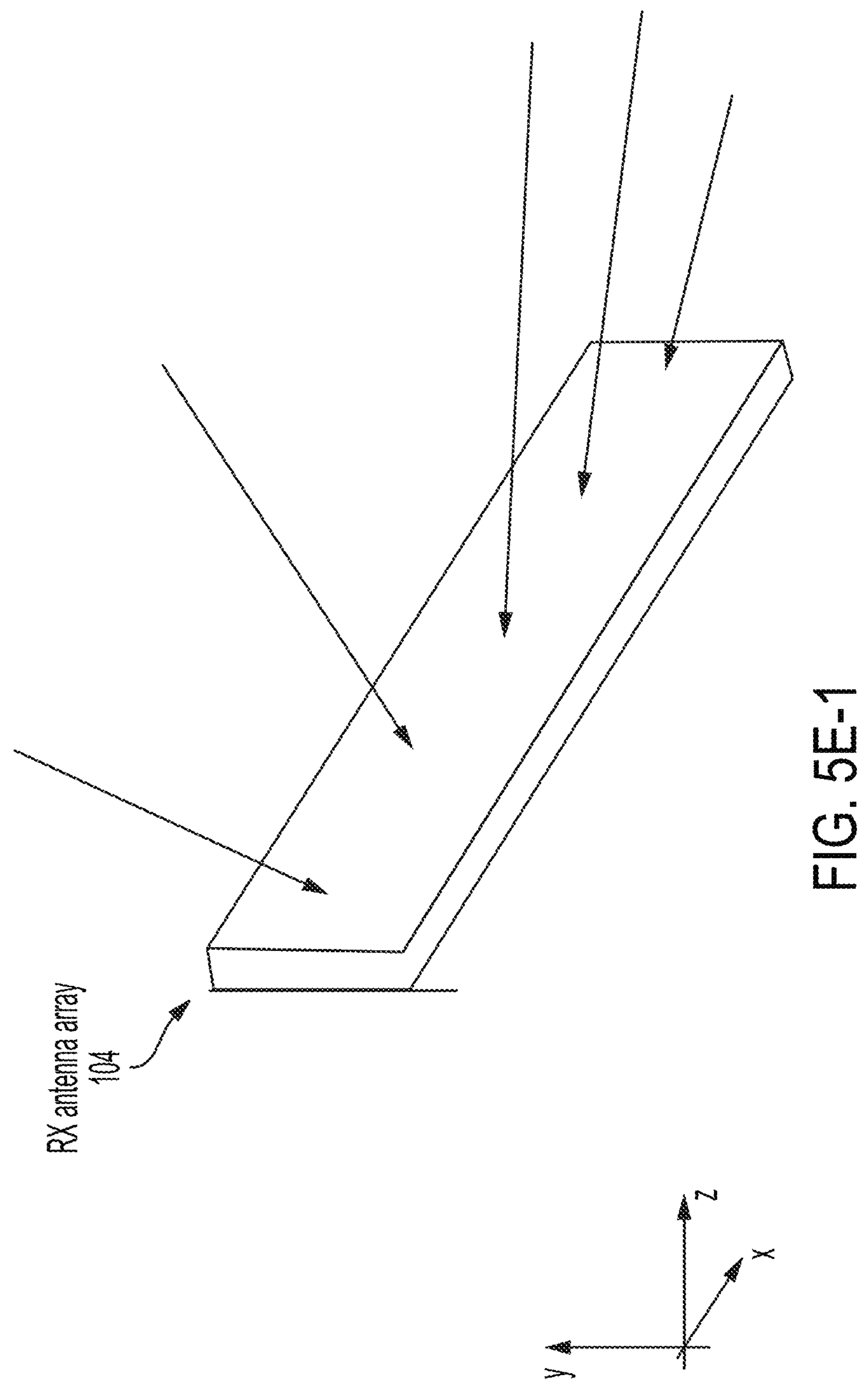
FIG. 5E-1 is a perspective view of a receive antenna array, in accordance with some embodiments of the technology described herein.
Figures 2, 5E:
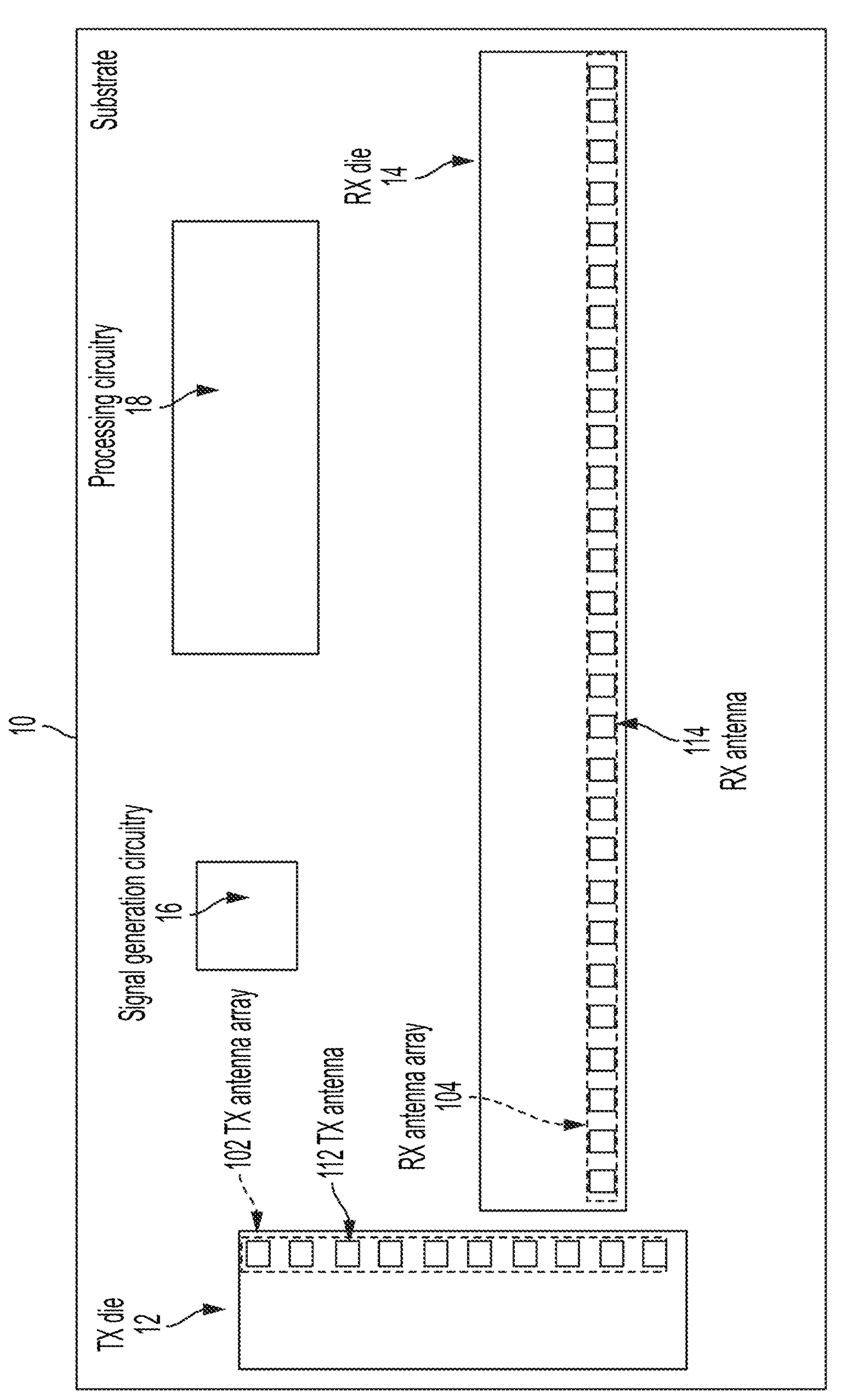

FIG. 5E-2 is a top view illustrating a THz active sensing system in additional detail. As shown, substrate 10 includes a TX die 12, an RX die 14, a signal generation circuitry 16 and processing circuitry 18. TX die 12 and RX die 14 may be mounted on substrate 10 in any suitable way, including for example using wire bonding techniques or flip-chip techniques, among others. Signal generation circuitry 16 may be mounted on substrate 10 or may be integrated on a die mounted on substrate 10. In some embodiments, a portion of signal generation circuitry 16 is mounted on substrate 10 and another portion is integrated on one or more dies. For example, a first portion of signal generation circuitry 16 may be mounted on substrate 10, a second portion may be integrated on TX 12 and a third portion may be integrated on RX die 14.

TX die 12 includes multiple TX antennas 112 integrated thereon. TX antennas 112 may be of any suitable type, including for example, patch antennas, dipole antennas, and slot antennas. Collectively, TX antennas 112 define TX antenna array 102. Thus, the aperture of TX antenna array 102 represents the overall effective emission area of the antennas. In some embodiments, TX antennas 112 define a linear antenna array (an array of N×1 antennas). In some embodiments, TX antennas 112 define a quasi-linear antenna array (an array of N×M antennas, where N is at least thirty times larger than M, at least twenty times larger than M, at least ten times larger than M, at least five times larger than M, or at least three times larger than M). TX die 12 includes other components (not illustrated in FIG. 5E-2) which are configured to drive the antennas, as will be described in detail herein.

In some embodiments, the TX antennas 112 are configured to emit in-phase relative to one another. In this way, the signals that emerge from the array interfere with one another constructively, and the overall emission power level is increased. As described herein, it is important to emit enough power to overcome the severe atmospheric attenuation present in the THz band. Different techniques may be used to ensure in-phase emission. In some embodiments, in-phase emission may be achieved using passive circuits, without having to control the phases of the signals. For example, TX die 12 may be designed to include a set of conductive traces each feeding one antenna, where the relative lengths of the conductive traces are selected to ensure in-phase emission (e.g., they all have the same lengths). In some embodiments, in-phase emission may be achieved using active circuits. For example, each antenna (or at least some antennas) may be preceded by a phase shifter. The phase shifters may adjust the phases of the signals that drive the antennas to ensure that all (or at least most) of the antennas emit in-phase. In some embodiments, the TX antenna array may emit at a power level more than 10 dBm (e.g., between 10 dBm and 15 dBm, between 10 dBm and 20 dBm or between 10 dBm and 30 dBm). For example, each antenna may emit between 1 dBm and 2 dBm (e.g., 1.75 dBm) in the THz band and the array may include between 4 and 128 antennas, between 10 antennas and 30 antennas or between 10 and 50 antennas (e.g., 16 antennas).

RX die 14 includes multiple RX antennas 114 integrated thereon. For example, RX die 14 may include between 32 and 1024 or between 64 and 512 RX antennas 114, for example. RX antennas 114 may be of any suitable type, including for example, patch antennas, dipole antennas, and slot antennas. Collectively, RX antennas 114 define RX antenna array 104. Thus, the aperture of RX antenna array 104 represents the overall effective reception area of the antennas. In some embodiments, RX antennas 114 define a linear antenna array (an array of 1×M antennas). In some embodiments, RX antennas 114 define a quasi-linear antenna array (an array of N×M antennas, where M is at least fifty times larger than M, at least forty times larger than M, at least thirty times larger than N, at least twenty times larger than N, at least ten times larger than N, at least five times larger than N or at least three times larger than N). RX die 14 includes other components (not illustrated in FIG. 5E-2) which convey the signals received from the antennas to processing circuitry 18.

Processing circuitry 18 may include digital circuits and/or analog circuits configured to determine the relative and/or absolute state of a target object based on the reflected signals received from the RX antenna array. Processing circuitry 18 may be integrated on RX die 14 or on another die (e.g., an ASIC or a processor). In some embodiments, a portion of processing circuitry 18 is integrated on RX die 14 and a portion of processing circuitry 18 is integrated on another die.

Figure 5F:
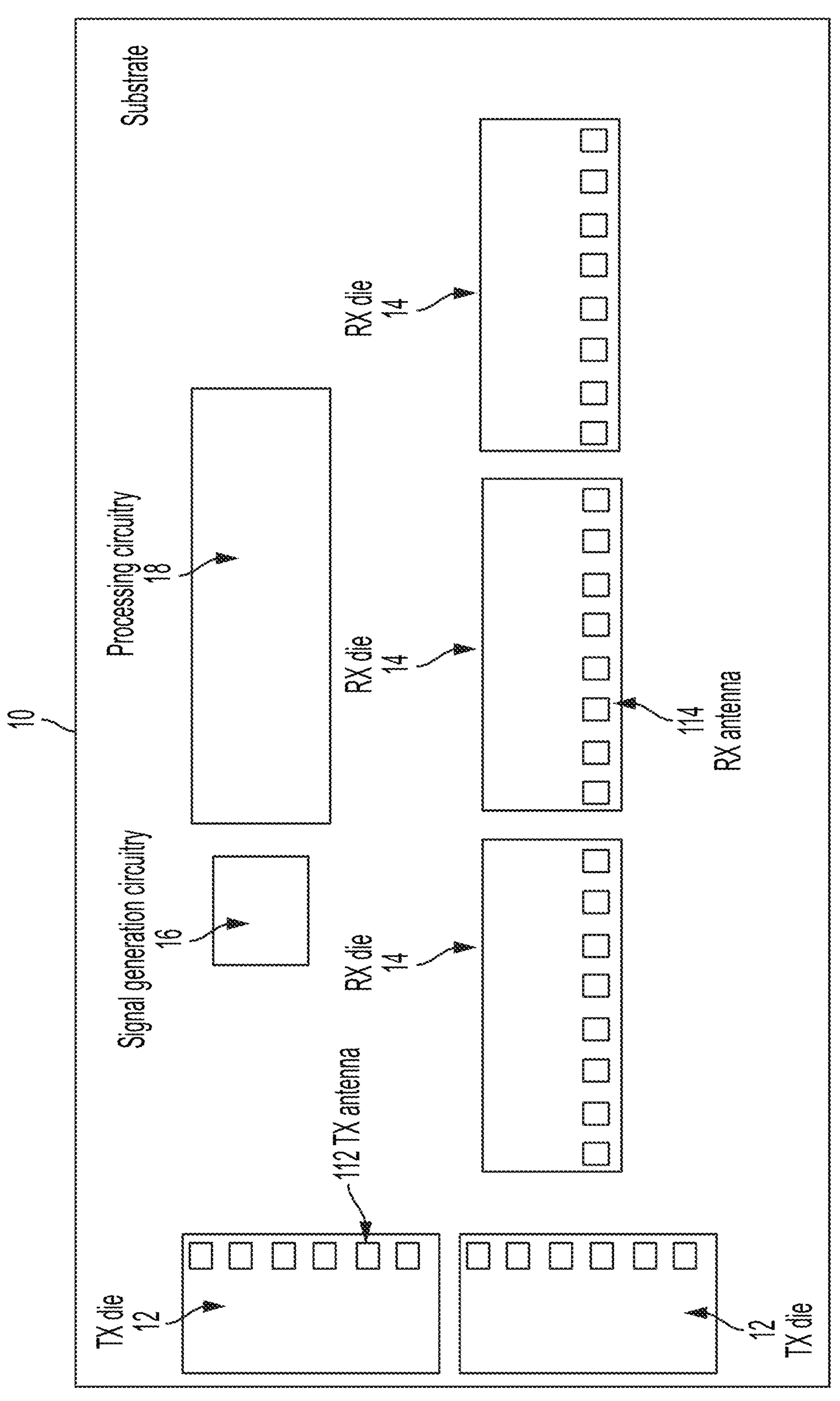
FIG. 5F is a top view of a substrate including a plurality of transmit antenna arrays and a plurality of receive antenna arrays, in accordance with some embodiments of the technology described herein.

In the example of FIG. 5E-2, substrate 10 includes only one TX die 12 and only one die RX die 14. In other embodiments, substrate 10 may include more than one RX die, more than one TX die, or both. FIG. 5F illustrates an example in which substrate 10 include two TX dies 12 and three RX dies 14, though any other suitable number of TX dies and RX dies is also possible. In some embodiments, the fabrication process used to fabricate TX die 12 may limit the maximum number of antennas that can be formed on the die. Thus, having more than one TX die can enable emission of more energy than would be possible with a single TX die. Similarly, in some embodiments, the fabrication process used to fabricate RX die 14 may limit the maximum number of antennas that can be formed on the die. Thus, having more than one RX die can enable reception of more energy than would be possible with a single RX die.

B. Semiconductor Manufacturing Processes

Figure 5G:
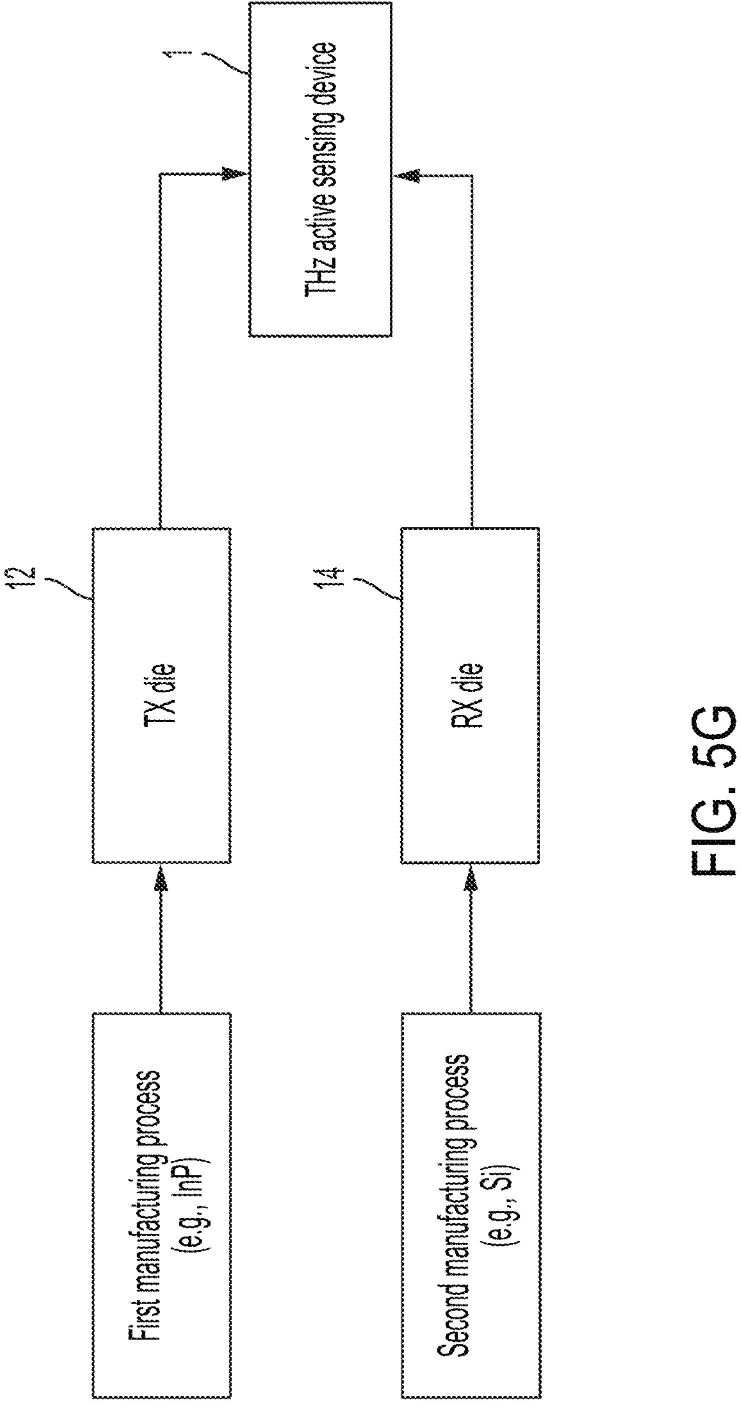
FIG. 5G is a flowchart illustrating a process for manufacturing a Terahertz active sensor, in accordance with some embodiments of the technology described herein.

The inventors have appreciated that the TX die and the RX die are configured to perform different functions, and as a result, have different requirements. The TX die should be designed to emit enough power in the Terahertz band to overcome the atmospheric attenuation. Thus, in some embodiments, one of the requirements for the TX die is the use of high-power, high-frequency circuits. On the other hand, the RX die should be designed to have a large number of antennas to increase the amount of received energy as much as possible. Thus, in some embodiments, one of the requirements for the RX die is that its size be sufficiently large to accommodate a certain threshold number of antennas. Although fabricating both the TX die and the RX die using the same semiconductor fabrication process is generally more practical and less costly, the inventors have appreciated that, given the particular requirements of the TX die and the RX die, it may be more suitable to fabricate the dies using distinct semiconductor fabrication processes. FIG. 5G is a block diagram illustrating a example of a workflow for manufacturing a THz active sensing system 1. As shown in this figure, a first semiconductor fabrication process may be used to fabricate TX die 12, and a second semiconductor fabrication process may be used to fabricate RX die 14. These semiconductor fabrication processes may take place in distinct fabrication facilities, as there may not be a single fabrication facility capable of handling both technologies. Although using different fabrication facilities may increase costs, the inventors have appreciated that the performance improvement that results from it justifies the increased costs, in some embodiments.

In some embodiments, a TX die comprises a first semiconductor type fabricated according to a first semiconductor manufacturing process, and an RX die comprises a second semiconductor type fabricated according to a second semiconductor manufacturing process. In some embodiments, the second semiconductor type is a silicon-based semiconductor type, and the first semiconductor type is not a silicon-based semiconductor type. For example, the RX die may comprise silicon (e.g., the substrate of the RX die may be made of silicon and/or the transistor layer of the RX die may be made of silicon) and the TX die may comprise a III-V semiconductor (e.g., the substrate of the TX die may be made of a III-V material and/or the transistor layer of the TX die may be made of a III-V material), such as indium phosphide.

In some embodiments, two dies are deemed to be of different semiconductor types where the substrates on which the dies are formed have different chemical compositions (e.g., silicon-based substrate vs. any III-V-based substrate) and/or where the transistors of the dies are made of materials having different chemical compositions (silicon-based transistors vs. III-V-based transistors).

Given the TX die's requirements for high-power, high-frequency circuits, in some embodiments, the TX die may be fabricated using a semiconductor material having a large maximum oscillation frequency $f_{max}$ and/or large current-gain cutoff frequency $f_t$. The maximum oscillation frequency and the current-gain cutoff frequency are parameters that quantify the practical frequency upper bound for useful circuit operation. As an example, certain silicon/germanium (SiGe) processes can reach maximum oscillation frequencies in the range of 500 GHz to 720 GHz. While the performance of SiGe-based devices may be sufficient for sensing systems operating in the lower portion of the Terahertz band, it is not sufficient for sensing systems operating at higher frequencies. For such systems, a maximum oscillation frequency in excess of 1 THz and a current-gain cutoff frequency in excess of 0.5 THz would desirable.

There is a particular class of semiconductor materials that offer such high $f_{max}$ and $f_t$—materials that have a relative high carrier (e.g., electron, hole) mobility and/or a relatively high breakdown electric field. In some embodiments, a transmitter may include a semiconductor material having an electron mobility, taken at 300K, between 3000 $cm^2V^{-1}s^{-1}$ and 5500 $cm^2V^{-1}s^{-1}$ or between 5000 $cm^2V^{-1}s^{-1}$ and 5500 $cm^2V^{-1}s^{-1}$. In some embodiments, a transmitter may include a semiconductor material having a breakdown electric field $4\times10^5$ $Vcm^{-1}$ and $6\times10^5$ $Vcm^{-1}$.

Indium phosphide (InP) has among the highest current-gain cutoff frequencies and maximum oscillation frequencies of all semiconductor materials. Depending on the particular process used in manufacturing InP dies, $f_{max}$ can be as high as 1.5 THz (e.g., between 0.7 THz and 1.5 THz) and $f_t$ can be as high as 1 THz (e.g., between 0.3 THz and 1 THz). In light of the large $f_{max}$ and $f_t$ in InP, some embodiments involve TX dies comprising InP (e.g., having an InP substrate and/or having transistors made in InP). In some embodiments, TX dies comprising InP-based circuitry (e.g., InP-based transistors and diodes) may be able to emit electromagnetic energy in the Terahertz band with power levels between 1 dBm and 2 dBm per antenna (e.g., 1.75 dBm).

Other III-V semiconductor materials may alternatively, or additionally, be used. For example, some TX dies comprise gallium nitride (GaN), indium nitride (InN), aluminum nitride (AlN), gallium arsenide (GaAs), indium arsenide (InAs), aluminum arsenide (AlAs), gallium phosphide (GaP) and aluminum phosphide (AlP).

Given the RX die's requirements for large die areas that can accommodate as many antennas as possible, in some embodiments, the RX die may be fabricated using a semiconductor process capable of producing large reticle sizes. Unfortunately, some of the semiconductor materials used in some embodiments for the transmit circuitry (e.g., InP) may be ill-suited to be used for the receive circuitry because it may not be possible to fabricate very large dies from these materials. For example, due to the brittle nature of InP, large InP dies are not feasible using conventional manufacturing processes. InP tends to shatter when fabricated in large areas.

There are other semiconductor materials that are more resilient and therefore offer substantially larger die areas. Silicon is one of these materials. For example, certain silicon manufacturing processes can produce reticle areas as large as 110 mm×110 mm. Such large reticles area can accommodate several hundreds of RX antennas, thus enabling very large RX antenna arrays. Accordingly, some embodiments involve RX dies comprising silicon (e.g., having a silicon substrate and/or having silicon transistor layer). An additional advantage of using silicon is the opportunity to leverage large-scale, CMOS-compatible semiconductor foundries. To further improve their performance, some silicon RX dies include SiGe transistors.

Although in some embodiments the TX die may be made of InP and the RX die may be made of Si as described herein, the opposite arrangement is also possible in other embodiments. In these embodiments, instead of having a high-performance transmitter, the system includes a high-performance receiver. In fact, although Si-based TX dies may not emit the amount of power possible with InP-based TX dies, InP-based RX dies may be significantly more sensitive than Si-based RX dies. Therefore, in these embodiments, the lower power emitted by the transmitter is made up by the lower noise floor of the receiver.

In yet other embodiments, the TX die and the RX die may comprise the same semiconductor material (e.g., Si or InP, among others).

Some embodiments relate to a method for fabricating a device, comprising obtaining a first semiconductor die of a first semiconductor type and patterned with a radio-frequency (RF) transmit antenna array, the first semiconductor die being fabricated using a first semiconductor manufacturing process; obtaining a second semiconductor die of a second semiconductor type and patterned with an RF transmit antenna array, the second semiconductor die being fabricated using a second semiconductor manufacturing process different from the first semiconductor manufacturing process; and fabricating the device at least in part placing the first semiconductor die and the second semiconductor die on a substrate. In some embodiments, the second semiconductor type is a silicon-based semiconductor type, and the first semiconductor type is a III-V semiconductor type. In some embodiments, the method further comprises attaching a focusing element to the substrate so that the focusing element covers at least a portion of the RF receive antenna array. In some embodiments, the method further comprises: prior to placing the first semiconductor die on the substrate, patterning the substrate with an RF power divider having an input and a plurality of outputs; and subsequent to placing the first semiconductor die on the substrate, coupling the outputs of the RF power divider to respective antennas of the RF transmit antenna via wire bonds.

C. Terahertz Antennas

Building antennas capable of transmitting and receiving signals in the Terahertz band is challenging. The size of an antenna is generally dictated by the target wavelength. The area of an antenna is generally on the order of $\lambda^2$, where $\lambda$ is the wavelength associated with the signal center frequency. At 1 THz, for example, the area of an antenna may be on the order of 90,000 $\mu m^2$.

Microwave antennas are conventionally fabricated using printed circuit board assembly (PCBA) techniques. Metal is deposited on a printed circuit board (PCB) and is subsequently patterned using photolithographic techniques to form the desired shape. While the resolution of these photolithographic tools is sufficiently fine for microwave and millimeter-wave antennas, it is far from being sufficient to define a Terahertz antenna. In general, the cutoff for PCBA-based antennas is about 150 GHz-200 GHz. Antennas designed to operate below these frequencies can be fabricated using these techniques, while antennas designed to operate above these frequencies do not.

The inventors have appreciated that semiconductor manufacturing process allow for significantly smaller features than what is possible with PCBA manufacturing processes. Accordingly, in some embodiments, the antennas of the THz active sensing system 1 are integrated directly on the dies. FIG. 5H is a cross sectional view of a TX die 12 including a TX antenna 112 and transmit circuitry 113, in accordance with some embodiments. TX antenna 112 is patterned on the top surface of TX die 12, and is coupled to transmit circuitry 113 via conductive trace 115. Transmit circuitry 113 may include transistors and/or other electronic components (including drivers, amplifiers and frequency multipliers, examples of which are described in detail herein). RX antennas 114 may be integrated on RX die 14 in a similar manner. For example, RX die 14 may include receive circuitry and RX antennas may be coupled to the receive circuitry similar to the arrangement of FIG. 5H. Examples of receive circuitries are described in detail herein.

Figure 5I:
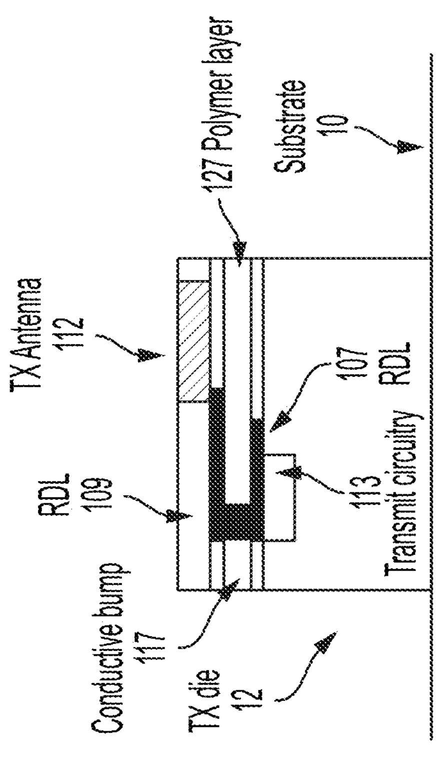
FIG. 5I is a cross sectional view of another transmitter antenna die, in accordance with some embodiments of the technology described herein.
Figure 5H:
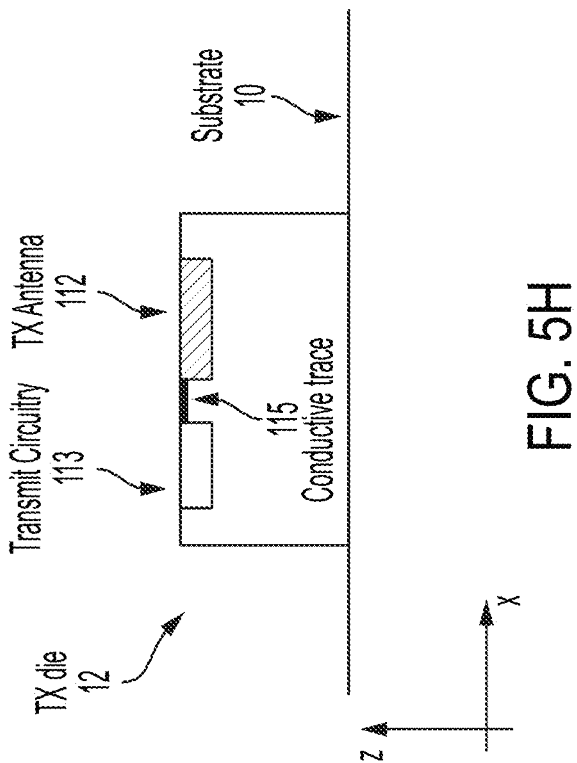
FIG. 5H is a cross sectional view of a transmitter antenna die, in accordance with some embodiments of the technology described herein.

FIG. 5I is a cross sectional view of an alternative arrangement. Here, TX antenna 112 is integrated with TX die 12, but instead of being patterned directly on the top surface of the die, it is positioned on top of a polymer layer. In this arrangement, a polymer layer 127 is formed on the top surface of TX die 12. A conductive bump 117 passes through a portion of the polymer layer. Redistribution layers (RDLs) 107 and 109 and conductive bump 117 route signals from TX die 12 to TX antenna 112. In this example, transmit circuitry 113 is coupled to TX antenna 112 via the RDLs. RX antennas 114 may be integrated on RX die 14 in a similar manner. For example, RX die 14 may include receive circuitry and RX antennas may be coupled to the receive circuitry similar to the arrangement of FIG. 5I.

In some embodiments, a substrate 10 may include multiple TX antenna arrays, which can improve the overall spatial resolution of the system. FIG. 5J, for example, illustrates a substrate 10 including a pair of TX antenna arrays 102. The TX antenna arrays are positioned on opposite sides of the RX antenna array 104. In this way, the separation between the TX antenna arrays can be maximized (or at least increased) without having to increase the dimension of substrate. Increasing the separation between the arrays leads to an increase, relative to single TX antenna array implementations, in the system's spatial resolution when the image obtained using the first TX antenna array is combined with the image obtained using the second TX antenna array.

D. Signal Generation Circuitry

The inventors have appreciated that generation and detection of signals directly in the Terahertz band is not practical due to the absence of reliable signal generators and detectors in this band. Accordingly, in some embodiments, Terahertz sensing system 1 is configured to generate a reference signal having a relatively low frequency and to up-convert the reference signal to the desired Terahertz band. On the transmitter side, a Terahertz sensing system may translate the frequency content of the signal from a frequency band between 1 GHz and 20 GHz to a frequency band between 650 GHz and 690 GHz. On the receiver side, the Terahertz sensing system may translate the frequency content of a received signal from a frequency band between 650 GHz and 690 GHz to a frequency band between 1 GHz and 20 GHz.

Figure 6A:
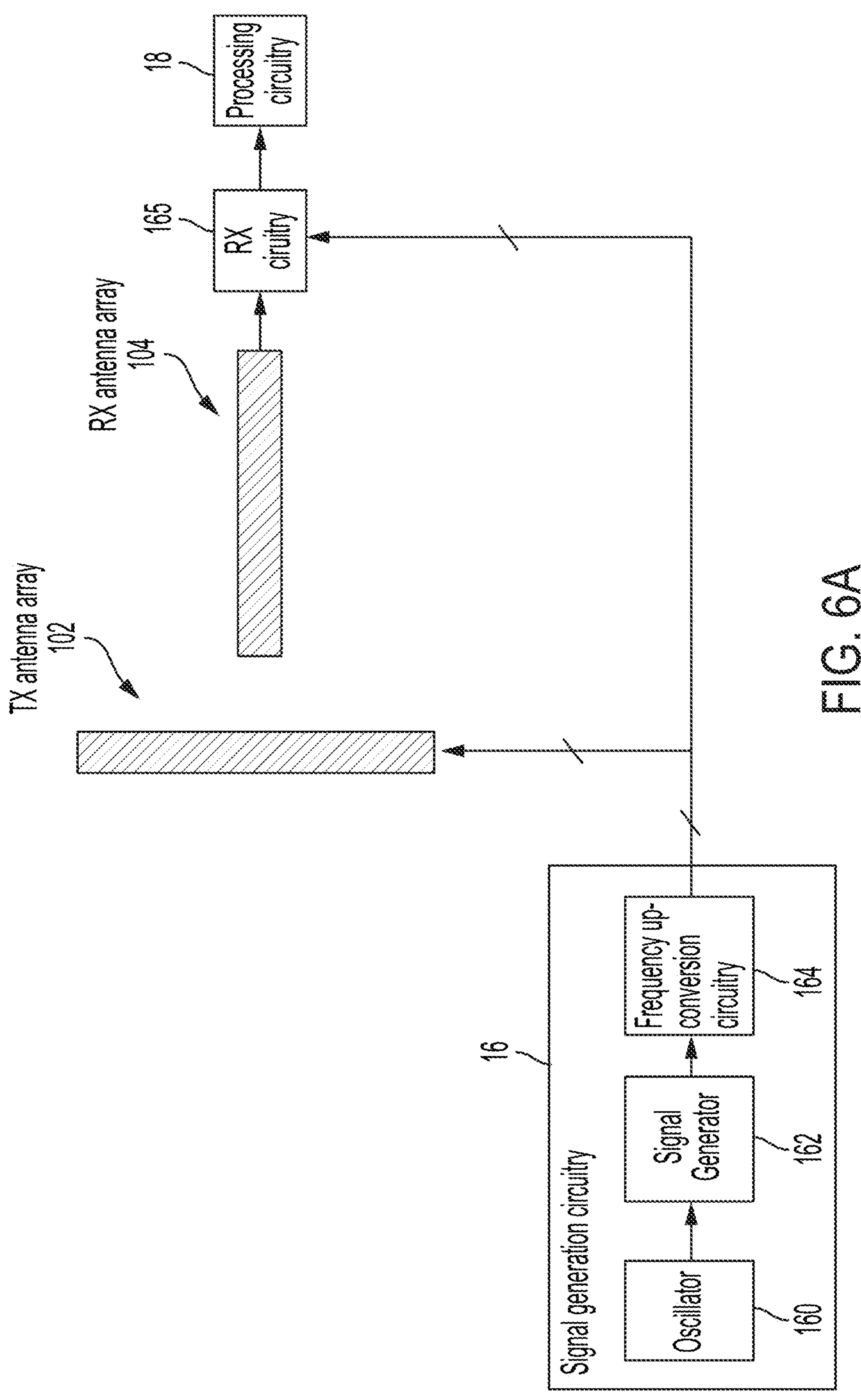
FIG. 6A is a block diagram illustrating a signal generation circuitry, in accordance with some embodiments.

Further, the inventors have appreciated that providing both the transmitter and the receiver with the same reference signal eliminates (or at least reduces) phase noise that may otherwise arise if distinct reference signals were provided to the transmitter and the receiver. In fact, providing the transmitter and the receiver with the same reference signal enables phase coherency. Accordingly, some embodiments relate to signal generation circuits coupled to both the transmitter and the receiver. FIG. 6A illustrates one such system, in accordance with some embodiments. As depicted in this figure, signal generation circuitry 16 is coupled to TX antenna array 102 and receive circuitry 165 (which is further coupled to RX antenna array 104). As described herein, receive circuitry 165 may be configured to frequency down-convert the signals received by RX antenna array 104. The receive circuitry may use the signals generated by frequency up-conversion circuitry 164 to down-convert the received signals. In some embodiments, signal generation circuitry 16 may include an oscillator 160, a signal generator 162 and frequency up-conversion circuitry 164. Signal generation circuitry 16 may be at least in part mounted on substrate 10. For example, oscillator 160 and signal generator 162 may be mounted on substrate 10. Frequency up-conversion circuitry 164 may be mounted on substrate 10 or may be integrated on one or more semiconductor dies. In one example, a portion of frequency up-conversion circuitry 164 is integrated in part on TX die 12 and another portion of frequency up-conversion circuitry is integrated in part on RX die 14.

Oscillator 160 may be configured to generate a first signal. The first signal may be for example a sinusoidal tone oscillating at a carrier frequency between 1 GHz and 20 GHz. For example, the first signal may oscillate at 9.305 GHz or 18.61 GHz. Signal generator 162 may be configured to generate a second signal having a time-varying center frequency (e.g., a chirped signal) by frequency modulating the first signal. Thus, the second signal has a carrier frequency that varies over time. As described herein, the carrier frequency may vary (e.g., increase) linearly or non-linearly. Frequency-up conversion circuitry 164 may be configured to generate a third signal by up-converting the second signal. Thus, the third signal has frequency content that is substantially the same (e.g., the same with the exception of noise) as the frequency content of the second signal, but it translated to a higher frequency band. Frequency up-conversion 164 may be characterized by the frequency multiplication factor, a parameter that determines by how many times a frequency of the second signal is multiplied. The multiplication factor may be for example between 30 and 80 (e.g., 36 or 72). In one example, the frequency up-conversion circuitry may translate the frequency content of the second signal from a frequency of 9.305 GHz to a frequency of 670 GHz (i.e., with a multiplication factor of 72). In another example, the frequency up-conversion circuitry may translate the frequency content of the second signal from a frequency of 18.61 GHz to a frequency of 670 GHz (i.e., with a multiplication factor of 36). The third signal is delivered to the various antennas of TX antenna array 102 and to the various antennas of RX antenna array 104. In this way, phase noise may be reduced.

Figure 6B:
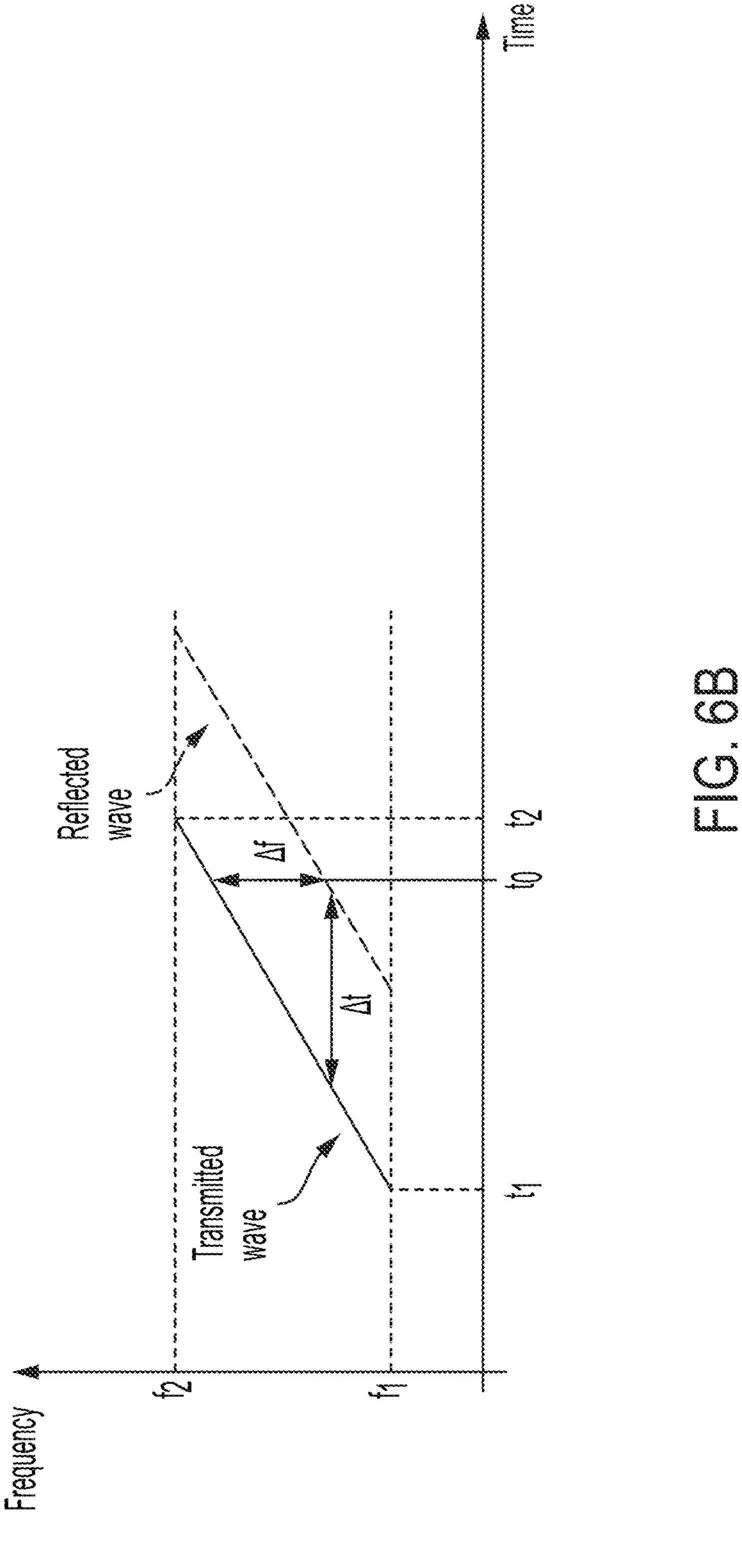
FIG. 6B is a plot illustrating the frequency of a signal as a function of time, in accordance with some embodiments of the technology described herein.

FIG. 6B is a plot illustrating how the frequencies of an RF signal and the corresponding reflection may vary over time, in accordance with some embodiments. In this example, the signals have frequencies that vary according to a linear ramp. This may be the result of the signal generator 162 modulating the frequency of the first signal by a linear ramp. The solid line represents the transmitted signal, and the dashed line represents the reflected signal at the receiver. The frequency of the transmitted signal varies from frequency $f_1$ at time $t_1$ to frequency $f_2$ at time $t_2$. Thus, the bandwidth of the transmitted signal is $f_2$-$f_1$. In some embodiments, $f_1$ may be 650 GHz, 655 GHZ, 660 GHz or 665 GHz, for example. In some embodiments, $f_2$ may be 690 GHz, 685 GHZ, 680 GHz or 675 GHz, for example. The frequency of the reflected signal mirrors the frequency of the transmitted signal with a delay Δt. The delay is equal to the time it takes the transmitted signal to do a round trip upon hitting a target object. Thus, delay Δt quantifies the distance to the target object. Delay Δt can be obtained by determining the difference between the frequencies (Δf) of the signals at a certain time to. Because the chirp is linear, delay Δt is given by frequency difference Δf divided by the slope of the linear ramp. In some embodiments, Δf may be 6 GHz, 10 GHZ, 20 GHz, 30 GHz, 40 GHz, 50 GHz, 60 GHz, 80 GHz, 100 GHz, 120 GHz, or 134 GHz, for example.

Figure 6C:
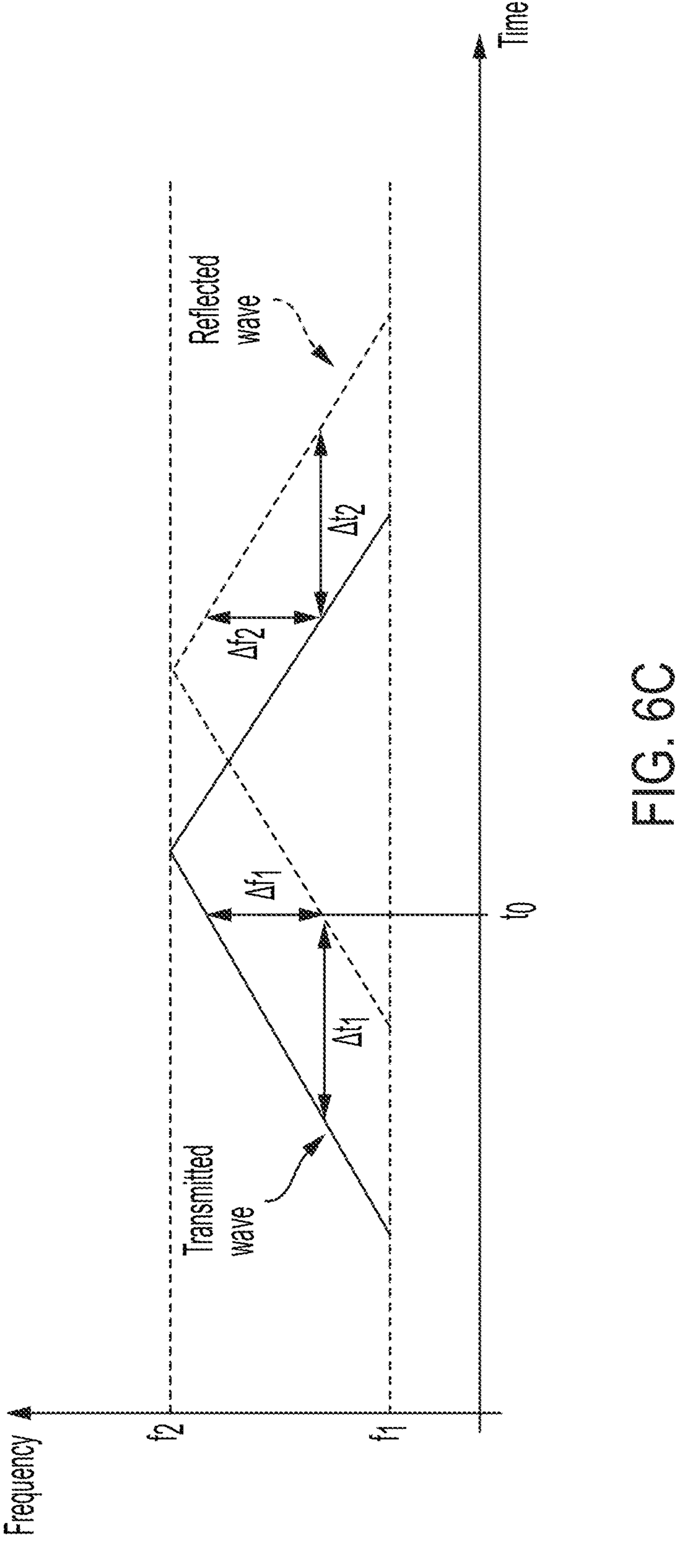
FIG. 6C is a plot illustrating the frequency of another signal as a function of time, in accordance with some embodiments of the technology described herein.

FIG. 6C is a plot illustrating a signal including two linear ramps, in accordance with some embodiments. In this example, the first linear ramp is sloped in the upwards direction (thus forming an up-ramp) and the second linear ramp is sloped in the downwards direction (thus forming a down-ramp). This chirped signal allows the active sensing system to take two distinct measurements, one for each ramp. The first measurement ($\Delta t_1$) quantifies the initial distance to the target object, the second measurement ($\Delta t_2$) quantifies the final distance to the target object. The two measurements can be used to quantify the velocity of the target object.

Figure 6D:
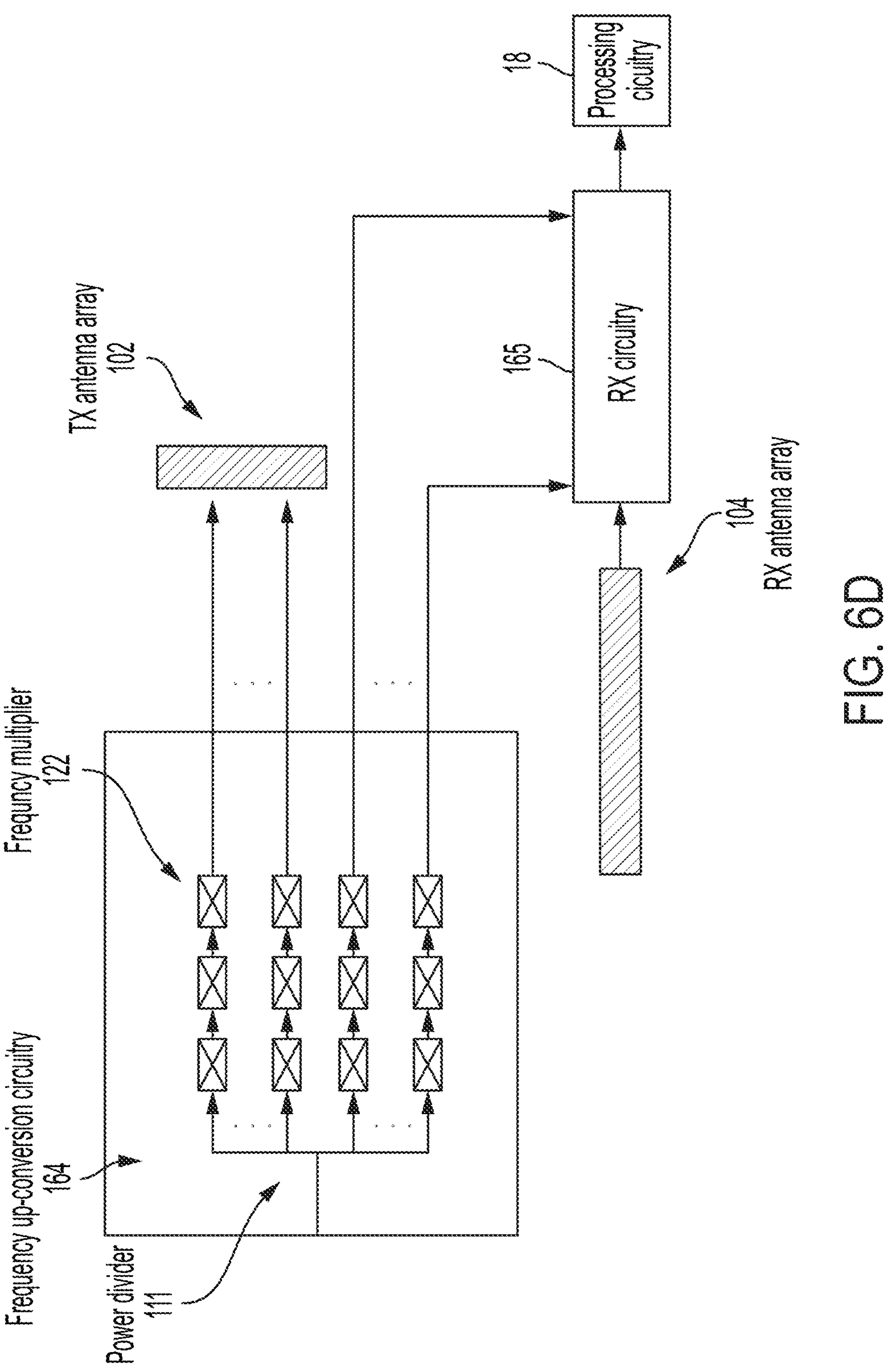
FIG. 6D is a block diagram illustrating frequency up-conversion circuitry, in accordance with some embodiments.

FIG. 6D depicts a frequency up-conversion circuitry 164 in additional detail, in accordance with some embodiments. In this example, frequency up-conversion circuitry 164 includes a power divider 111 and a plurality of frequency multipliers 122. Power divider 111 couples the second signal to the various frequency multipliers. The frequency multipliers are arranged in channels. Each channel couples a branch of the power divider to a corresponding antenna of the TX antenna array 102 or to a corresponding channel of the RX receive circuitry 165 and includes multiple frequency multipliers. Each frequency multiplier multiplies the frequencies of the input signal by a predetermined amount. Thus, the frequency up-conversion is performed in stages. In some embodiments, the frequency multipliers associated to the TX antenna arrays provide the same multiplication factors as the frequency multipliers associated to the RX antenna arrays.

The frequency multipliers may include harmonic frequency multipliers. A harmonic frequency multiplier may produce a frequency that is a harmonic of an input frequency. In one example, each channel includes three harmonic frequency multipliers having the following multiplication factors: 3, 4, 3 (not necessarily in this order). Therefore, the overall multiplication factor is 36. These frequency multipliers may produce a frequency of 670 GHZ from a frequency of 18.61 GHz. In another example, a channel includes four harmonic frequency multipliers having the following multiplication factors: 3, 4, 3, 2 (not necessarily in this order). Therefore, the overall multiplication factor is 72. These frequency multipliers may produce a frequency of 670 GHz from a frequency of 9.305 GHz. In some embodiments, the frequency multipliers are mounted on substrate 10. In some embodiments, the frequency multipliers coupled to TX antenna array 102 are integrated on TX die 12 and the frequency multipliers coupled to RX antenna array 104 are integrated on RX die 14.

E. Link Budget

As described herein, the atmospheric loss present in the Terahertz band can be quite severe. The architectures described herein enable accurate Terahertz-based sensing systems despite the atmospheric loss. The maximum distance at which the system can sense target objects with an acceptable accuracy is determined by several factors, including the relative humidity, the nature of the target object being detected and the signal-to-noise ratio (SNR) requirement. In general, the higher the humidity, the higher the atmospheric loss, and as a result, the lower maximum the distance at which the system can sense target objects. As an example, at 670 GHz, a 60% humidity leads to a 100 dB/km atmospheric loss, an 80% humidity leads to a 200 dB/km atmospheric loss, and a 100% humidity leads to a 250 dB/km atmospheric loss.

The nature of the target object affects the performance of the system because different target objects can reflect more or less energy when hit by a Terahertz signal. Conductive surfaces tend to be more reflective than non-conductive surfaces. Larger target objects tend to reflect more power than smaller target objects because they have larger cross sections. The angle at which the signal hits the target can also have an effect. RADAR cross section (RCS) is a parameter that quantifies the degree to which a target object is detectable through ranging. A larger RCS indicates that a target object is easier to detect. Across a wide range of frequencies, including for example at 670 GHz, the typical RCS of a person is approximately 0 dBsm and the typical RCS of a car of average size is 10 dBsm. In other words, a car is ten times more reflective than a person.

The SNR requirement is a measure of the minimum SNR at which the system can determine the relative and/or absolute state (e.g., position, velocity, and/or acceleration) with an acceptable accuracy. The SNR requirement of a system depends on several parameters, including the power emitted by the transmitter, the sensitivity of the receiver, the size of the receiver's aperture and the temperature of the receiver. Here, an SNR requirement of 13.4 dB is provided. In some embodiments, the SNR requirement may be between 10 and 15 dB.

Figure 7A:
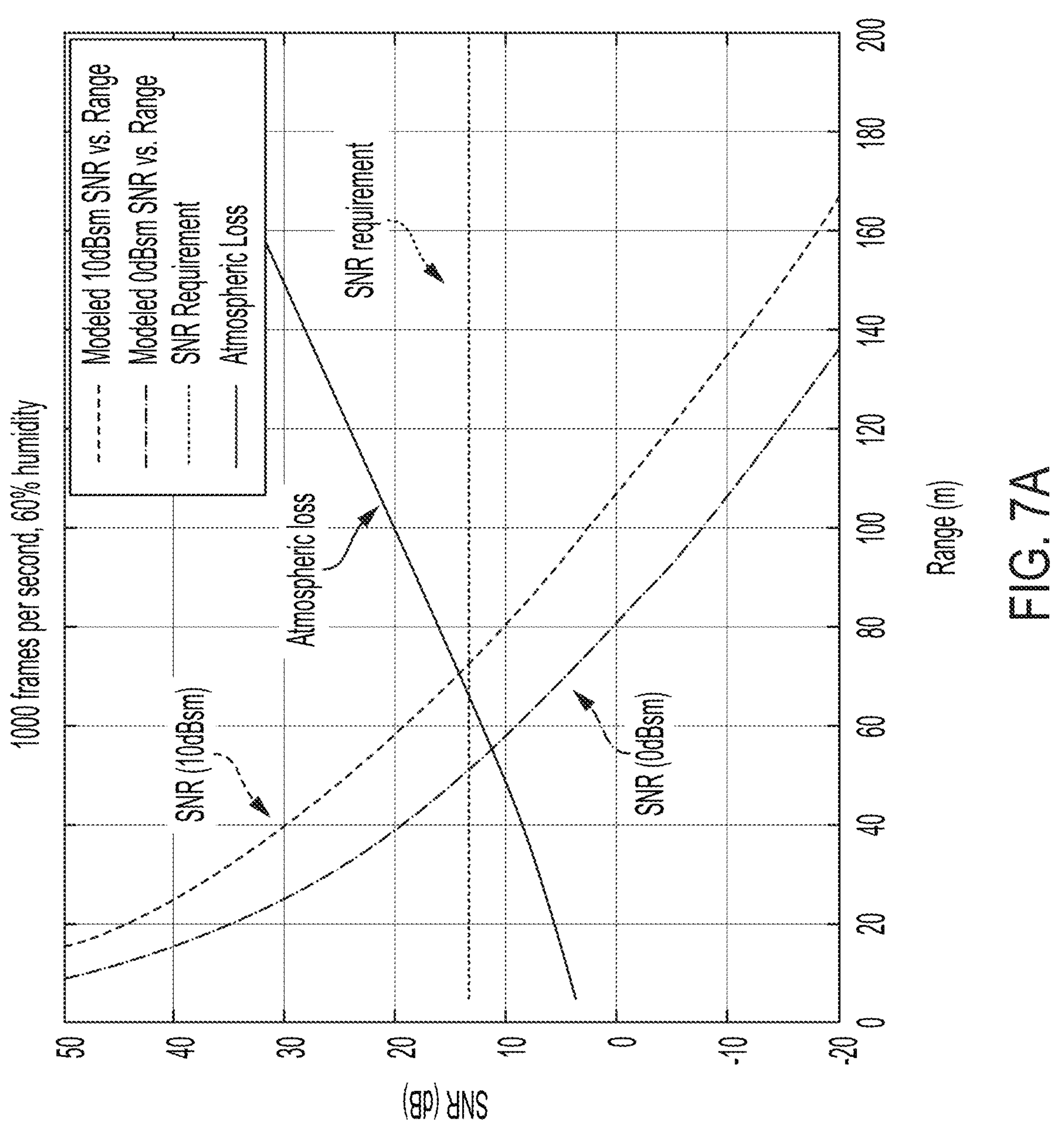
FIGS. 7A-7F are plots illustrating signal-to-noise ratio (SNR) as a function of range, in accordance with some embodiments of the technology described herein.
Figure 7B:
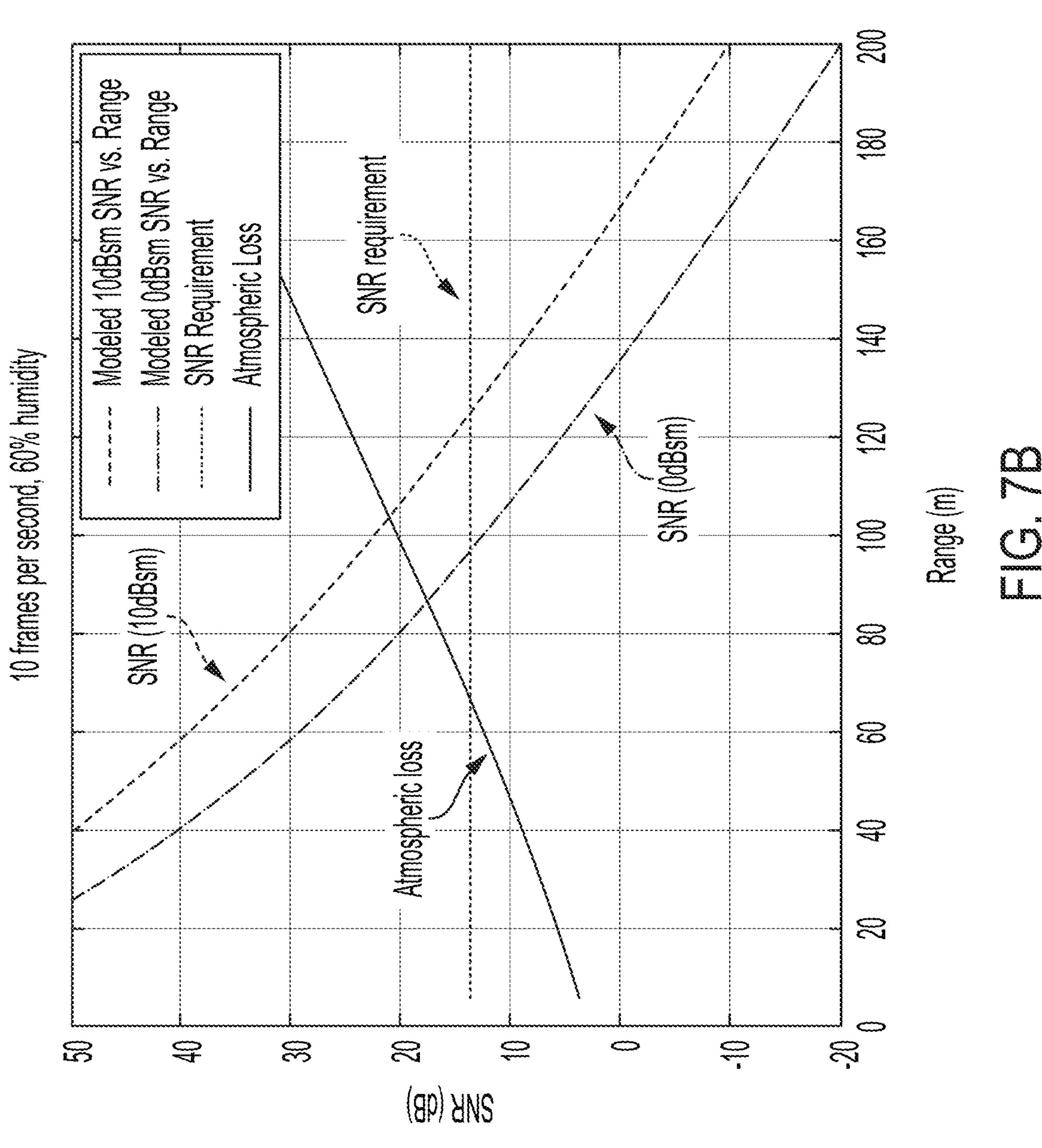
Figure 7C:
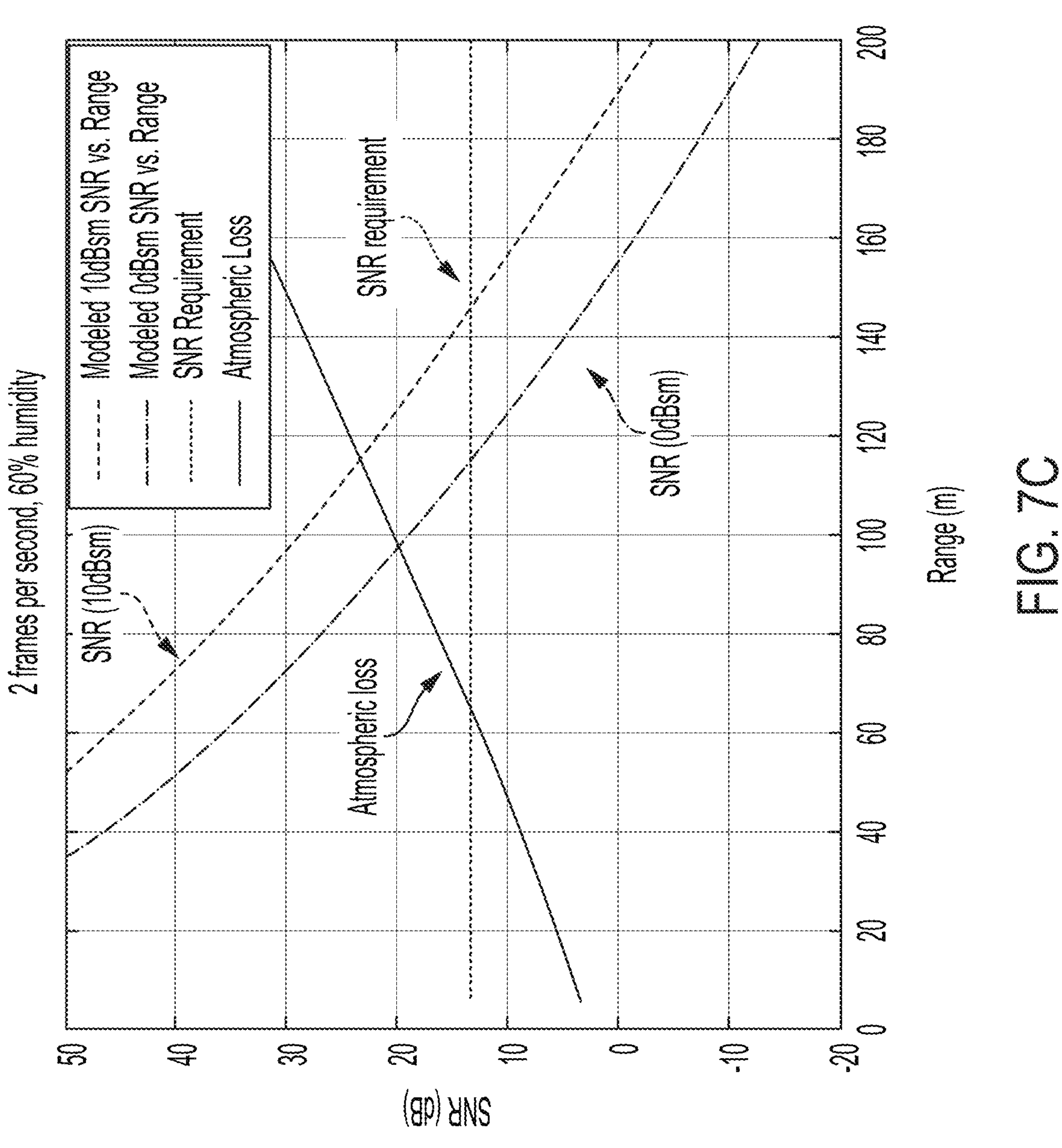

FIGS. 7A-7C are plots illustrating the SNR of the system as a function of range (relative to the target) at a 60% humidity. In these examples, each transmitter transmits 1.75 dBm of power (or more generally, between 0.5 dBm and 2 dBm), and each RX antenna has a gain of 5 dB (or more generally, between 3 dB and 20 dB). The noise figure (NF) of the receiver is 30 dB. The difference between the plots of FIGS. 7A-7C lies in the number of frames per second. In FIG. 7A, sensing is performed at a rate of 1000 frames per second (fps). In FIG. 7B, sensing is performed at 10 frames per second, meaning with 100 fps-coherent integration. In FIG. 7C, sensing is performed at 2 frames per second, meaning with 500 fps-coherent integration. Each plot illustrates the SNR requirement (which is set to 13.4 dB, which in turn would yield a probability of detection of 95% and a probability of false alarm of 0.000001%), the SNR corresponding to a signal reflected by a car (10 dBsm), the SNR corresponding to a signal reflected by a person, and the atmospheric loss at a 60% humidity. It should be noted that the main factor for which the SNRs corresponding to the reflected signals degrade with increasing range is atmospheric loss. In FIG. 7A, the SNR corresponding to the signal reflected by the car crosses the SNR requirement at 73 m. Thus, the maximum distance at which the system can sense target objects under these circumstances is 73 m. Further, the SNR corresponding to the signal reflected by the person crosses the SNR requirement at 50 m. Thus, the maximum distance at which the system can sense target objects under these circumstances is 50 m. As expected, the system can range cars farther than it can ranges pedestrians. In FIG. 7B, the SNR corresponding to the signal reflected by the car crosses the SNR requirement at 126 m and the SNR corresponding to the signal reflected by the person crosses the SNR requirement at 97 m. The maximum range increases from FIG. 7A to FIG. 7B thanks to the reduced frame rate. Lastly, in FIG. 7C, the SNR corresponding to the signal reflected by the car crosses the SNR requirement at 147 m and the SNR corresponding to the signal reflected by the person crosses the SNR requirement at 117 m. Again, the maximum range increases because the frame rate is further reduced.

Figure 7D:
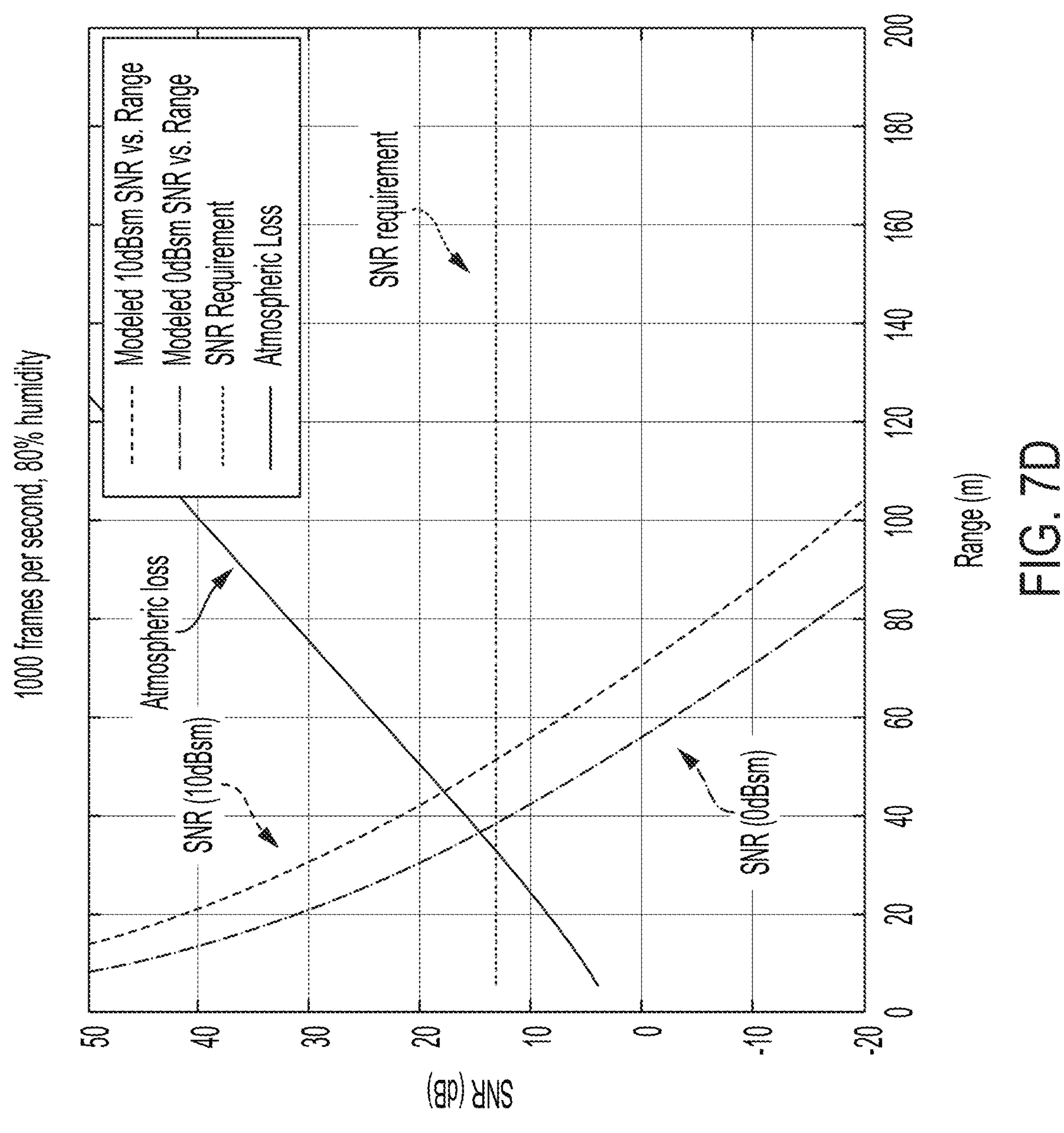
Figure 7E:
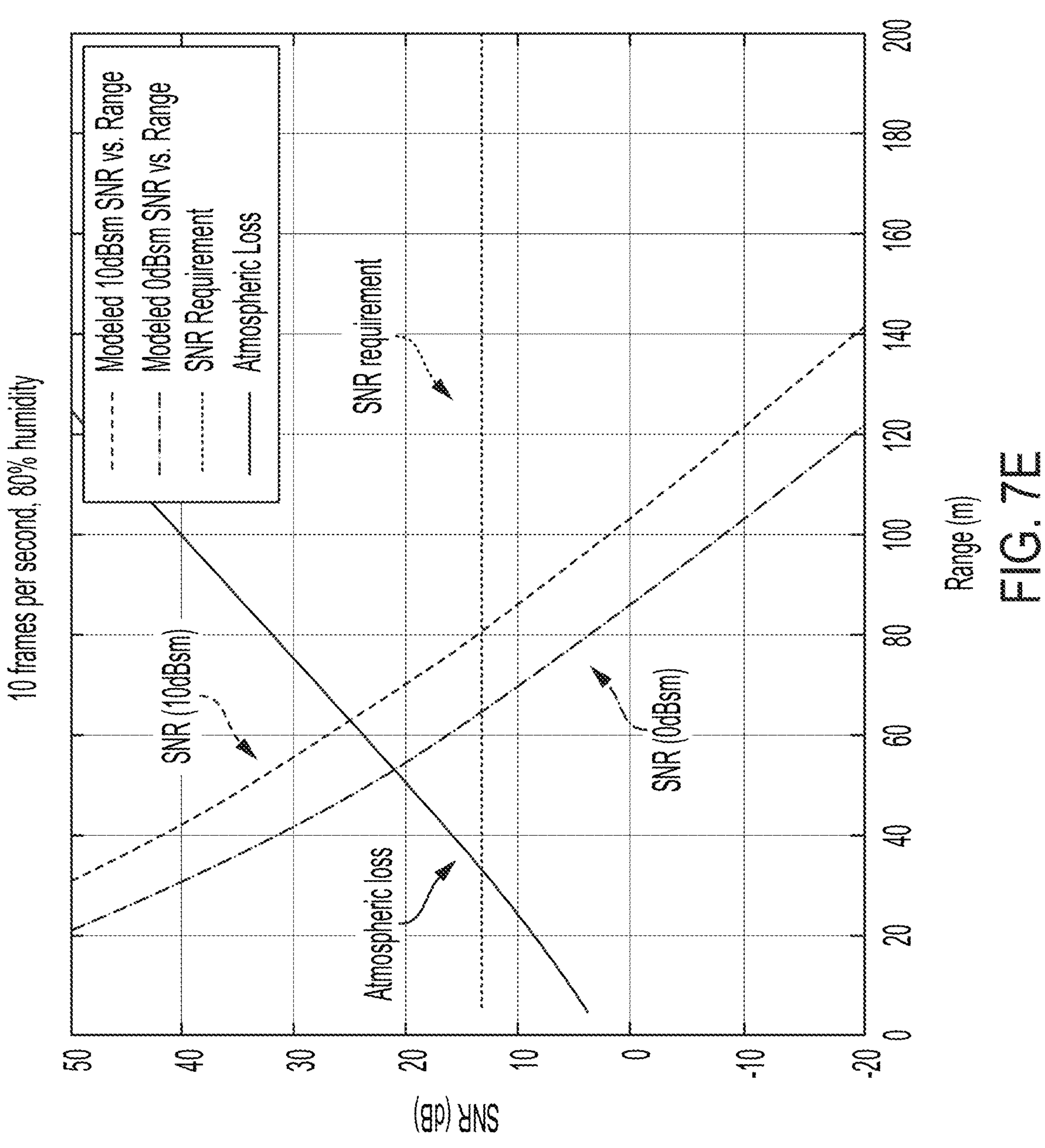
Figure 7F:
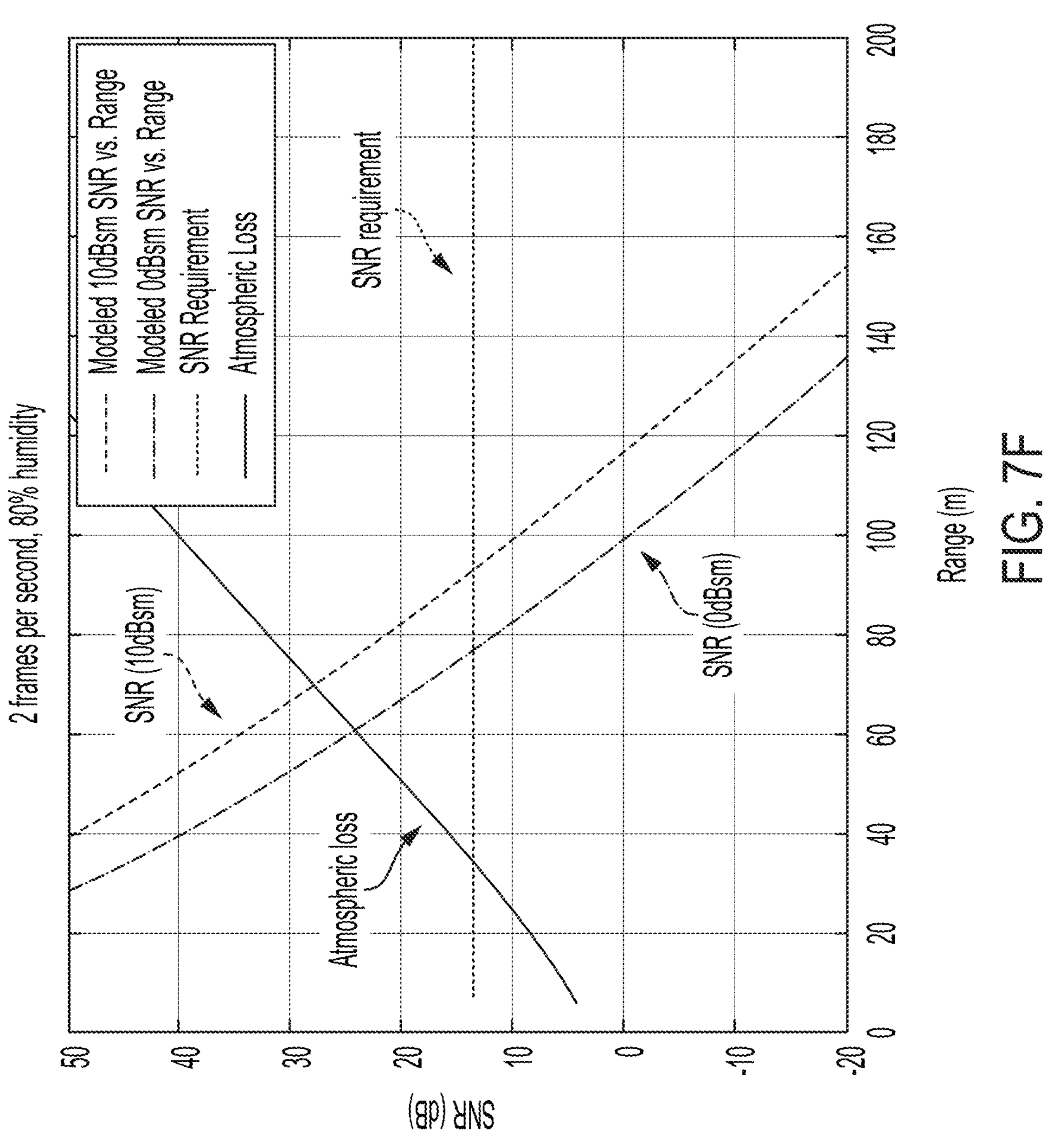

FIGS. 7D-7F are similar plots, but here the humidity is 80% instead of 60%. As expected, the SNR decreases relative to the previous case. In FIG. 7D (corresponding to 1000 fps), the SNR corresponding to the signal reflected by the car crosses the SNR requirement at 51 m and the SNR corresponding to the signal reflected by the person crosses the SNR requirement at 31 m. In FIG. 7E (corresponding to 10 fps), the SNR corresponding to the signal reflected by the car crosses the SNR requirement at 82 m and the SNR corresponding to the signal reflected by the person crosses the SNR requirement at 65 m. In FIG. 7F (corresponding to 2 fps), the SNR corresponding to the signal reflected by the car crosses the SNR requirement at 93 m and the SNR corresponding to the signal reflected by the person crosses the SNR requirement at 76 m.

F. Terahertz Transmitters

Figure 8A:
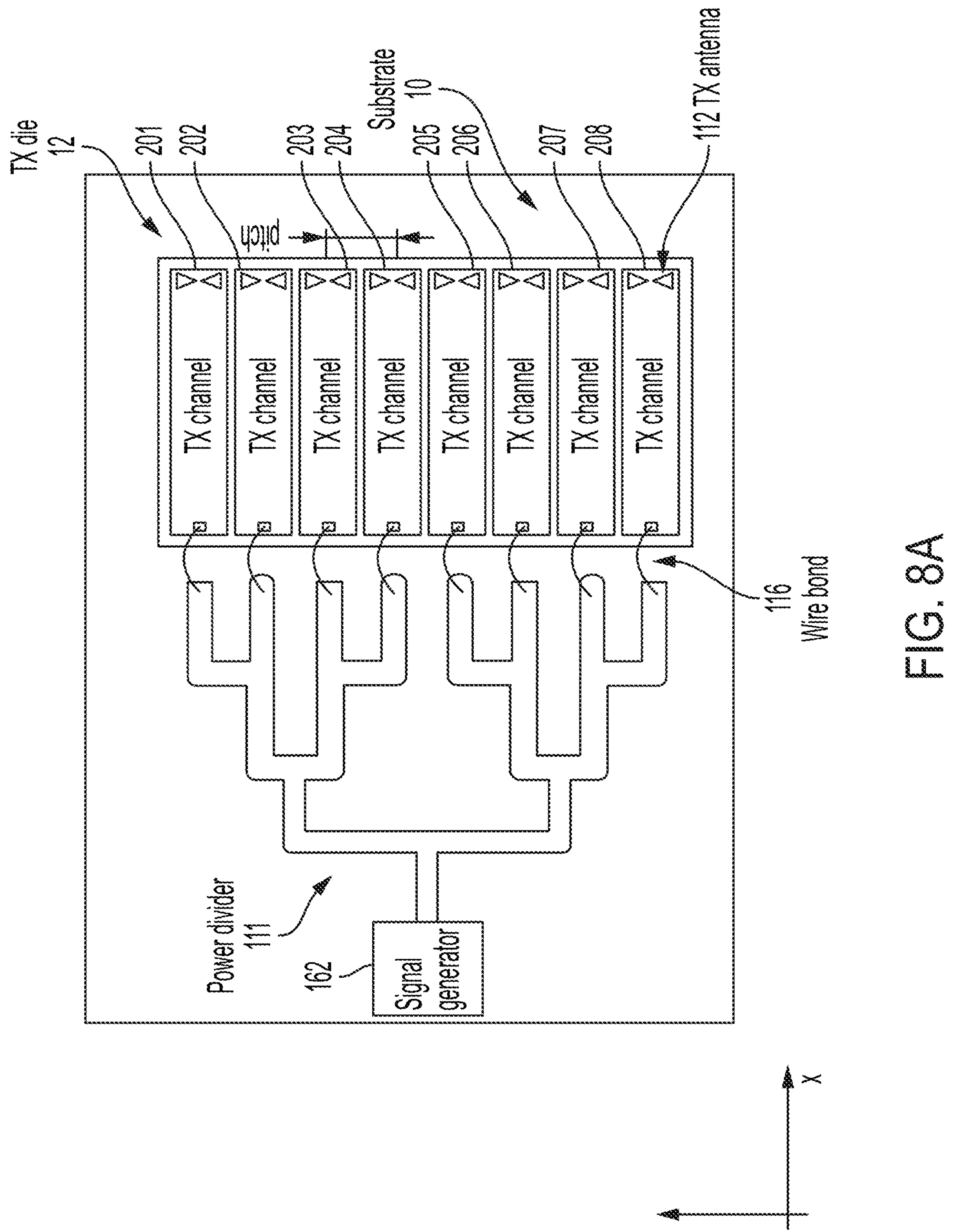
FIG. 8A is a schematic diagram illustrating a substrate including a plurality of transmit channels, in accordance with some embodiments of the technology described herein.

FIG. 8A illustrates an example of Terahertz transmitter circuitry, in accordance with some embodiments. Signal generator 162 is configured to generate a signal with a time-varying center frequency, as described herein. Power divider 111 couples signal generator 162 to TX die 12. In some embodiments, power divider 111 is defined by conductive traces patterned on substrate 10. Wire bonds 116 connect the ends of the power divider 111 to the various channels of TX die 12. In some embodiments, power divider 111 may be designed so that the channels receive copies of the signal having the same phases. For example, the traces may all have the same lengths, or may have lengths engineered to compensate for known phase changes. This may ensure that the Terahertz signals emitted by the individual antennas are in-phase, thereby maximizing the emitted power. In some embodiments, power divider 111 includes a Wilkinson power divider.

In the example of FIG. 8A, TX die 12 includes eight TX channels (201-208), though any other suitable number of channels is possible. Each channel delivers the signal received from the power divider 111 to a respective TX antenna 112. In this example, TX antennas 112 are implemented as dipole antennas, though other antenna types are also possible (including for example patch antennas and slot antennas). Each TX antenna 112 may be separated from the adjacent antennas by a distance selected to cause in-phase emission. For example, the pitch of the antenna array may be $\lambda/2$ (or odd multiples of $\lambda/2$), where $\lambda$ is the wavelength corresponding to the primary (e.g., the center) frequency of emission. Other pitches are also possible.

Figure 8B:
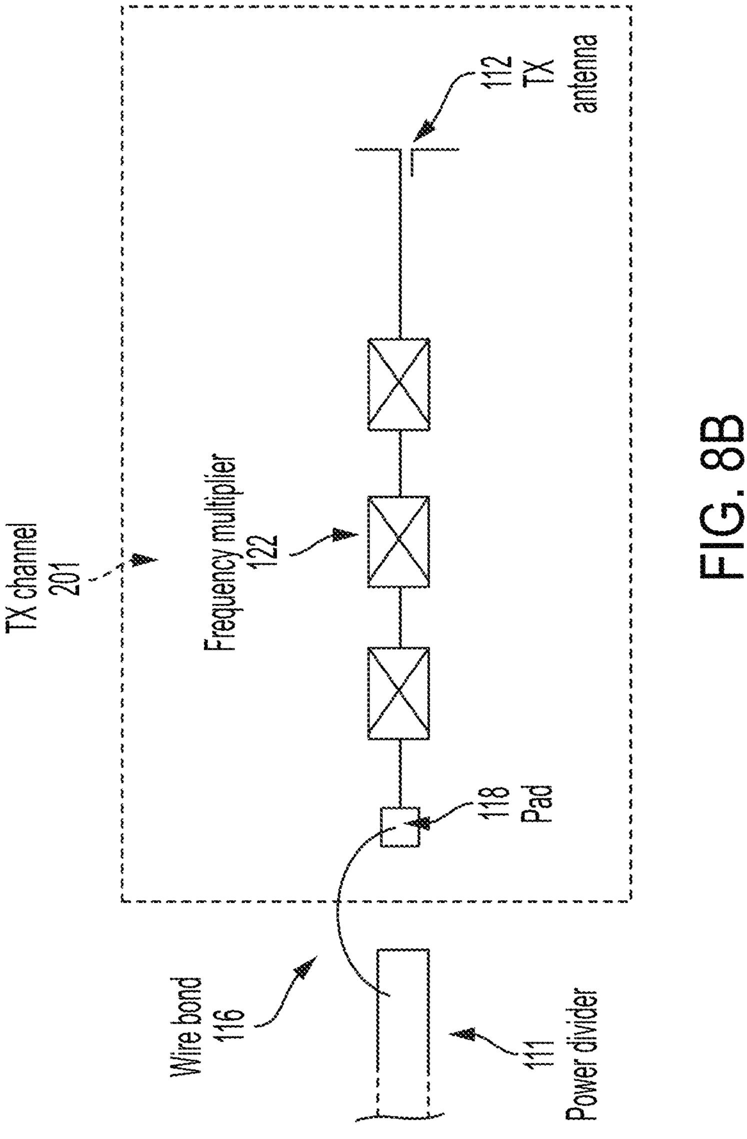
FIGS. 8B-8E are block diagrams illustrating various implementations for the transmit channels of FIG. 8A, in accordance with some embodiments of the technology described herein.

FIGS. 8B-8E illustrate example implementations of the channels of TX die 12, in accordance with some embodiments. In the implementation of FIG. 8B, TX channel 201 includes a pad 118, a plurality of frequency multipliers 122 and a TX antenna 112 (a dipole in this example). Wire bond 116 has one end connected to a branch of power divider 111 and one end connected to pad 118. Each frequency multiplier has a multiplication factor. The multiplication factors of the various frequency multipliers may be equal or different. In one example, there are three frequency multipliers having the following multiplication factors: 3, 4, 3 (not necessarily in this order). In another example, there are four frequency multipliers having the following multiplication factors: 3, 4, 3, 2 (not necessarily in this order). Other configurations are possible.

Figure 9:
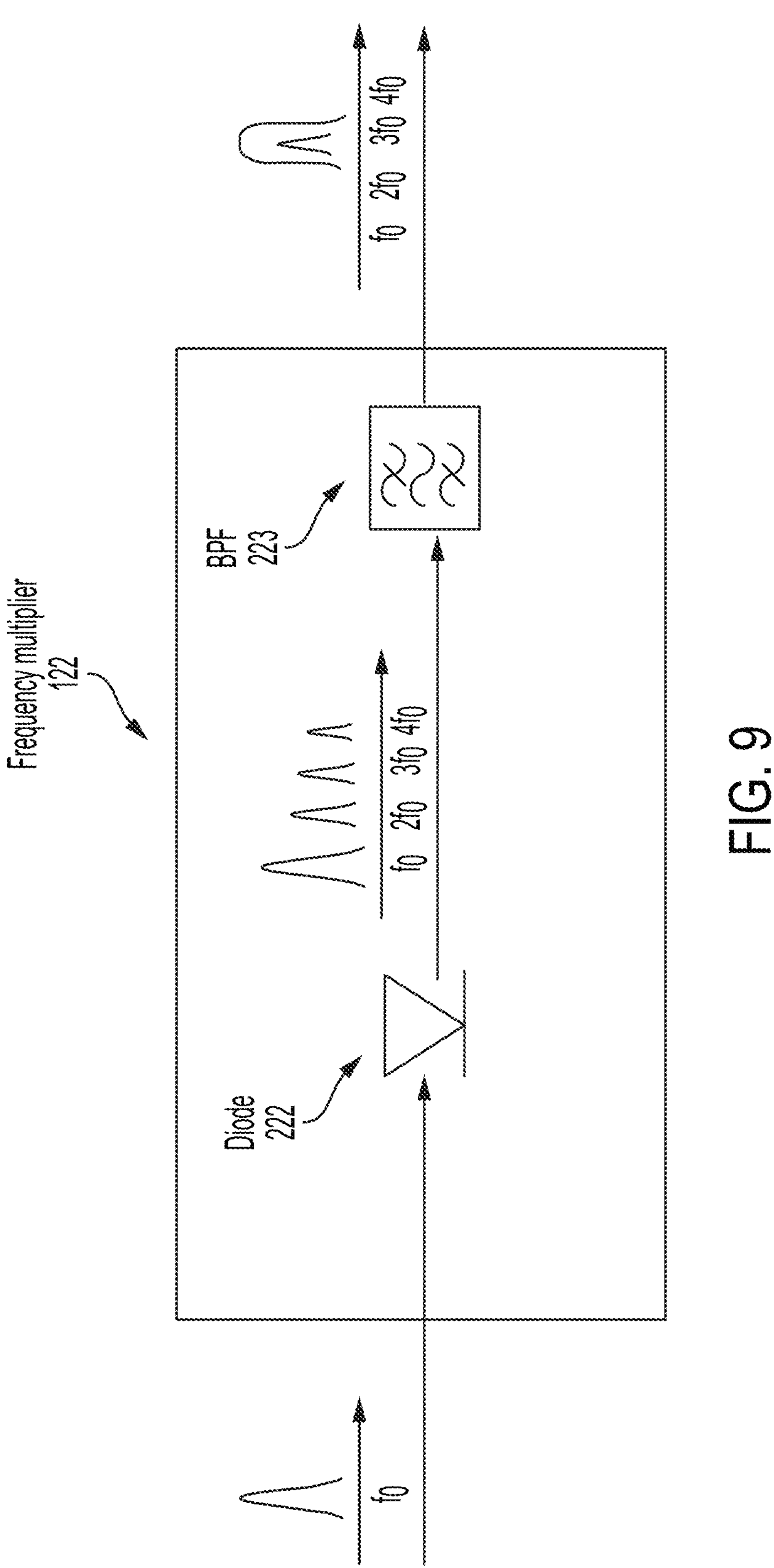
FIG. 9 is a block diagram illustrating a frequency multiplier, in accordance with some embodiments of the technology described herein.

The frequency multipliers may be implemented in any of numerous ways. In some embodiments, a frequency multiplier may include a non-linear circuit (e.g., one or more diodes) configured to generate one or more harmonics of the input frequency. FIG. 9 illustrates an example implementation of a frequency multiplier, in accordance with some embodiments. This frequency multiplier includes a diode 222 and a band-pass filter 223. Diode 222 receives a signal having a center frequency $f_0$, and produces multiple harmonics of the input signal (e.g., $2f_0$, $3f_0$, $4f_0$, etc.). Bandpass filter (BPF) 223 has a frequency bandpass response centered around the harmonic of interest. For example, a frequency multiplier configured to produce a ×3 multiplication factor includes a BPF having a response centered around $3f_0$. In other embodiments, the BPF may be omitted, and the diode (or other non-linear circuits) may be engineered to amplify the harmonic of interest and/or to attenuate the other harmonics. Transistor-based frequency multipliers are also possible.

Figure 8C:
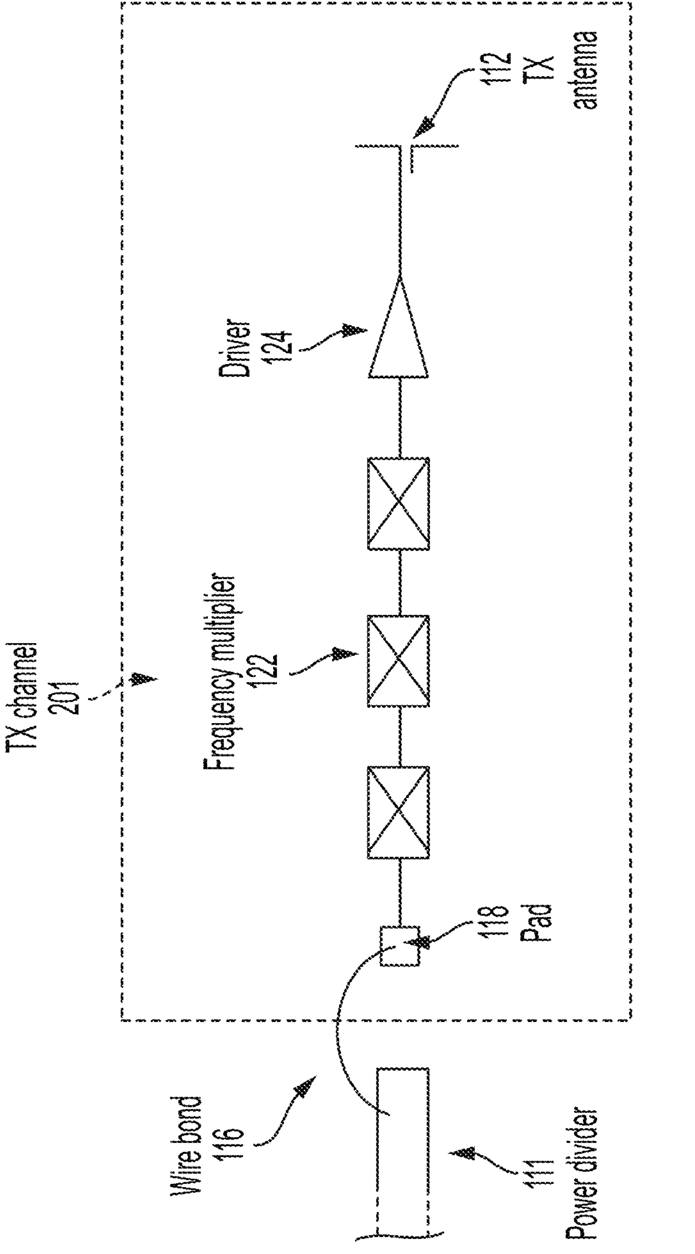
Figure 8D:
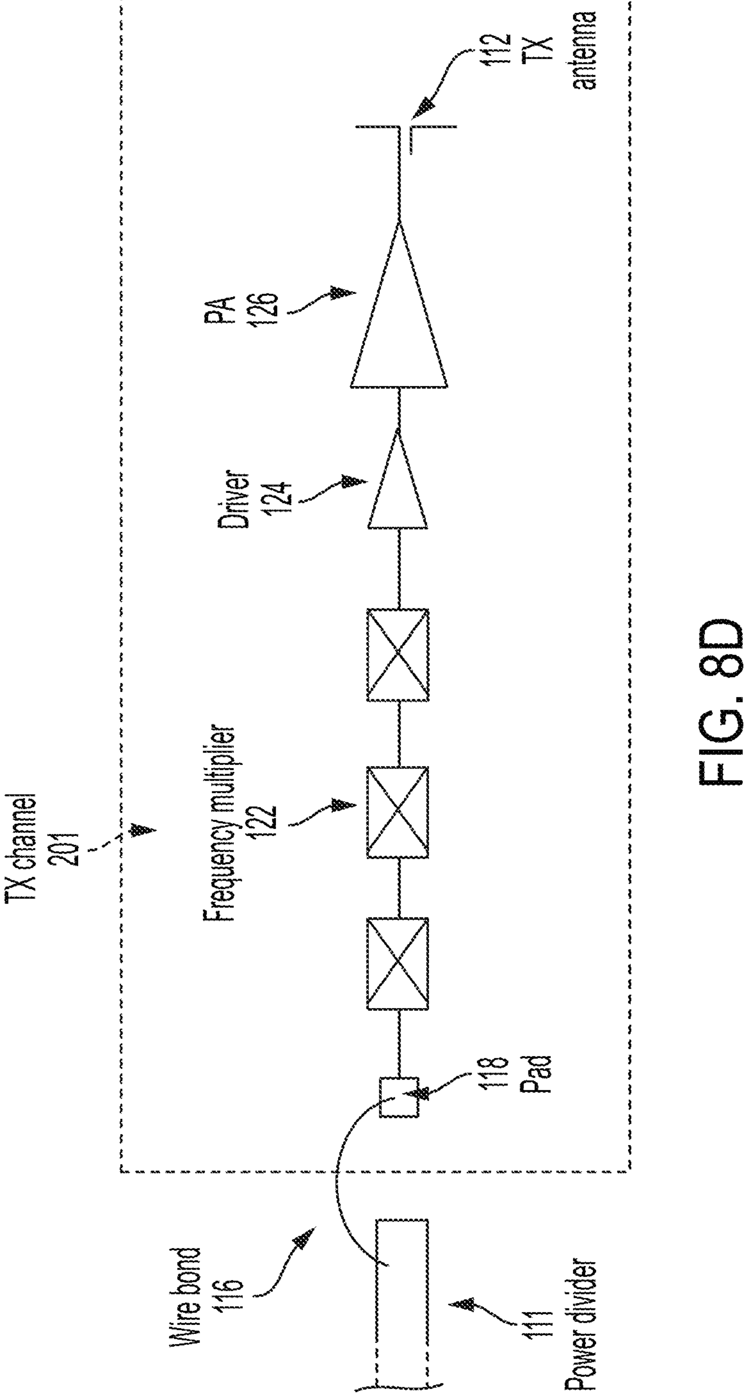
Figure 8E:
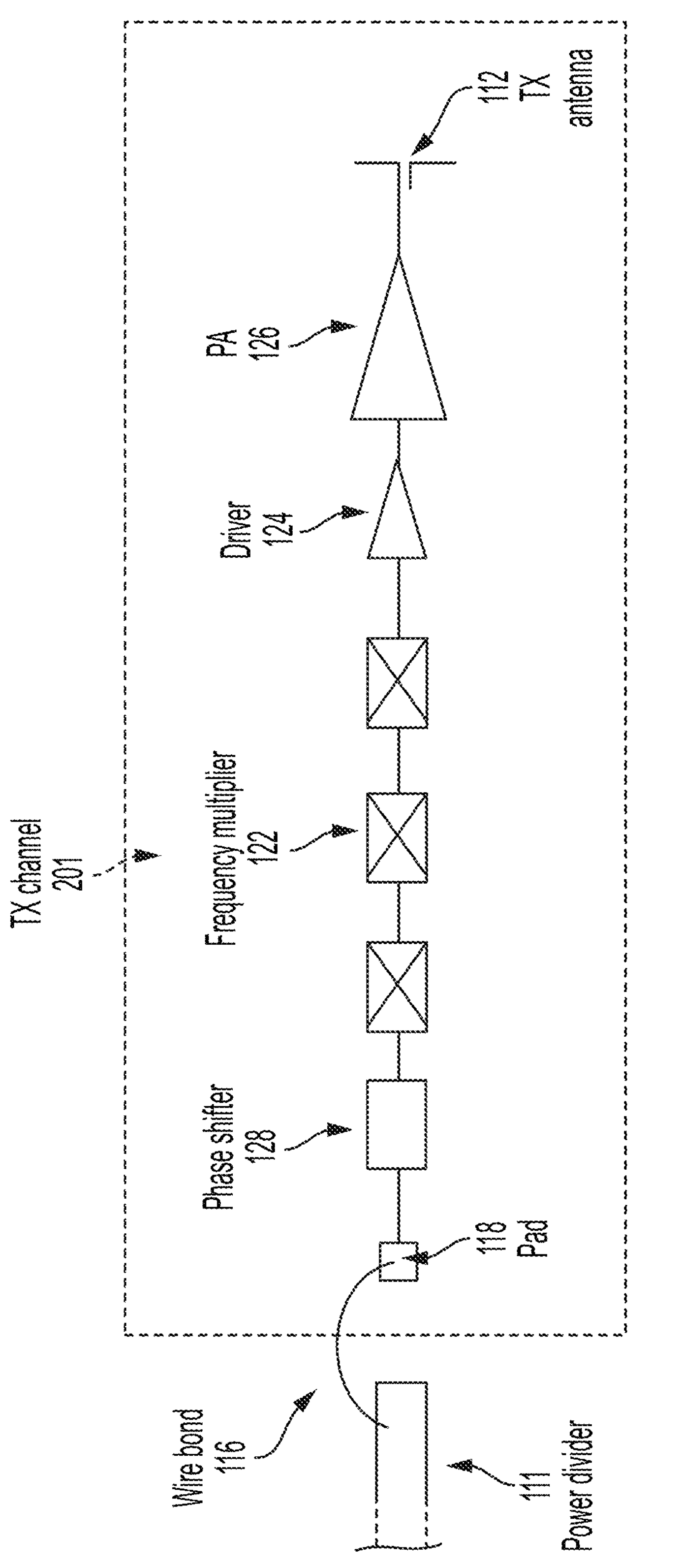

Referring back to FIG. 8B, the output of the last frequency multiplier is provided to TX antenna 112. The channel implementation of FIG. 8C is similar to the implementation of FIG. 8B but it further includes a driver 124 between the frequency multipliers and TX antenna 112. Driver 124 may include, for example, a current driver and/or a buffer. The channel implementation of FIG. 8D is similar to the implementation of FIG. 7C but it further includes a power amplifier (PA) 126 between the frequency multipliers and TX antenna 112. In other embodiments, a TX channel may include a PA 126 but not include a driver 124. Lastly, the channel implementation of FIG. 8E is similar to the implementation of FIG. 8D but it further includes a phase shifter 128 between pad 118 and the frequency multipliers. In some embodiments, phase shifters 128 may be controlled to compensate for any phase changes arising among the various TX channels. Additionally, or alternatively, phase shifters 128 may be used to drive the antennas as a phased array. For example, the phase shifters may drive the antennas with a linear phase shift across the array to cause the antennas to emit the signal at an angle relative to the z-axis in the vertical axis. Further, by varying the phase shifts periodically, the emerging signal may be swept up and down, thus allowing the active sensing system to scan the vertical axis for target objects. Driver 124 and/or PA 126 may be omitted from the channel implementation of FIG. 8E, in some embodiments.

G. Terahertz Receivers

Figure 10A:
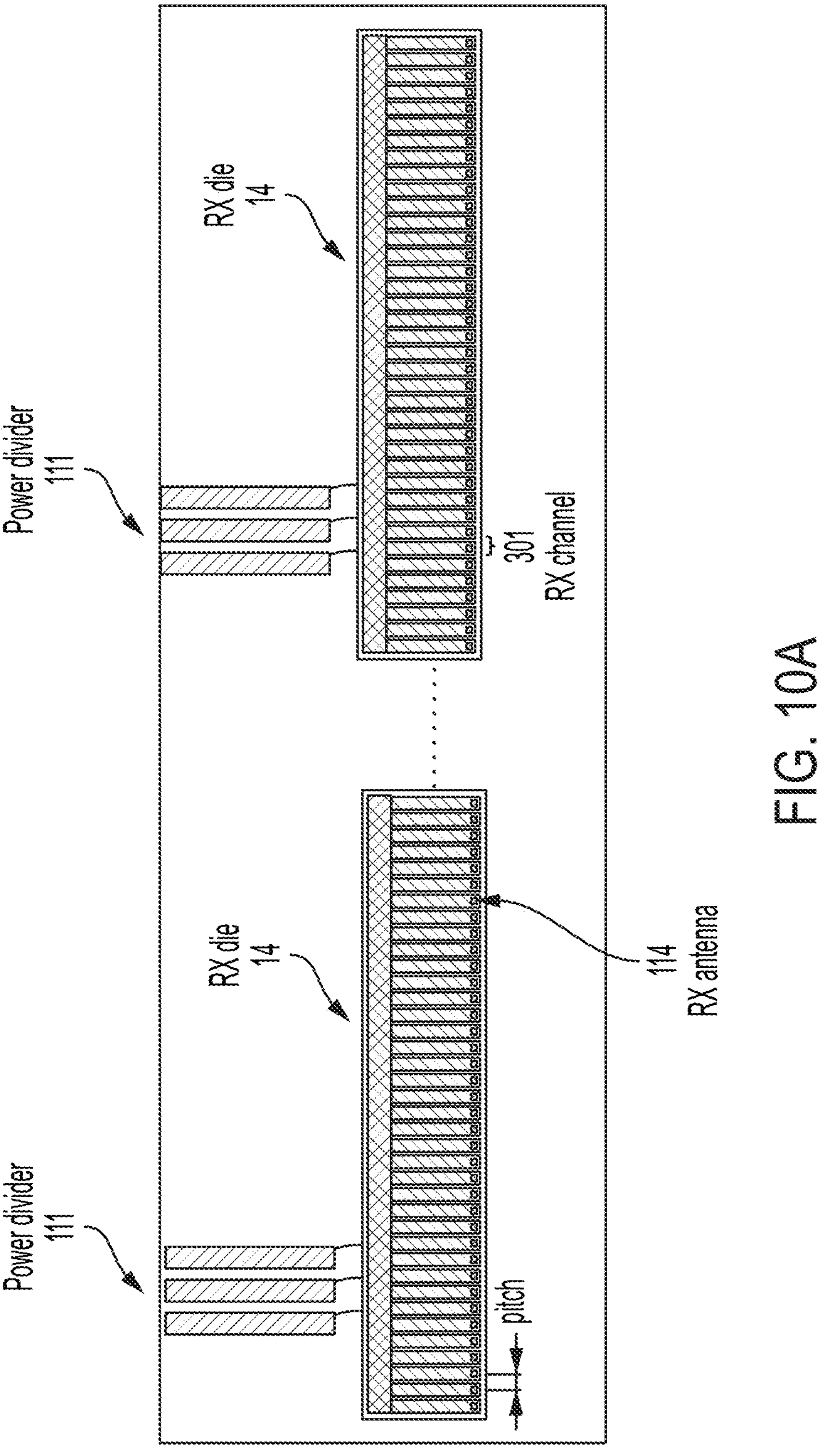
FIG. 10A is a schematic diagram of a substrate including a plurality of receive antenna arrays, in accordance with some embodiments of the technology described herein.

FIG. 10A illustrates a portion of substrate 10 including RX dies 14, in accordance with some embodiments. The RX dies 14 include receive circuitry 165 having multiple RX channels (e.g., RX channel 301). An RX die may include, for example, 128 channels, 256 channels, 512 channels, etc. (or another number, whether or not a power of 2). In some embodiments, an RX die may include more than 200 channels. Each channel includes an RX antenna 114, and the antennas be separated from each other by a λ/2 pitch (or odd multiples of λ/2), among other possible values. Further, each channel receives a copy of the chirped signal through a respective branch of the power divider 111. At each channel, the received signal is mixed with the chirped signal.

Figure 10B:
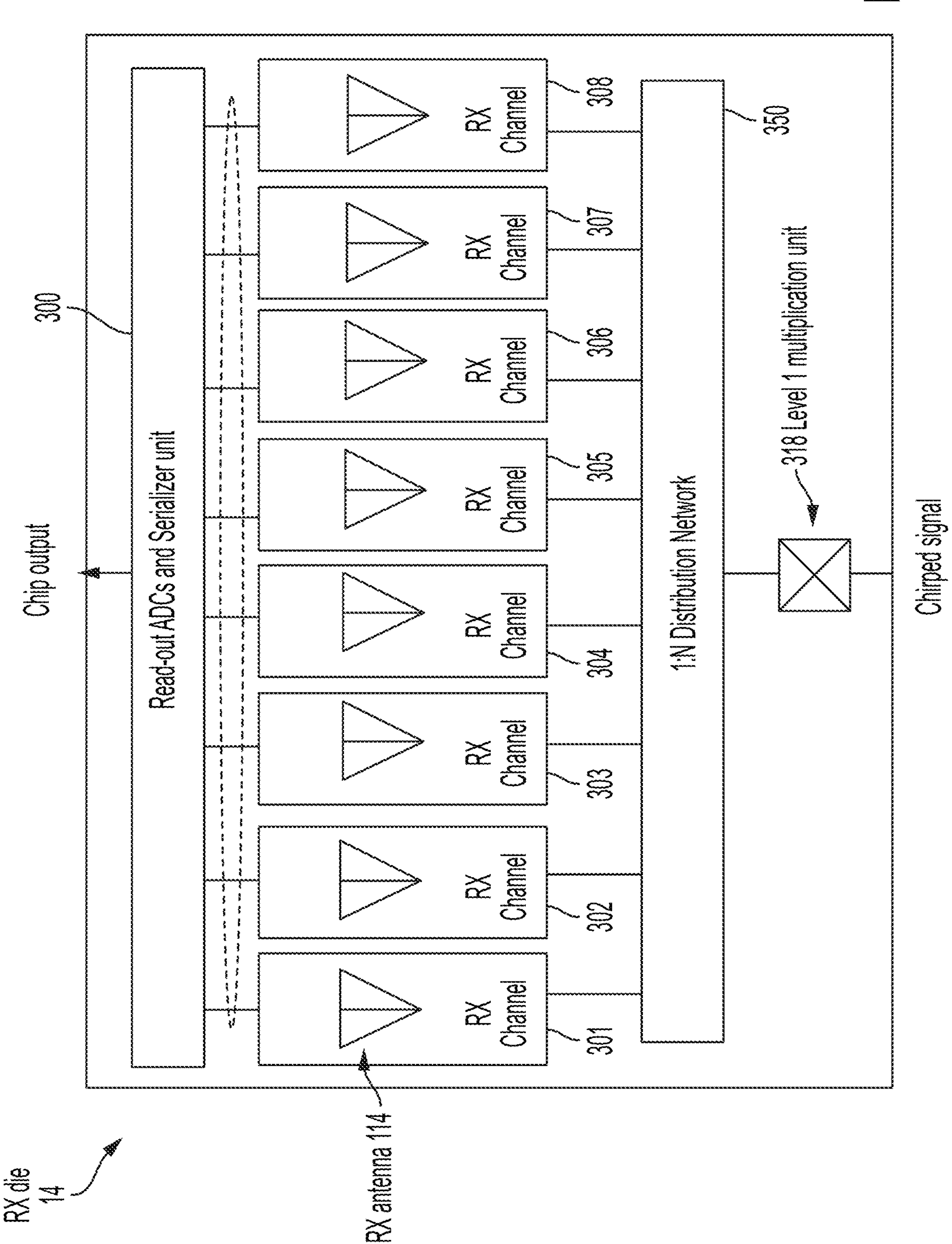
FIGS. 10B-10D are schematic diagrams illustrating receive antenna dies including distribution networks, in accordance with some embodiments of the technology described herein.

In some embodiments, the chirped signal may be up-converted to the frequency of the received signal in multiple stages. A first frequency multiplication stage may be positioned upstream from a distribution network, and a second stage may be positioned downstream from the distribution network. Relative to architectures in which the frequency is up-converted in a single stage (whether upstream or downstream from a distribution network), up-converting the chirped signal in this way may reduce the overall power loss associated with the frequency up-conversion operation. One such architecture is illustrated in FIG. 10B, in accordance with some embodiments. Here, the chirped signal enters the RX die from the bottom side. Level 1 multiplication unit up-converts the chirped signal to a certain frequency band. For example, level 1 multiplication unit 318 may have a multiplication factor of 9. The 1:N distribution network 350 provides the up-converted chirped signal to the individual RX channels. Each channel mixes the up-converted chirped signal to the signal received by its antenna. The output of the mixers is provided to a read-out ADCs and serializer unit 300, which includes multiple analog-to-digital converters (ADCs) and a serializer.

Figure 10C:
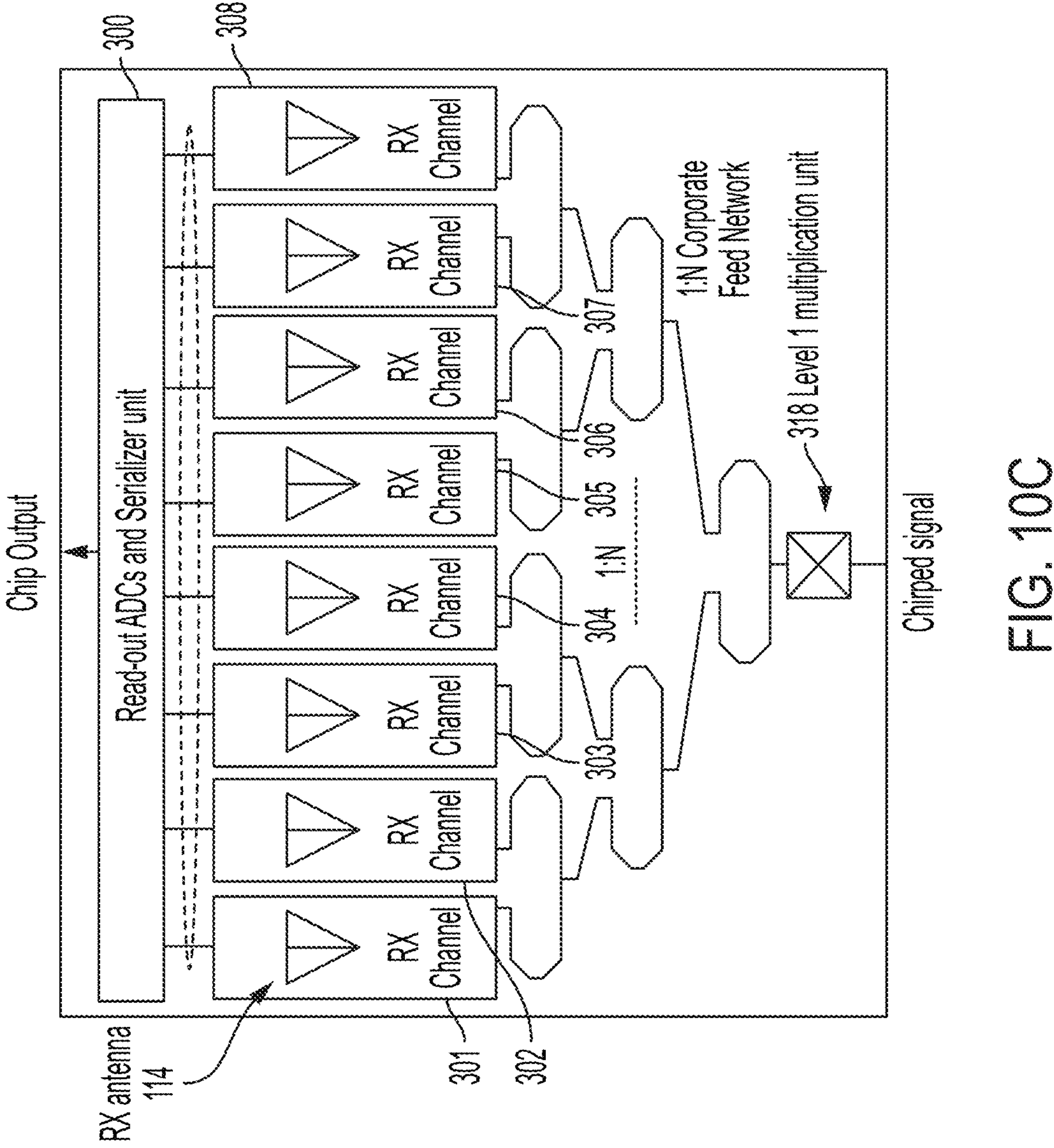
Figure 10D:
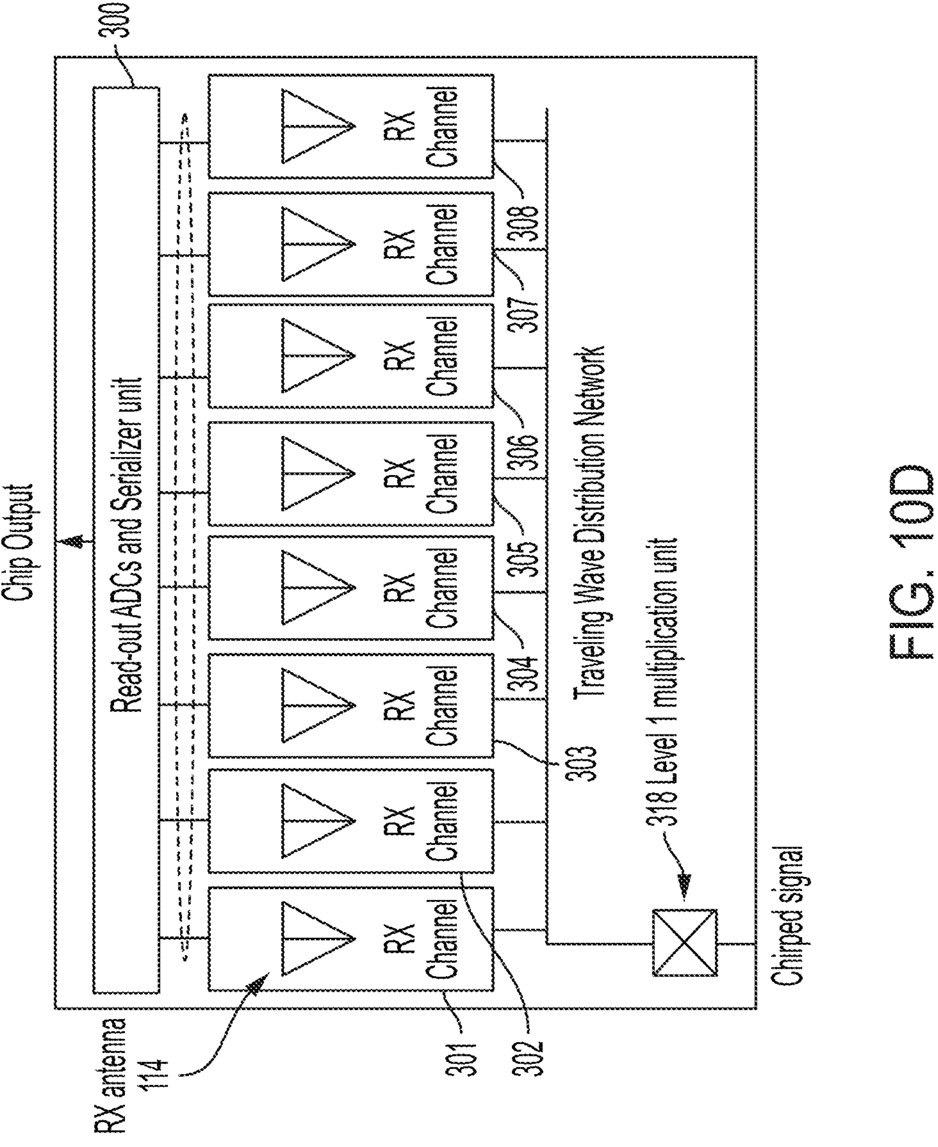

FIGS. 10C-10D illustrate two possible implementations of the 1:N distribution network 350. In the implementation of FIG. 10C, the distribution network includes a 1:N corporate feed network with a tree of 3 dB splitters. In the implementation of FIG. 10D, the distribution network includes a traveling wave distribution network. A bus is provided with multiple taps branching off of the bus.

Figure 10E:
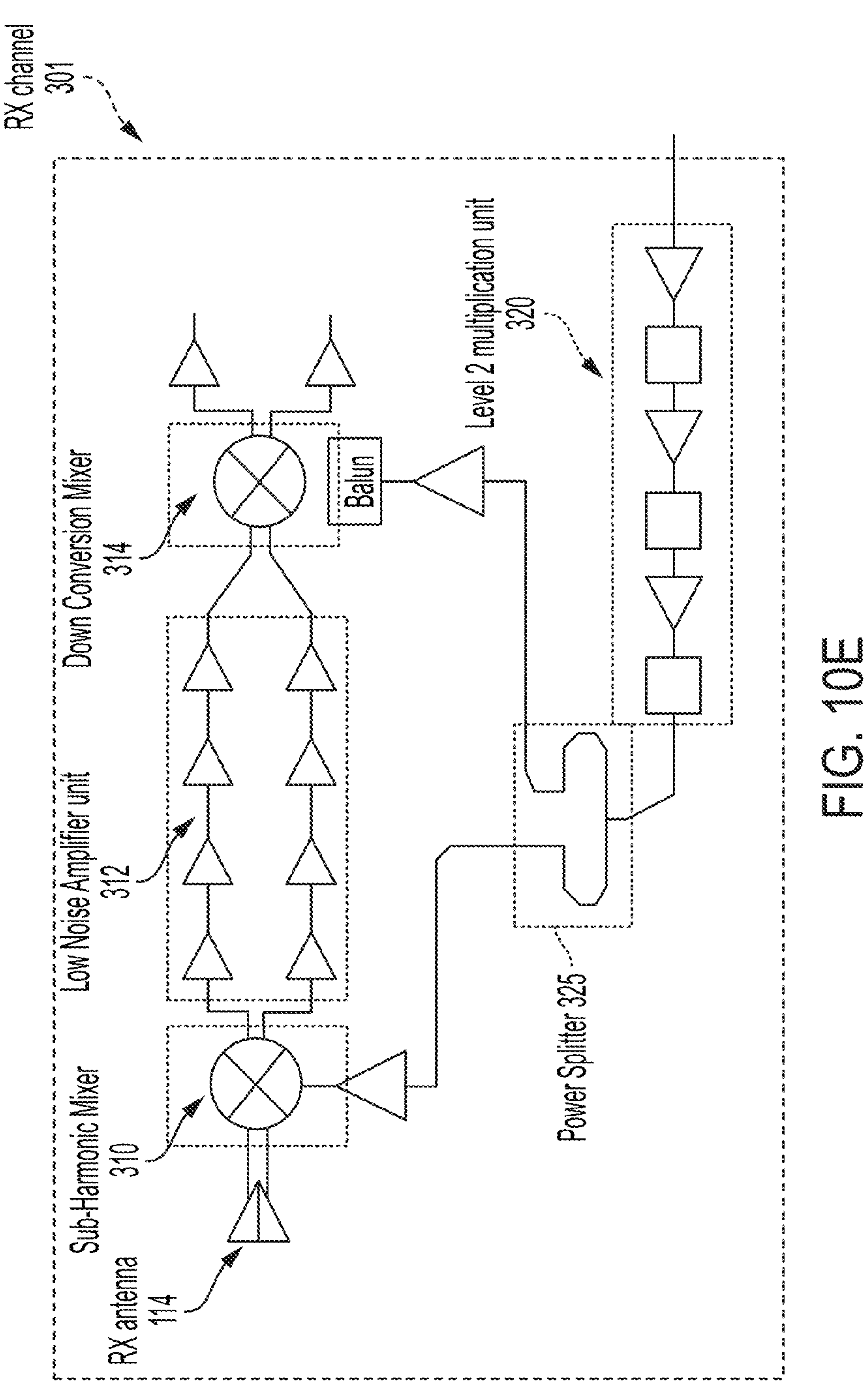
FIG. 10E is a block diagram illustrating a receive channel, in accordance with some embodiments of the technology described herein.

FIG. 10E is a block diagram illustrating an example of an RX channel, in accordance with some embodiments. In this example, the RX channel includes a level 2 multiplication unit 320, which up-converts the frequency generated from the level 1 multiplication unit 318 further. In some embodiments, the level 2 multiplication unit 320 has a multiplication factor selected so that the output signal has half the frequency of the Terahertz signal received by antenna 114. For example, if the Terahertz signal received by antenna 114 has a center frequency of 670 GHz, the chirped signal output from the level 2 multiplication unit 320 has a center frequency of 335 GHz. A power splitter 325 splits the up-converted chirped signal in into branches, which are provided as input to sub-harmonic mixer 310 and down-conversion mixer 314, respectively. In this example, sub-harmonic mixer 310 receives a differential signal from RX antenna 114 and receives the up-converted chirped signal as a single-ended input. The output of the sub-harmonic mixer is the signal received by the antenna translated in frequency to half the frequency of the received signal.

The up-converted chirp appears as a common mode noise at the differential output of the mixer. A low noise amplifier (LNA) unit 312, including a plurality of LNAs, provides gain and suppresses the noise. Downstream from LNA unit 312, the signal is mixed with the up-converted chirped signal, thereby translating the received signal to its intermediate frequency.

Sub-harmonic mixer 310 may be implemented in any of numerous ways. In some embodiments, the sub-harmonic mixer 310 receives two inputs, one is differential and the other one is single ended. For example, the received signal is provided differentially, and the up-converted chirp is provided in a single-ended fashion. The sub-harmonic mixer 310 may be provided to output a frequency equal to $f_1$-$nf_2$, where $f_1$ and $f_2$ are the frequencies of the input signals. The parameter n represents the order of the sub-harmonic mixer, and could be for example equal to 2, 3 or 4. In one example, $f_1$ is the frequency of the input differential signal and $f_2$ is the frequency of the input single-ended signal. The output of the sub-harmonic mixer 310 may be differential.

In some embodiments, an RX channel 301 may be implemented with a single sub-conversion stage. Such an RX channel may be similar to the implementation of FIG. 10E, but instead of having a sub-harmonic mixer 310 and a down conversion mixer 314, it may have only one of these. In this arrangement, the single mixer may be configured to down-convert the signal received from RX antenna 114 to base band. Such implementation may or may not include low noise amplifier unit 312.

Figure 11B:
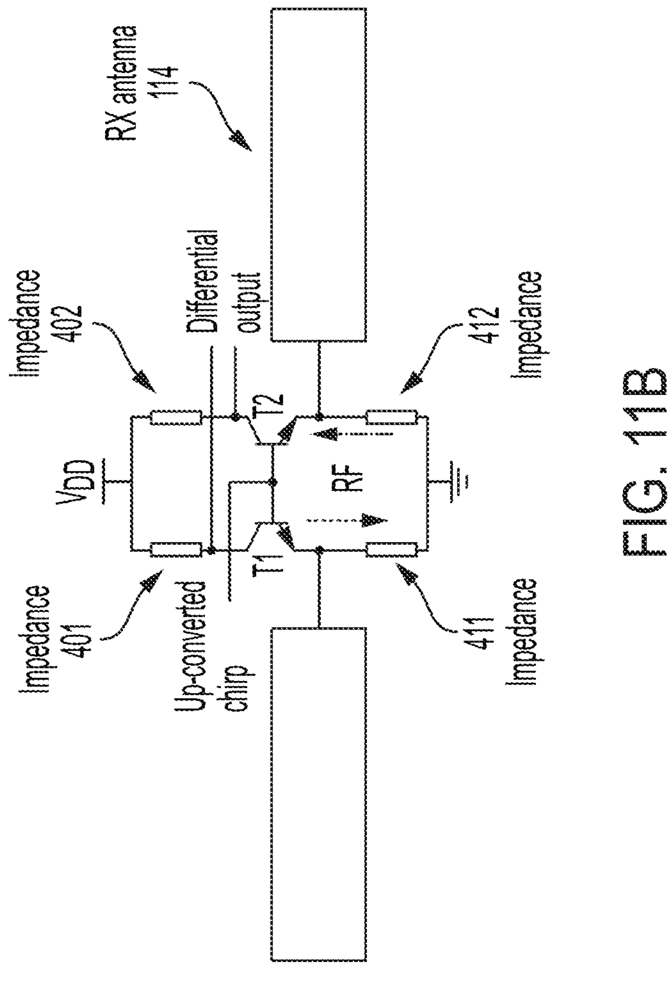
FIGS. 11A-11B are schematic diagrams of signal mixers, in accordance with some embodiments of the technology described herein.
Figure 11A:
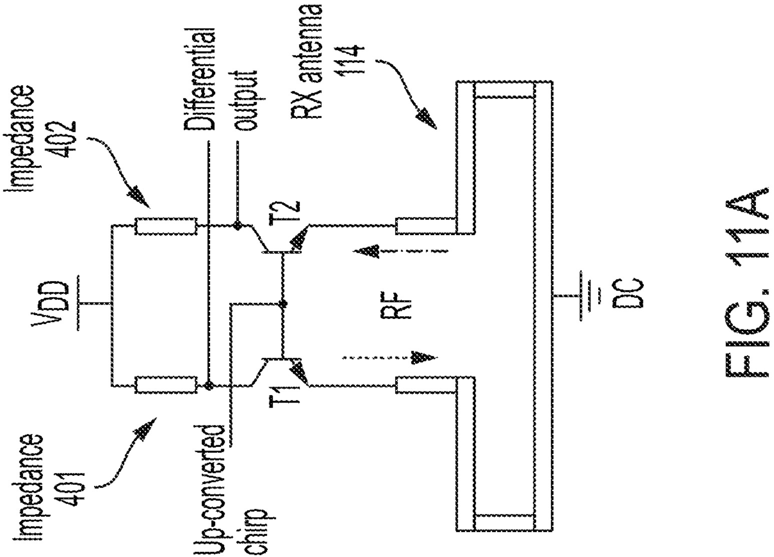

FIGS. 11A and 11B illustrate two possible implementations of the sub-harmonic mixer 310, in accordance with some embodiments. In both implementations, RX antenna 114 is coupled directly to the mixer (e.g., without transmission lines in between).

In the mixer of FIG. 11A, RX antenna 114 is connected in series to the emitters of transistors T1 and T2. Here, RX antenna 114 is a folded dipole coupled to ground. The bases of transistors T1 and T2 are connected to one another, and the collectors are coupled to impedances 401 and 402, respectively. Transistors T1 and T2 may be of any suitable type, including for example high-electron mobility transistors (HEMT), bipolar complementary metal-oxide-semiconductor (BiCMOS) transistors and heterojunction bipolar transistors (HBT) such as SiGe HBT, among others. Thus, the term "collector" encompasses both collectors and drains, the term "emitter" encompasses both emitters and sources, and the term "base" encompasses both bases and gates. The up-converted chirped signal is provided at the bases of the transistors, in a single-ended fashion. Thus, the transistors mix the signal received by the RX antenna with the up-converted chirped signal to produce a differential output (at the respective collectors of transistors T1 and T2).

In the mixer of FIG. 11B, RX antenna 114 is connected in parallel to the emitters of transistors T1 and T2. Here, RX antenna 114 is a dipole, each branch of the dipole being connected to the emitter of a corresponding transistor. The emitters are further coupled to ground via impedances 411 and 412. As in the example of FIG. 11A, the up-converted chirped signal is provided at the bases of the transistors, in a single-ended fashion. Thus, the transistors mix the signal received by the RX antenna with the up-converted chirped signal to produce a differential output.

H. Focusing Elements

Figure 12A:
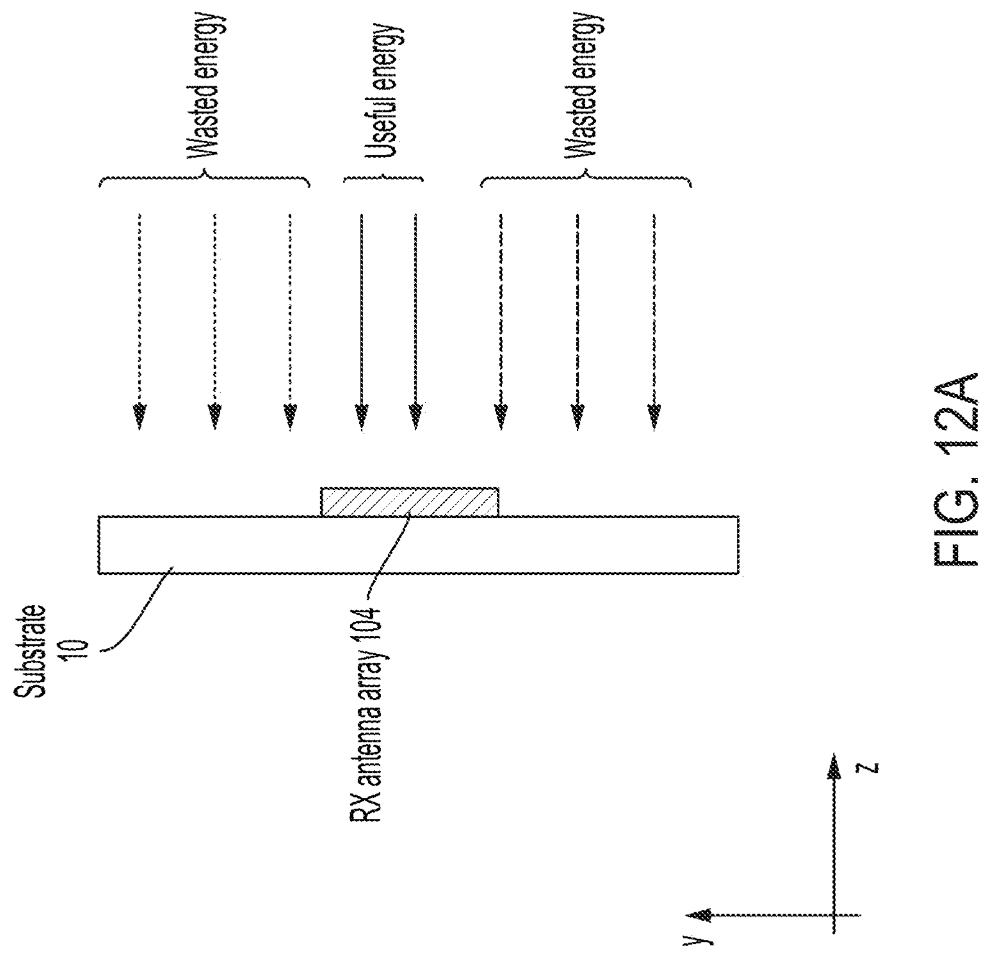
FIG. 12A is a side view of a Terahertz active sensor, in accordance with some embodiments of the technology described herein.

The inventors have recognized that active sensing systems used in autonomous vehicles should be small, so that they can be accommodated on any suitable part of a vehicle. Accordingly, the inventors have designed substrate 10 to have approximately the size of a business card or a pair of business cards, at least in some embodiments. Unfortunately, having a small substrate area means that the space available for the RX antenna array(s) is smaller than ideal. As a result, only a small fraction of the energy reflected by a target object is collected. FIG. 12A is a side view of a substrate 10 illustrating an RX antenna array 104. As further shown in this figure, only a small fraction of the reflected energy is collected—the energy that hits RX antenna array 104. Energy that hits substrate 10 outside RX antenna array 104 is wasted. As described herein, increasing the length of the RX antenna array along the y-axis may not be an option because doing so would take space away from the other components.

Figure 12B:
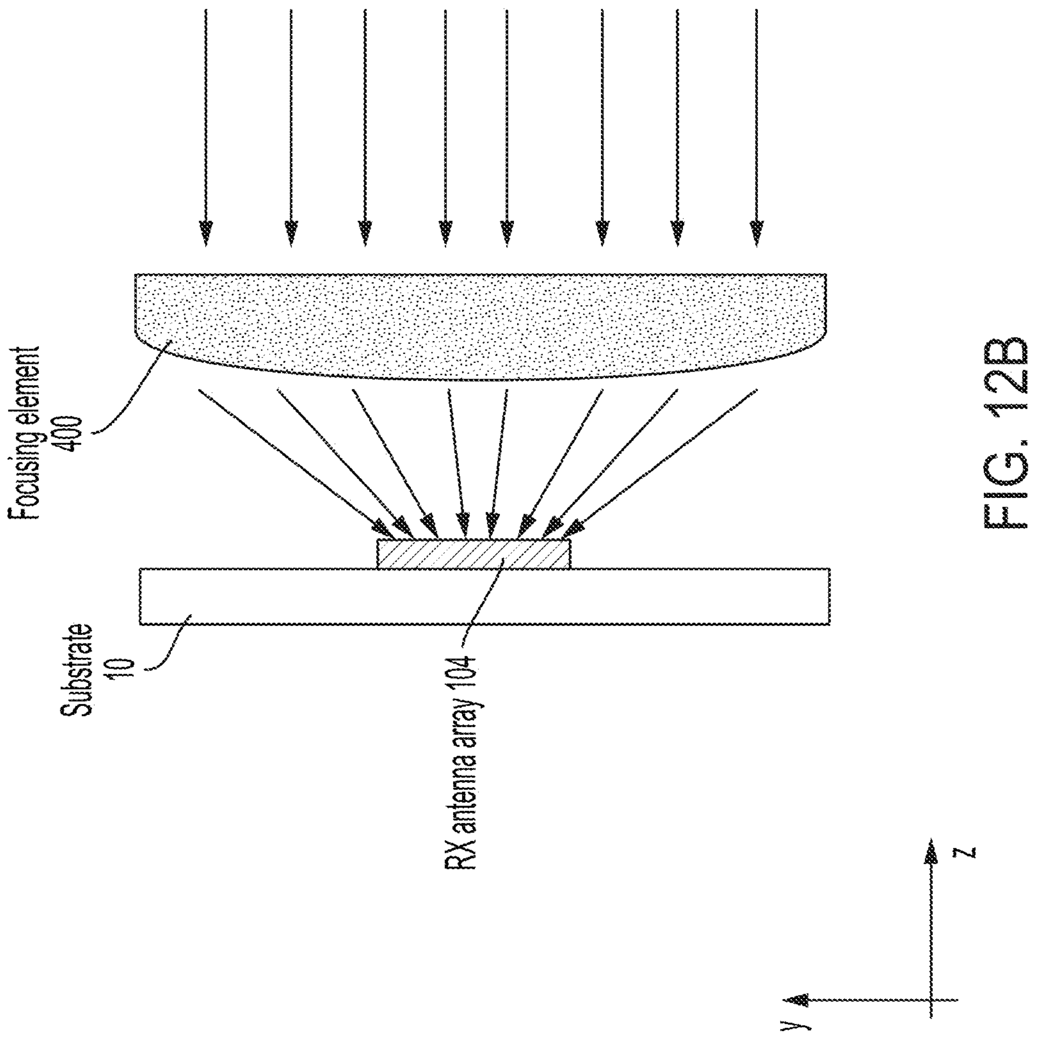
FIG. 12B is a side view of a Terahertz active sensor including a focusing element, in accordance with some embodiments of the technology described herein.

Recognizing this problem, the inventors have developed Terahertz active sensing systems that use focusing elements to increase the collection of energy. FIG. 12B is another side view of a substrate 10 illustrating RX antenna array 104. In addition, in this embodiment, a focusing element 400 is disposed near RX antenna array 104. As shown in this figure, energy that hits the focusing element but that would otherwise not hit the RX antenna array are now focused on the array. Therefore, this energy is also captured, thus increasing the efficiency of the active sensing system. The focusing lens may be made of a material that is transparent in the Terahertz band, such as silicon, or a polymer. Focusing element 400 may be positioned at a distance from the top surface of substrate 10 or may be in contact with that surface.

Figure 12C:
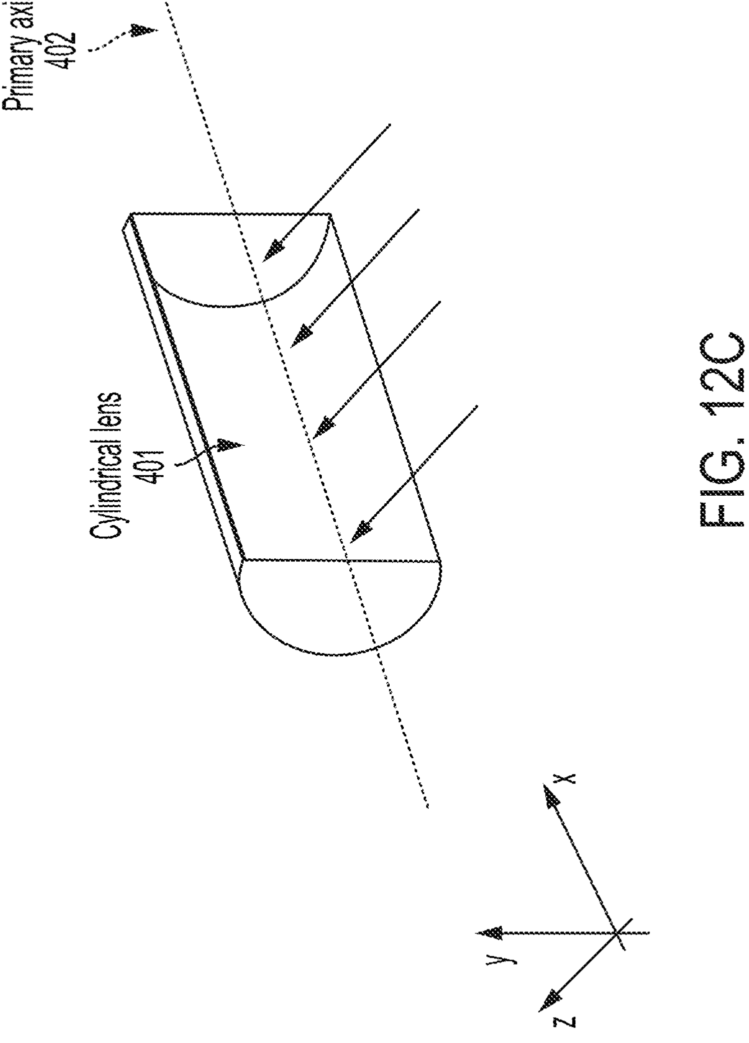
FIG. 12C is a schematic diagrams illustrating a cylindrical lens, in accordance with some embodiments of the technology described herein.

The focusing element may have any suitable shape arranged to steer energy towards the surface of RX antenna array 104 at the frequency of interest. For example, the focusing element may be designed to provide focusing at least between 650 GHz and 690 GHz. In some embodiments, the focusing element may be implemented as a cylindrical lens, as illustrated in FIG. 12C. Cylindrical lens 401 has a cylindrical or partially cylindrical shape. The primary axis 402 of the lens extends parallel the direction of the height of the cylinder (or the cylinder portion). In some embodiments, the primary axis of the cylinder is parallel to the x-axis. In this way, the lens focuses waves offset from one another along the y-axis (as shown in FIG. 12B) without focusing waves offset from one another along the x-axis.

Other types of focusing elements are also possible, including spherical or elliptical lenses. Spherical or elliptical lenses may be used in some embodiments to achieve viewpoint diversification. In these embodiments, waves incident on the spherical or elliptical lens from different angles in the xz-plane may be focused on different areas of the RX antenna array. Viewpoint diversification may be achieved by interpreting different areas of the RX antenna array as being associated with different angles.

Figure 12D:
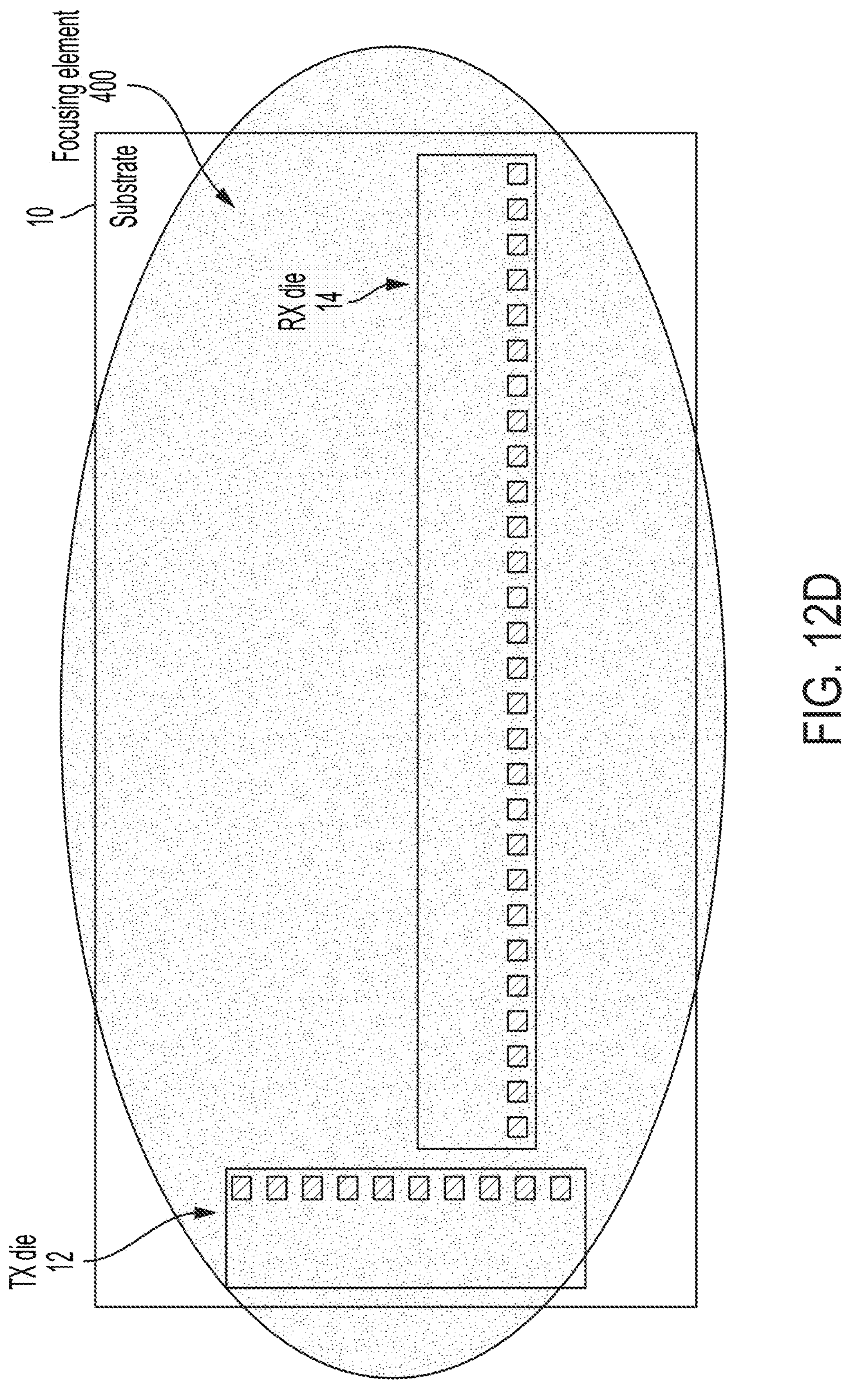
FIG. 12D is a top view of a Terahertz active sensor including a focusing element, in accordance with some embodiments of the technology described herein.
Figure 12E:
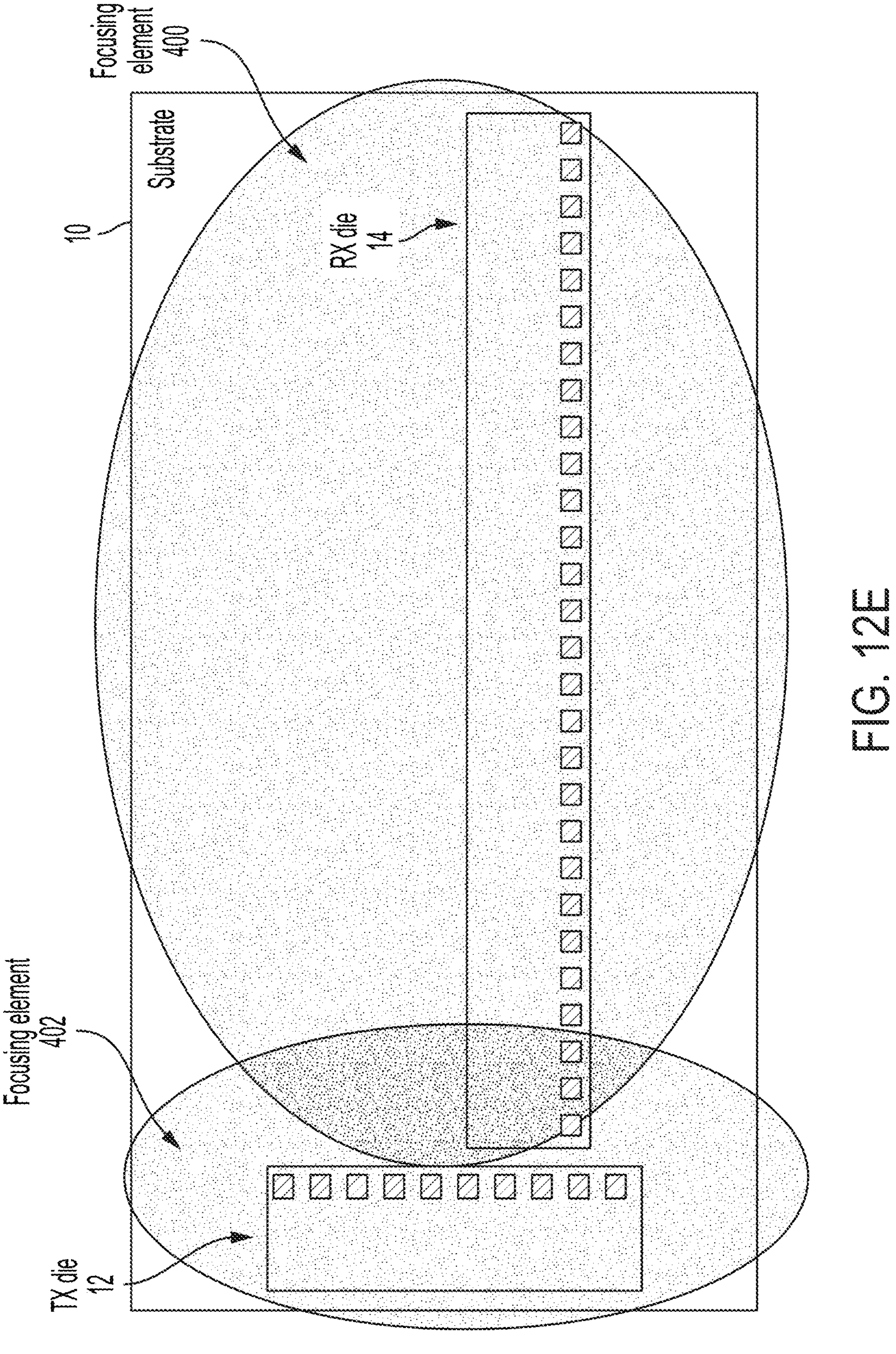
FIG. 12E is a side view of a Terahertz active sensor including two focusing elements, in accordance with some embodiments of the technology described herein.

FIGS. 12D-12E are top views of substrate 10 according to some embodiments. In the implementation of FIG. 12D, the sensing system includes a focusing element 400 covering both the TX and RX antenna arrays. In other embodiments, a focusing element 400 may at least partially cover the TX antenna array and at least partially cover the RX antenna array. As described in connection with FIG. 12B, focusing element 400 may focus incident THz signals on the RX antenna array. Optionally, the focusing element 400 may be further shaped to alter the signal emitted by the TX antenna array, for example to focus the signal on a particular plane. For example, focusing element 400 may include a bi-focal lens.

In the implementation of FIG. 12E, the sensing system includes a focusing element 400 covering the RX antenna array and a focusing element 401 covering the TX antenna array. In this way, one focusing element may be optimized to focus incident waves on the RX antenna array and, separately, the other focusing element may be optimized to shape the emitted signal as desired.

VII. Multi-Dimensional Imaging

The inventors have further developed systems and methods (which may be used in connection with any of the hardware implementations described herein) for imaging target objects in multiple dimensions. Some embodiments, for example, relate to systems and methods for imaging target objects in two dimensions (e.g., along the longitudinal axis and the elevation axis or along the longitudinal axis and the azimuth axis) or in three dimensions (along the longitudinal axis, the elevation axis and the azimuth axis). Multi-dimensional images provide a more complete picture of the surrounding area relative to one-dimensional images.

Figure 13:
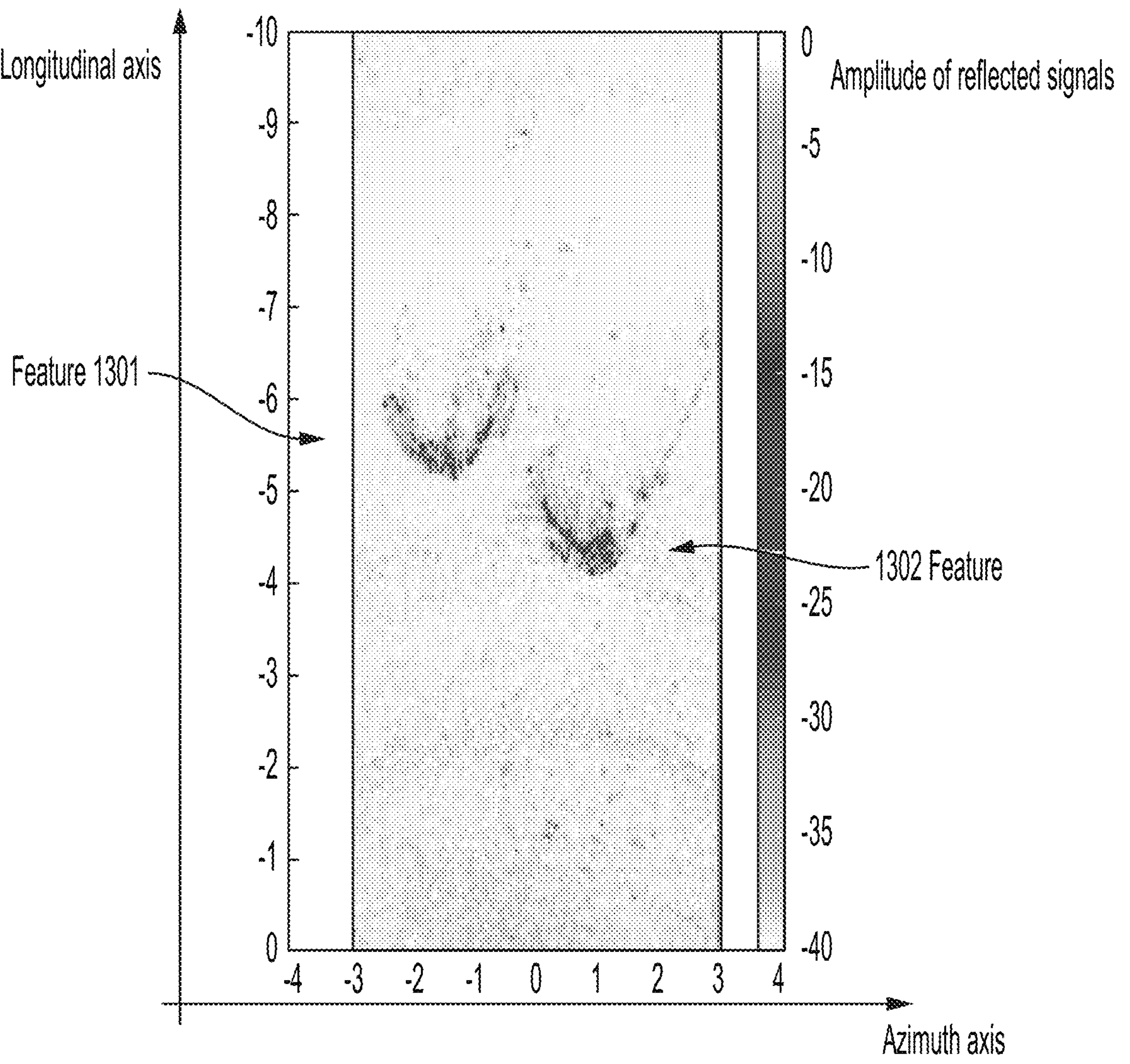
FIG. 13 illustrates an example of a range/cross range image, in accordance with some embodiments of the technology described herein.

Images of the types described herein include data sets relating a characteristic of reflected waves (e.g., the amplitude, power or phase of reflected waves) to space. A one-dimensional image, for example, may include a data set relating the power of reflected waves to the longitudinal axis. To each location along the longitudinal axis corresponds a value representing a characteristic of the reflected waves. As another example, a two-dimensional image may include a data set relating the power of reflected waves to the longitudinal axis and the azimuth axis (a range-cross range image), or a data set relating the power of reflected waves to the longitudinal axis and the elevation axis. An example of a range/cross range image is depicted in FIG. 13. Here, the y-axis represents the longitudinal direction, and the x-axis represents the azimuth direction. Both axes are discretized, thereby forming a two-dimensional grid. To each element of the grid corresponds a value representing the power of a reflected signal. The image of FIG. 13 includes two features, 1301 and 1302. Each feature indicates the presence of a target object at a particular location in space relative to the transmitter/receiver. As another example, a three-dimensional image may include a data set relating the power of a reflected signal to the longitudinal axis, the azimuth axis and the elevation axis. In some embodiments, imaging an object involves generating a data set relating a characteristic of reflected waves (e.g., the amplitude, power or phase of reflected waves) to space in one, two or three dimensions.

Information with respect to the elevation axis may be obtained using interferometric synthetic aperture RADAR (SAR) techniques. Such systems produce multiple images each corresponding to a different viewpoint with respect to the elevation axis. Each image is characterized by a phase—the phase of the returning signal at the receiver. The phase of a return signal depends on the distance to the object, since the path length to the object and back includes a number of wavelengths plus some fraction of a wavelength. Imaging with respect to the elevation axis may be obtained by determining the differences between the phases of the different images.

Figures 14A, 14B:
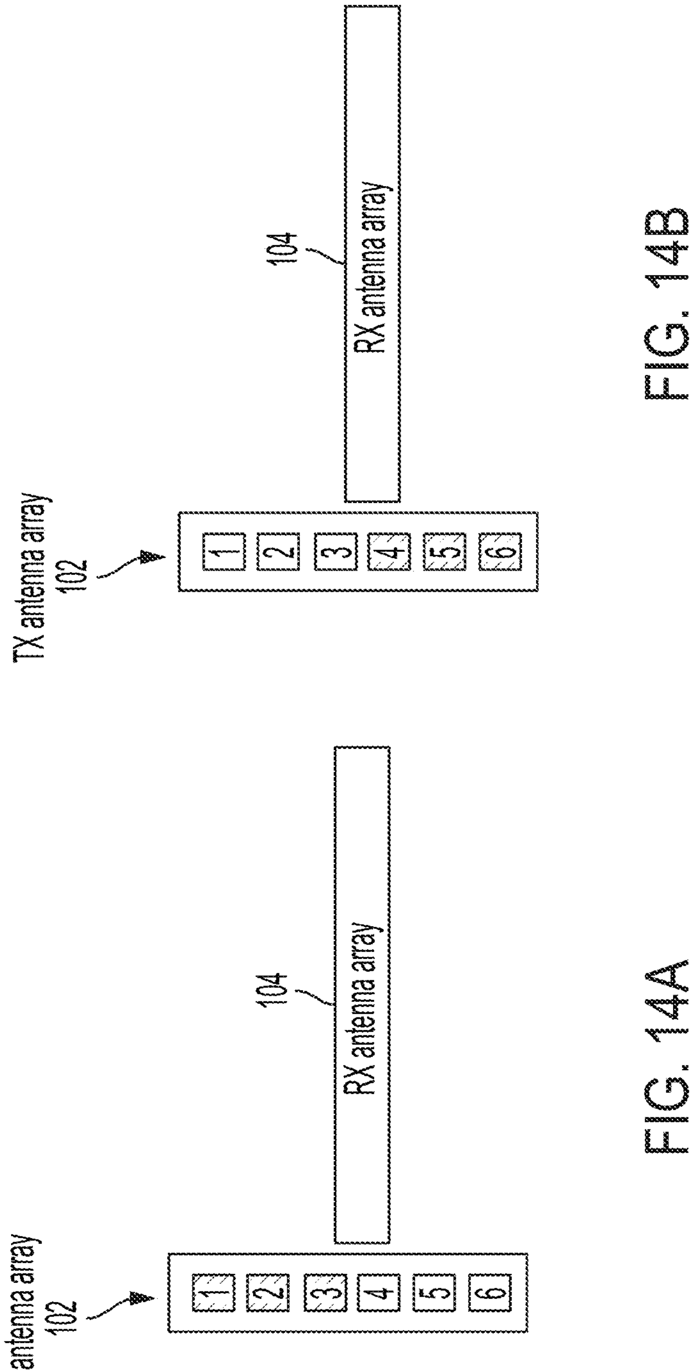
FIGS. 14A-14B are diagrams illustrating a system for multi-dimensional imaging, in accordance with some embodiments of the technology described herein.

FIGS. 14A-14B are diagrams illustrating a system capable of imaging objects in multiple dimensions in accordance with some embodiments. In this arrangement, information in the elevation axis is obtained by emitting THz signals with different subsets of TX antenna array 102 at different times. At time $t_1$, antennas 1, 2 and 3 emit (see FIG. 14A). At time $t_2$ (subsequent to $t_1$), antennas 4, 5 and 6 emit (see FIG. 14B). Because the subsets are offset from one another along the elevation axis, different viewpoints with respect to that axis are produced. In some embodiments, TX antenna array 102 may be segmented in more than two subsets. Signals reflected in response to emission from the first subset of the TX antenna array 102 and signals reflected in response to emission from the second subset of the TX antenna array 102 are received with RX antenna array 104. Thus, the system generates two images. The system can determine the difference between the phases of these images, and may use the phase difference to obtain information with respect to the elevation axis.

Figure 14C:
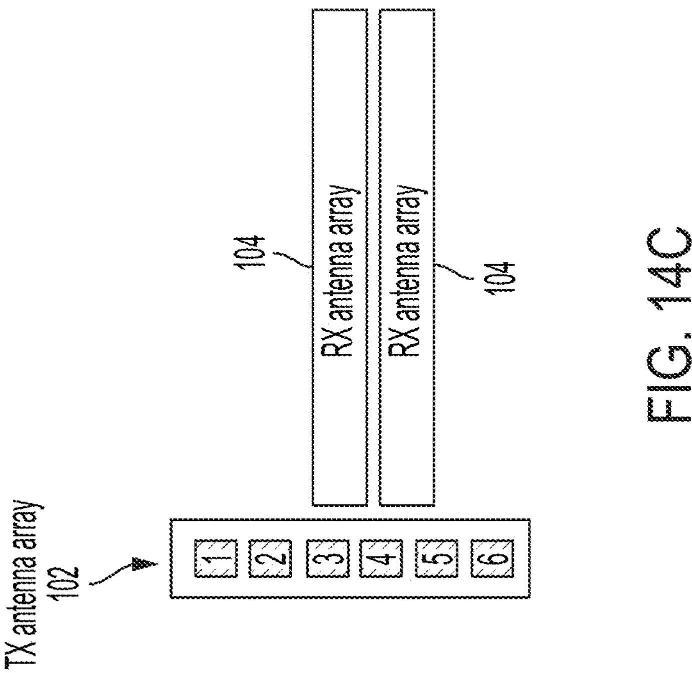
FIG. 14C is a diagram illustrating another system for multi-dimensional imaging, in accordance with some embodiments of the technology described herein.

In the arrangement of FIG. 14C, different viewpoints are obtained by providing multiple RX antenna arrays that are offset from one another along the elevation axis. In this arrangement, the antennas of the TX antenna array may emit at the same time, and the reflected signals are received by each of the RX antenna arrays.

Figures 14D, 14E, 14F:
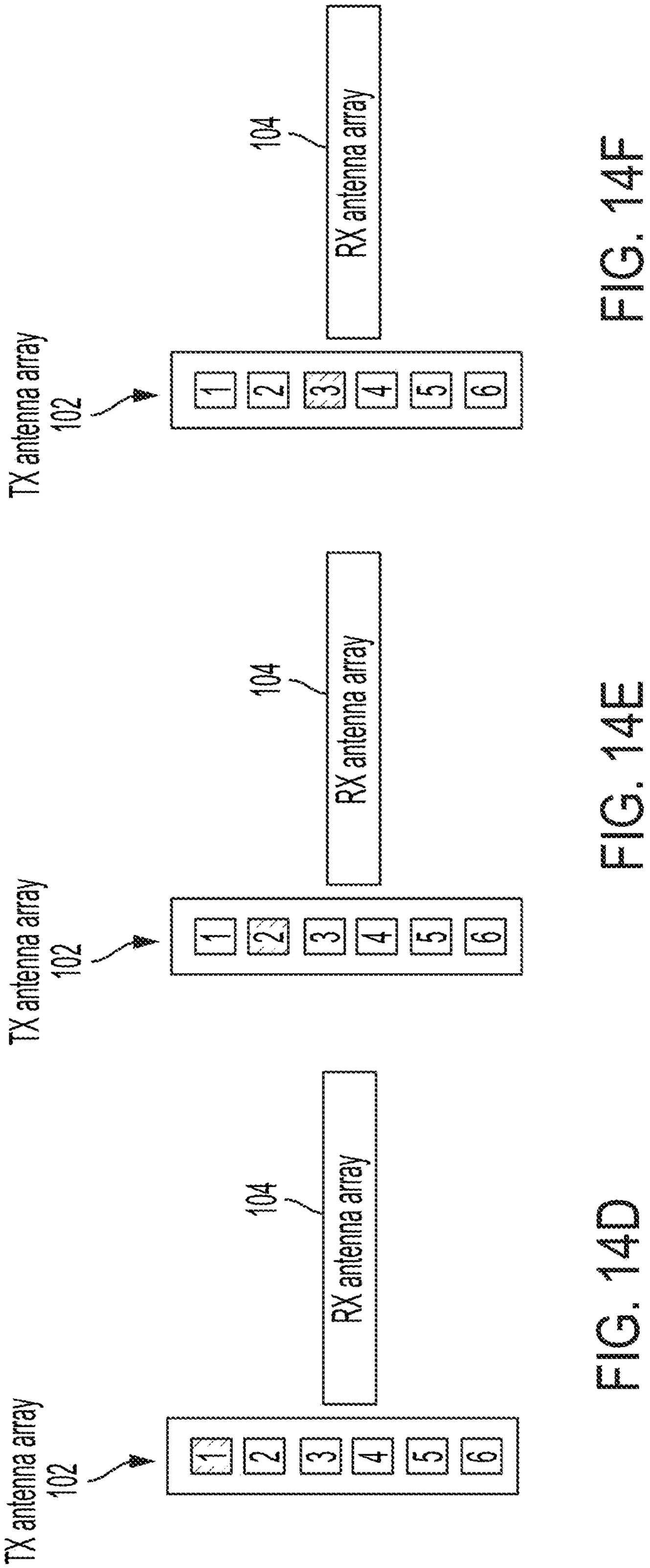
FIGS. 14D-14I are diagrams illustrating yet another system for multi-dimensional imaging, in accordance with some embodiments of the technology described herein.
Figures 14G, 14H, 14I:
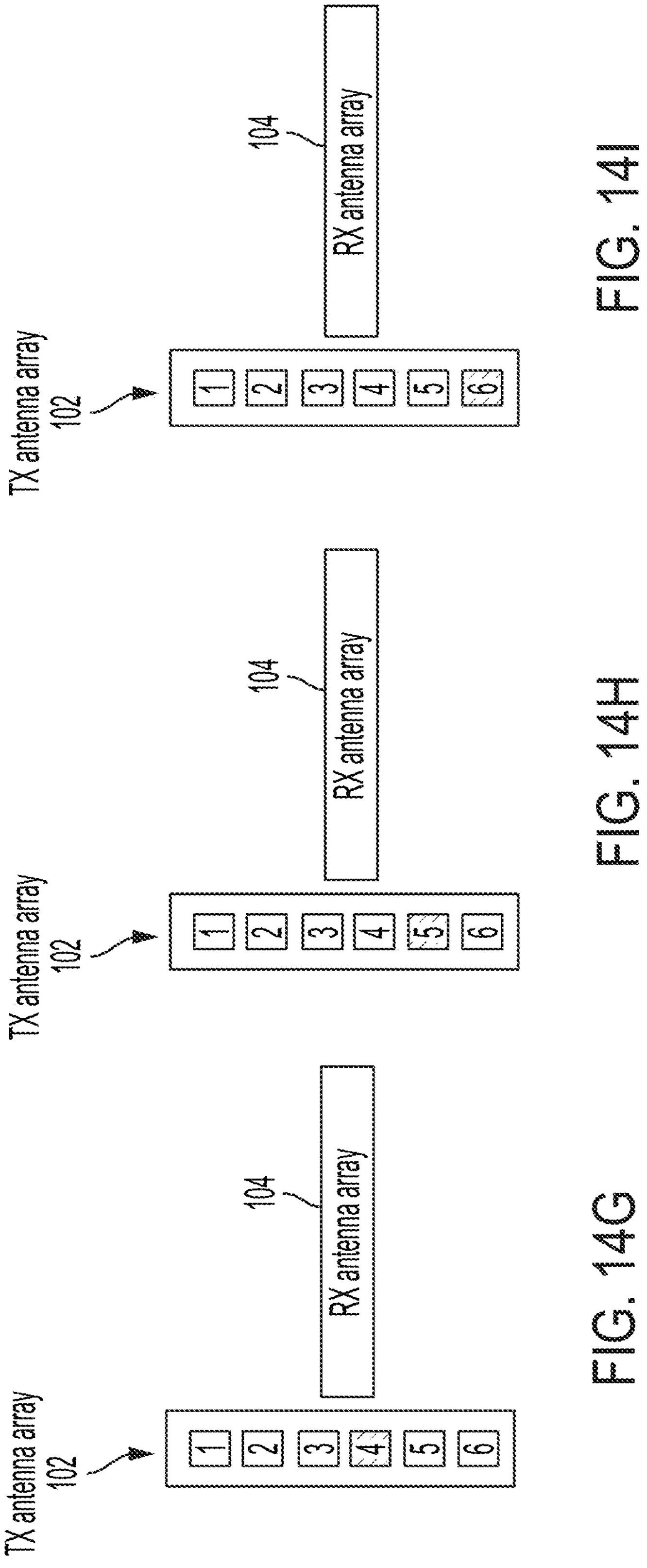

Additionally, or alternatively, information with respect to the elevation axis may be obtained using time-domain multiple-input multiple-output (TD-MIMO) techniques. One example of such a system is depicted in FIG. 14D, in accordance with some embodiments. In this sequence, each antenna of TX antenna array 102 emits at a different time. In some embodiments, imaging using TDMA-MIMO techniques may transmitting with one antenna at a time while receiving on all receivers until a full multi-dimensional data matrix is collected. In some embodiments, the system may compute three-dimensional images using for example SAR techniques for the azimuth and MIMO techniques for the elevation.

Some embodiments relate to a method of imaging a target object using a device comprising a radio-frequency (RF) transmit antenna array and an RF receive antenna array, the RF transmit antenna array having a first plurality of transmit antennas and a second plurality of transmits antennas. The method may comprise transmitting, using the first plurality of antennas, a first RF signal having frequency content in a frequency band of 300 GHz-3 THz; transmitting, using the second plurality of antennas, a second RF signal having frequency content in the frequency band; generating a first image at least in part by receiving, using the RF receive antenna array, a third RF signal produced by reflection of the first RF signal from the target object; generating a second image at least in part by receiving, using the receive antenna array, a fourth RF signal produced by reflection of the second RF signal from the target object; and determining a state of the target object using the first and second images. In some embodiments, the first RF signal has frequency content in a frequency band of 650 GHz-690 GHz. In some embodiments, transmitting the second RF signal is performed subsequent to transmitting the first RF signal. In some embodiments, generating the first image comprises determining a phase of the third RF signal; generating the second image comprises determining a phase of the fourth RF signal; and determining the state of the target object comprises determining a difference between the phase of the third RF signal and the phase of the fourth RF signal. In some embodiments, the transmit antenna array is oriented in a first direction and the receive antenna array in oriented in a second direction perpendicular to the first direction. In some embodiments, determining a state of the target object comprises determining a position of the target object relative to the device.

Various methods may be used to image objects with respect to the azimuth. For example, some embodiments use back-projection methods, range migration algorithms (e.g., omega-k algorithms), polar formatting methods (e.g., polar format algorithms) or any combination thereof. Some such methods may involve a wavefront interpolation unit, a matched filter (e.g., a complex multiply in range and cross range of the entire group of data per image), and a two-dimensional fast Fourier Transform (FFT) (e.g., an inverse FFT, or IFFT).

VIII. Multi-Channel Imaging

Leveraging the large bandwidths that can be achieved in the THz band, the inventors have developed techniques for multi-channel imaging. Consider for example a system of the types described herein and operating at frequencies in the 660-680 GHz range. The inventors have recognized that a 20 GHz-bandwidth may be sufficient to produce not only one high-resolution image, but multiple high-resolution images. For example, the 20 GHZ bandwidth may be segmented in three sub-bands each having a bandwidth of 6.66 GHz. Each sub-band has enough bandwidth to yield a range resolution as low as a few centimeters.

In some embodiments, an image is produced from each sub-band and the images may be combined together to form a multi-channel image. The images may include different content relative to one another, thereby adding richness to the data. In fact, an object may reflect signals differently at the different frequency sub-bands. Depending on the shape and/or material of an object, an object may reflect more in one of the sub-bands than it does in the other sub-bands.

Figure 15:
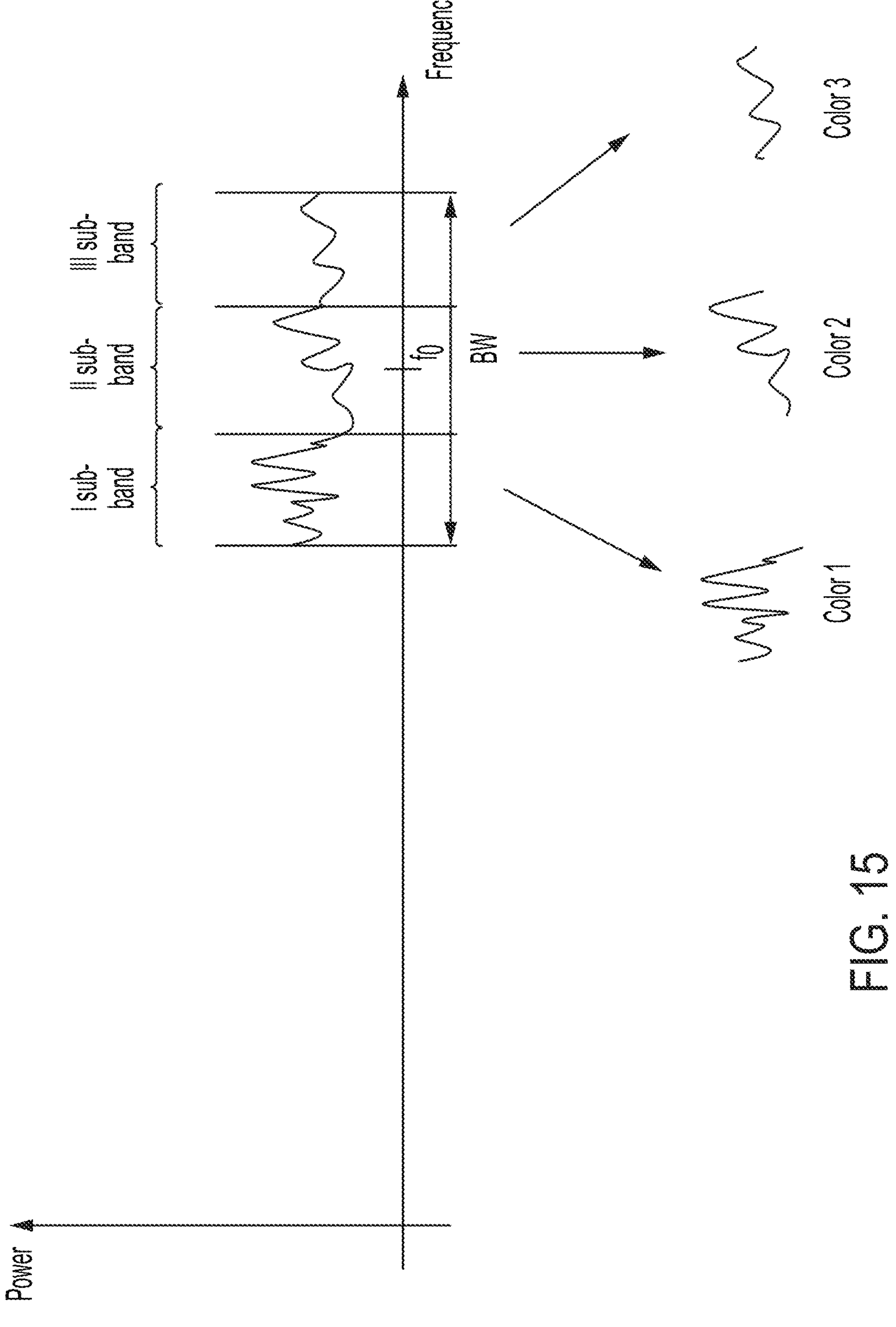
FIG. 15 is a diagram illustrating segmentation of a THz band to produce a multi-channel imaging system, in accordance with some embodiments of the technology described herein.

FIG. 15 is a diagram illustrating a THz frequency band segmented in multiple sub-bands, in accordance with some embodiments. In this example, the bandwidth BW of a signal is segmented in three sub-bands (though it may be segmented in any suitable number of sub-bands, such as 2, 4, 6, 7, 8, 9, 10, etc.). In some embodiments, a first image is produced based on the first sub-band, a second image is produced based on the second sub-band and a third image is produced based on the third sub-band. Upon reflection from a target object, each sub-band of the signal may capture slightly different information about the target object relative to the other sub-bands. As a result, each image may have slightly different content. In some embodiments, the images obtained from the different sub-bands are combined to produce a multi-channel image. In some embodiments, a multi-channel image may be provided as input to train a machine learning model. In some embodiments, a multi-channel image may be provided as input to a previously trained machine learning model to identify the presence and/or characteristics (e.g., nature, composition) of an object.

Figures 18A, 18B, 18C, 18D, 18E:
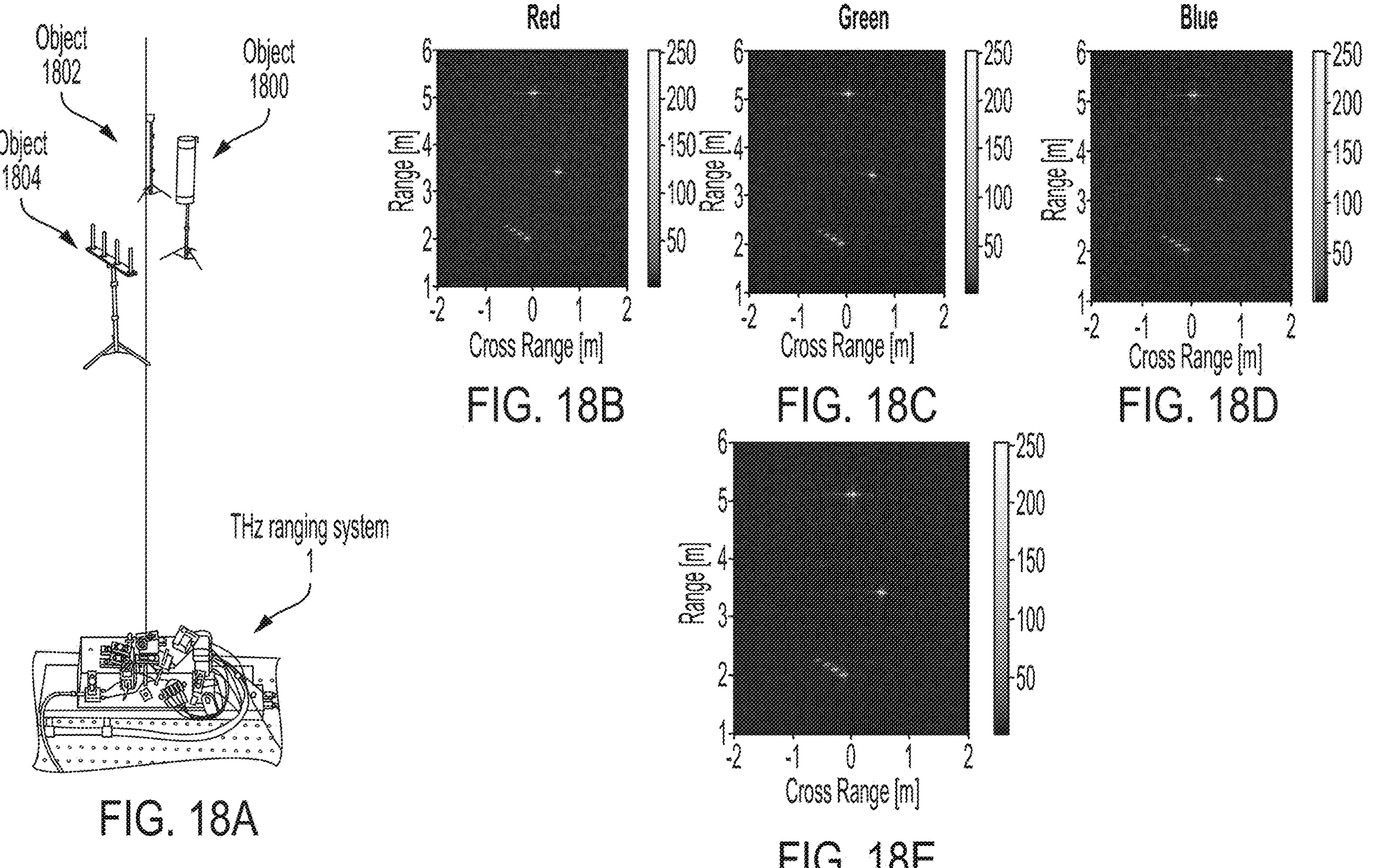
FIG. 18A is a photograph of a setup for performing ranging measurements including a THz ranging system and multiple objects, in accordance with some embodiments of the technology described herein.
FIGS. 18B-18D are plots illustrating range-cross range measurements performed at different frequency ranges in connection with the setup of FIG. 18A, in accordance with some embodiments of the technology described herein.
FIG. 18E is a plot illustrating a range-cross range measurement obtained by combining the measurements of FIGS. 18B-18D, in accordance with some embodiments of the technology described herein.
Figure 19A:
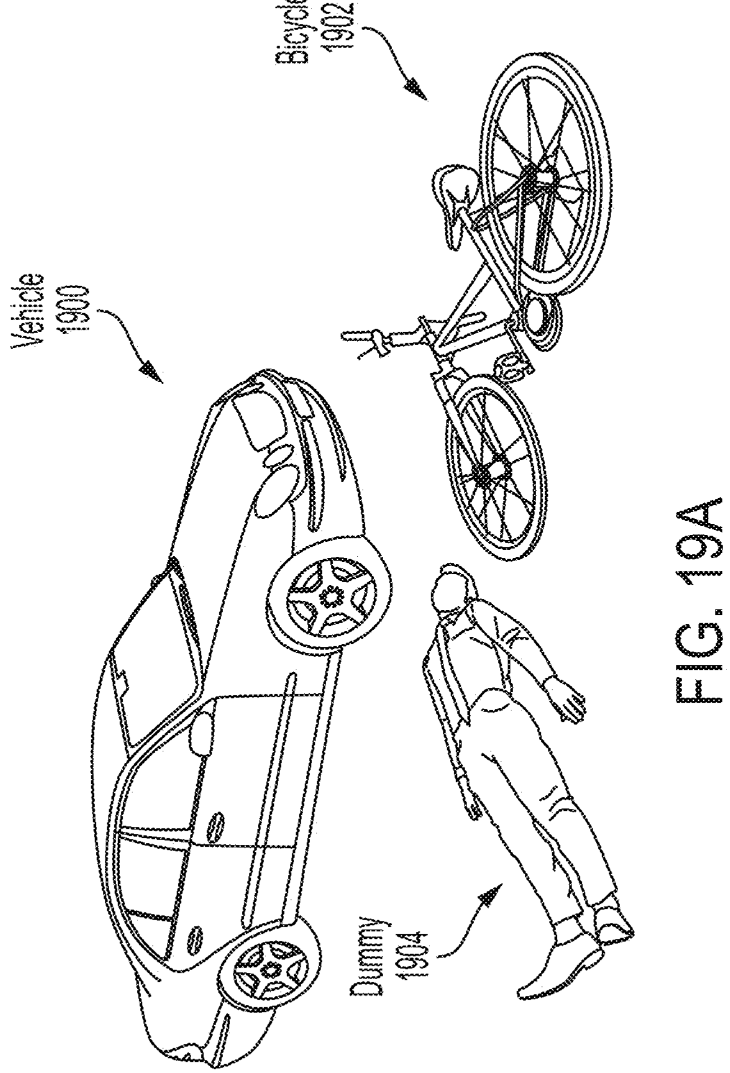
FIG. 19A is a photograph of another setup for performing ranging measurements including a vehicle, a bicycle and a dummy, in accordance with some embodiments of the technology described herein.
Figures 19B, 19C, 19D, 19E:
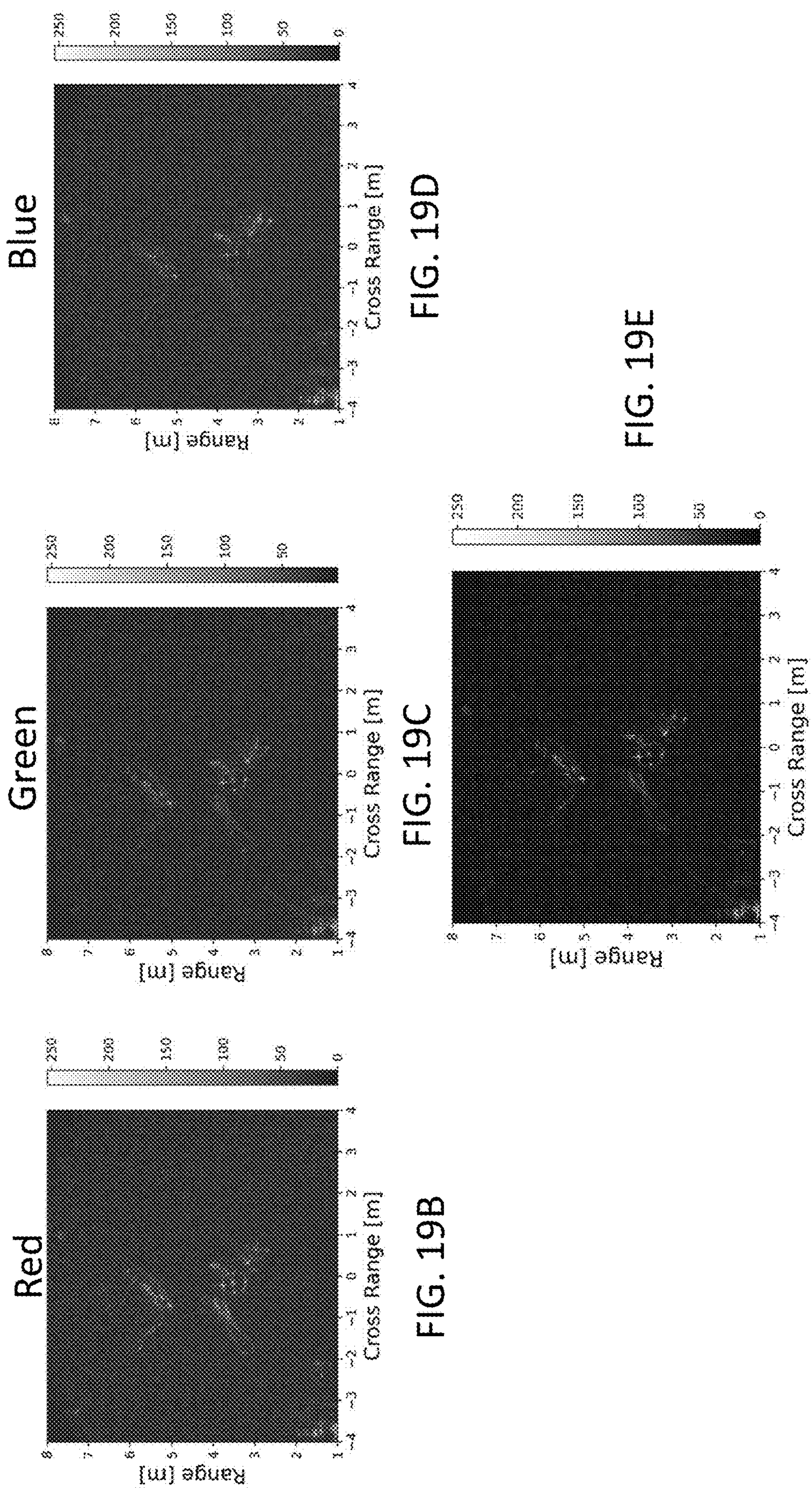
FIGS. 19B-19D are plots illustrating range-cross range measurements performed at different frequency ranges in connection with the setup of FIG. 19A, in accordance with some embodiments of the technology described herein.
FIG. 19E is a plot illustrating a range-cross range measurement obtained by combining the measurements of FIGS. 19B-19D, in accordance with some embodiments of the technology described herein.

In some embodiments, each image may be colorized using a certain color. For example, each image may be assigned a certain color and may be displayed in accordance with the assigned color. For example, the image corresponding to first sub-band of FIG. 15 may be displayed in red, the image corresponding to second sub-band of FIG. 15 may be displayed in green, and the image corresponding to third sub-band of FIG. 15 may be displayed in blue. In some embodiments, the images so obtained are combined to produce a multi-color image (a multi-channel image where each channel corresponds to a different color). An example of a composite image generated in this way is shown in FIGS. 18E and 19E, which are described in Sec. X of this application.

Some embodiments relate to a method of imaging a target object using a device, the method comprising transmitting a first RF signal having a frequency band having a frequency content in a frequency band of 300 GHZ-3 THz, the frequency band having at least first and second sub-bands; receiving a second RF signal produced by reflection of the first RF signal from the target object; and generating a multi-channel image having a first channel and a second channel, wherein data in the first channel is determined using frequency content of the first RF signal in the first sub-band, wherein data in the second channel is determined using frequency content of the second RF waveform in the second sub-band. In some embodiments, the frequency band has a bandwidth of 10 GHZ-60 GHz. In some embodiments, the first frequency sub-band has a bandwidth of 2 GHZ-20 GHZ (e.g., 4 GHz-8 GHz). In some embodiments, the method further comprises determining a state (e.g., the position) of the target object using the multi-channel image. In some embodiments, the method further comprises assigning a first color to the data in the first channel; and assigning a second color to the data in the second channel. Generating the multi-channel image may comprise combining the data in the first channel having the first color assigned thereto with the data in the second channel having the second color assigned thereto.

IX. Range-Dependent Integration

The inventors have developed techniques for pulse integration in a manner that is range-dependent. Pulse integration is a technique for improving the SNR in RADAR systems. Coherent integration involves sampling the return from each pulse and adding the returns in phase with one another. Non-coherent integration involves sampling the return from each pulse and adding the returns with one another without accounting for phase differences.

The inventors have appreciated that objects that are located relatively close to the transmitter yield higher SNRs than objects that are located farther away from the transmitter. Signals produced by reflection from closer objects travel shorter distances, and as a result, experience low propagation loss. By contrast, signals produced by reflection from farther objects travel longer distances, and as a result, experience large propagation loss. The integration techniques developed by the inventors involve integrating pulses corresponding to farther objects at higher rates than the rates at which pulses corresponding to closer objects are integrated. The range-dependent integration techniques developed by the inventors and described herein involve a trade-off between SNR and time resolution. Farther objects are imaged using a higher integration rate, resulting in fewer frames per second. For these objects, the SNR is improved but the time resolution is reduced. However, the loss of time resolution may not be too detrimental as objects that are located far away from the transmitter tend to appear as moving slowly. By contrast, objects that are located closer to the transmitter appear as moving faster, and for these objects, time resolution is more important. Thus, closer objects are imaged using a lower integration rate, resulting in more frames per second.

Figures 16A, 16B:
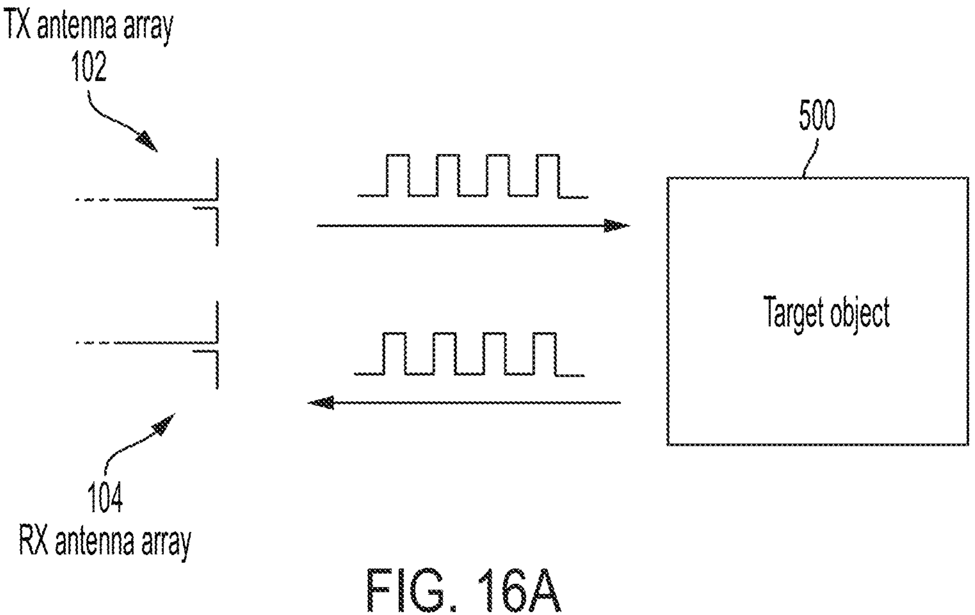
FIG. 16A is a diagram of a system including a TX antenna array configured to transmit a plurality of pulses, in accordance with some embodiments of the technology described herein.
FIG. 16B illustrates an example of pulse, in accordance with some embodiments of the technology described herein.

An example of a system for performing range-dependent integration is depicted in FIGS. 16A-16F, in accordance with some embodiments. FIG. 16A illustrates a THz-based sensing system having a TX antenna array 102 and an RX antenna array 104. TX antenna array 102 transmits a plurality of pulses. One example of a pulse is illustrated in FIG. 16B, in accordance with some embodiments. In this example, the pulse is chirped—it is modulated with a carrier having a time-varying frequency. Other types of pulses may be transmitted in other embodiments. Response pulses are generated upon reflection of the transmitted pulses from target object 500. RX antenna array 104 receives the response pulses. Each response pulse carries information about the reflected power at each range. FIG. 16C is a plot illustrating the power received at the receiver in response to transmission of a first pulse. The power is plotted as a function of range. The x-axis is discretized in range bins, and each range bin represents a range interval. In this example, the received power peaks in correspondence with the 20 m-40 m range bin, and again, in correspondence with the 140 m-160 m range bin. This behavior indicates that there may be an object located between 20 m and 40 m away from the transmitter and there may be another object located between 140 m and 160 m away from the transmitter.

FIG. 16D is a plot illustrating the power received at the receiver in response to transmission of a second pulse, and FIG. 16E is a plot illustrating the power received at the receiver in response to transmission of a third pulse. In these examples, the responses remain substantially unchanged, meaning that the objects haven't moved significantly throughout the transmission of the three pulses.

Figure 16G:
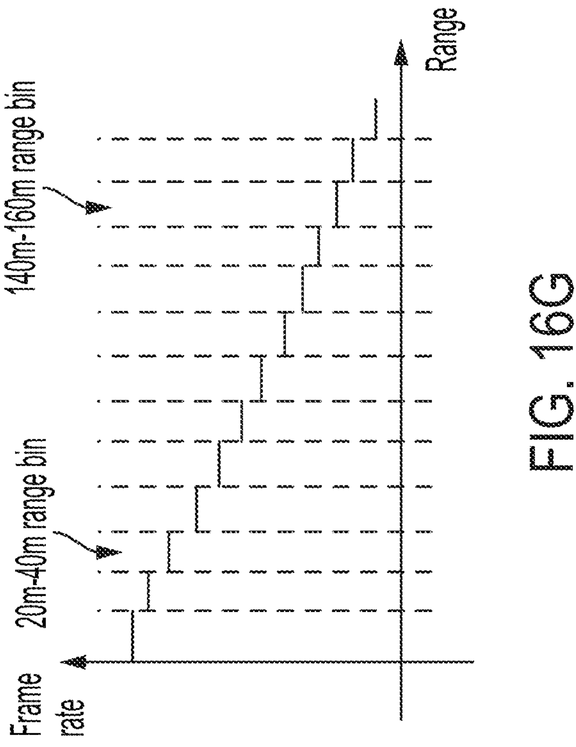
FIG. 16G is a plot illustrating a frame rate as a function of range, in accordance with some embodiments of the technology described herein.
Figure 16F:
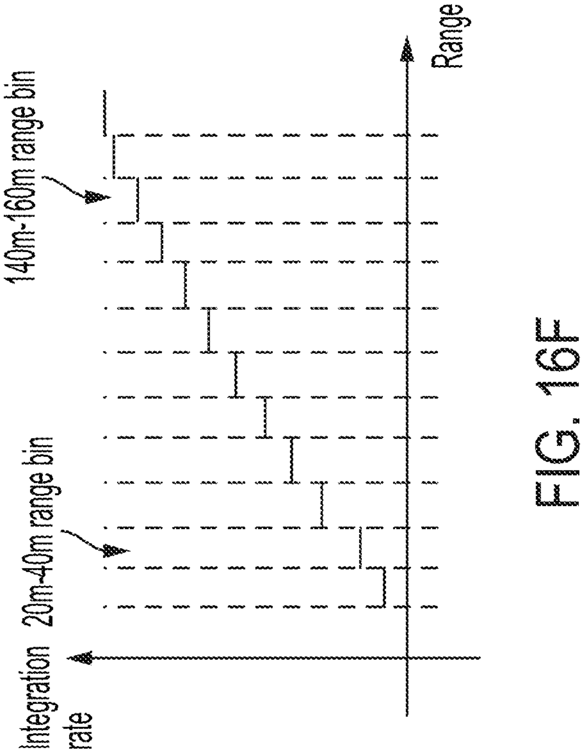
FIG. 16F is a plot illustrating an integration rate as a function of range, in accordance with some embodiments of the technology described herein.

Recognizing that propagation loss increases with increasing distance, data corresponding to different response pulses may be added to one another at a rate determined as a function of the range bin. FIG. 16F illustrates how the integration rate may be varied as a function of the range, in accordance with some embodiments. In this example, each range bin is assigned a different integration rate (though in other examples, an integration rate may be assigned to more than one range). For example, the range bin corresponding to ranges in the 20 m-40 m interval are assigned a rate of 2 integrations per second and the range bin corresponding to ranges in the 140 m-160 m interval are assigned a rate of 500 integrations per second. The result is that the frame rate at which the data are imaged also varies as a function of the range. FIG. 16G illustrates how the frame rate may be varied as a function of the range, in accordance with some embodiments. In this example, the range bin corresponding to ranges in the 20 m-40 m interval are associated with a frame rate of 500 frames per second (FPS) and the range bin corresponding to ranges in the 140 m-160 m interval are associated with a frame rate of 2 FPS. In some embodiments, the integration may be performed in a coherent fashion, thereby increasing the SNR by a factor equal to the integration rate.

The range bins of FIGS. 16C-16G have a width of 20 m. However, in other embodiments, the range bins may have any suitable width. Further, the widths of the range bins may be constant or may vary across the range bins. In one example, one range bin spans the 0-25 m interval, one range bin spans the 25-50 m interval, one range bin spans the 50-100 m interval, one range bin spans the 100-200 m interval, one range bin spans the 200-300 m interval, and one range bin spans values above 300 m.

Some embodiments relate to a method of imaging a target object using a device, the method comprising transmitting a first plurality of radio-frequency (RF) pulses, receiving a second plurality of RF pulses generated by reflection of the first plurality of pulses from the target object, and generating a plurality of images by integrating data obtained from the second plurality of RF pulses, wherein integrating the data comprises integrating the data in different range bins using different integration rates, the integration rate for a range bin, of the different range bins, being set based on a range associated with the range bin. In some embodiments, the method further comprises setting a first rate corresponding to a first range bin and a second rate corresponding to a second range bin, wherein the first range bin represents at least a first range and the second range bin represents at least a second range smaller than the first range, and wherein the first rate is less than the second rate, and the method further comprises integrating the data in the first range bin using the first rate and integrating the data in the second range bin using the second rate. In some embodiments, integrating the data in different range bins comprises coherently integrating the data in different range bins. In some embodiments, at least one pulse of the first plurality of pulses has a bandwidth of 10 GHz-60 GHz. In some embodiments, at least one pulse of the first plurality of pulses has a duration of 0.1 ms-10 ms (e.g., 0.5 ms-2 ms).

X. Measurements

Figure 17A:
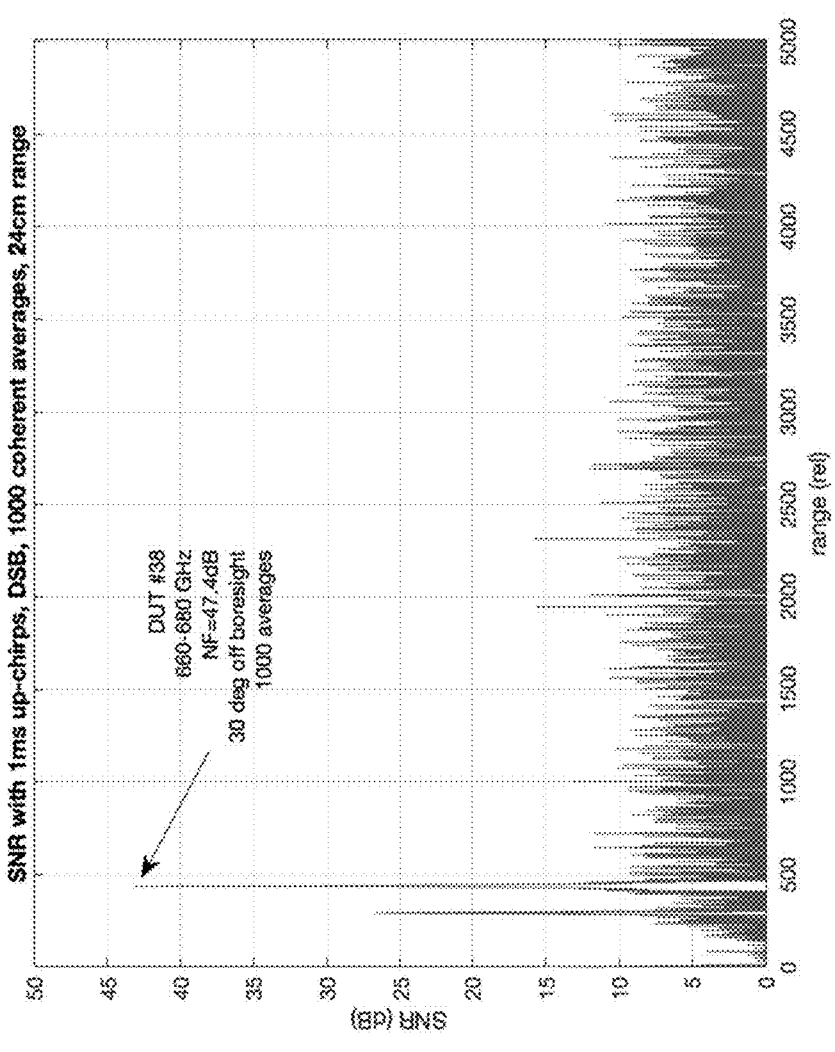
FIG. 17A is a plot illustrating signal-to-noise ratio vs. range in connection with a first ranging measurement, in accordance with some embodiments of the technology described herein.
Figure 17B:
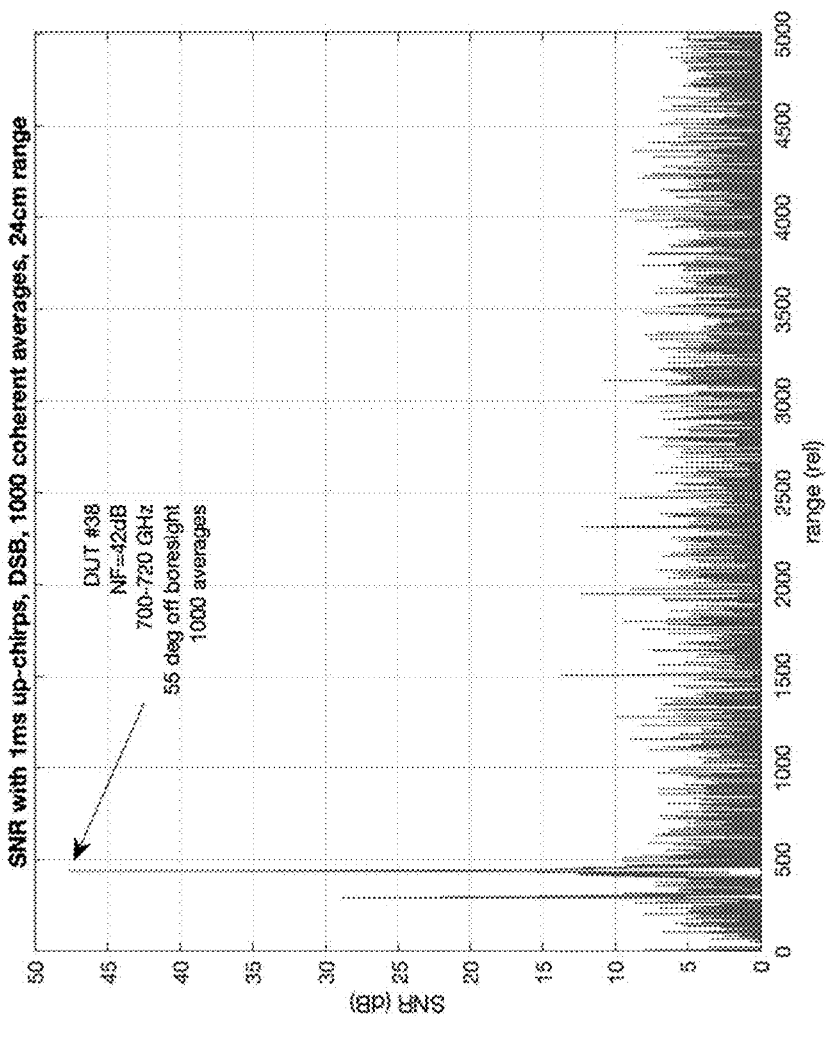
FIG. 17B is a plot illustrating signal-to-noise ratio vs. range in connection with a second ranging measurement, in accordance with some embodiments of the technology described herein.

The inventors have performed a variety of measurements using the devices and the techniques described herein. FIGS. 17A-17B are plots illustrating signal-to-noise ratio vs. range in connection with two ranging measurements, in accordance with some embodiments of the technology described herein. The measurement corresponding to the plot of FIG. 17A was performed using a target object positioned 24 cm away from a THz ranging system 1 and 30 degrees away from the TX antenna array's boresight. The signal had a carrier frequency between 660 GHz and 680 GHz and was modulated in accordance with a 1 ms-chirp. Further, coherent integration was applied with 1000 averages. As shown in the figure, the measurement spectrum presents an SNR peak of approximately 43 dB in correspondence with a distance of 24 cm. This means that the THz ranging system 1 properly determined the location of the target object. In this example, the receiver had a noise figure of 47.4 dB.

The measurement corresponding to the plot of FIG. 17B was also performed using a target object positioned 24 cm away from a THz ranging system 1, but the target object was 55 degrees away from the TX antenna array's boresight. The signal had a carrier frequency between 700 GHz and 720 GHz and was modulated in accordance with a 1 ms-chirp. Further, coherent integration was applied with 1000 averages. As shown in the figure, the measurement spectrum presents an SNR peak of approximately 48 dB in correspondence with a distance of 24 cm, indicating that the THz ranging system 1 properly determined the location of the target object. In this example, the receiver had a noise figure of 42 dB.

The inventors further performed ranging-cross range measurements using the multi-dimensional imaging techniques and the multi-channel imaging techniques described herein. FIG. 18A is a photograph of a setup for performing range-cross range measurements. The setup includes a THz ranging system 1 and multiple target objects (1800, 1802 and 1804). Object 1800 was shaped as a cylinder, object 1802 was shaped as a rod and object 1804 was shaped as a base with a comb of rods extending therefrom. All objects were made of metal. FIGS. 18B-18D are plots illustrating range-cross range measurements performed at different frequency ranges in connection with the setup of FIG. 18A and in accordance with the multi-channel imaging techniques described in connection with FIG. 15. Accordingly, the available frequency band was segmented into three sub-bands. As can be appreciated from FIGS. 18B-18D, all the objects present largely the same response at each frequency sub-band, indicating that these objects have white responses (frequency-independent responses in the frequency band of interest). This is consistent with the fact that all objects were made of the same material, metal. FIG. 18E is a plot illustrating a range-cross range measurement obtained by assigning colors to the measurements of FIGS. 18B-18D (red, green and blue, respectively) and by adding the measurements together. As can be appreciated from FIG. 18E, THz ranging system 1 was able to properly image the target objects.

In other circumstances, different target objects may present different response in the frequency sub-bands, especially for target objects made of different materials. To test this proposition, the inventors have performed measurements using complex target objects, for example of the types that may be encountered on the road. FIG. 19A is a photograph of a setup for performing range-cross range measurements. This setup includes a THz ranging system 1 (not shown in FIG. 19A), a vehicle 1900, a bicycle 1902 and a dummy 1904. Each of these objects is complex in that it includes various materials arranged in different shapes. The inventors have recognized that these types of target objects can benefit from the use of multi-channel imaging techniques of the types described herein. Consider for example that the vehicle's rims are made of aluminum, the chassis is covered with paint, the tires are made of rubber, the headlights are made of plastic, the windshield is made of glass, etc. While metal presents a largely white response, the other materials may reflect THz signals in accordance with different frequency responses.

FIGS. 19B-19D are plots illustrating range-cross range measurements performed at different frequency ranges in connection with the setup of FIG. 19A and in accordance with the multi-channel imaging techniques described in connection with FIG. 15. As can be appreciated from these figures, each sub-band highlights different features of the target objects. FIG. 19E is a plot illustrating a range-cross range measurement obtained by assigning colors to the measurements of FIGS. 19B-19D (red, green and blue, respectively) and by adding the measurements together. As can be appreciated from FIG. 19E, the combined image is much richer than the images corresponding to the individual sub-bands.

XI. Example Concepts

1. A device comprising: a substrate defining a plane extending in first and second directions substantially orthogonal to one another; a first radio-frequency (RF) antenna array mounted on the substrate and having a first aperture, the first aperture having a first width extending in the first direction and a first length extending in the second direction, the first length being larger than the first width; and a second RF antenna array mounted on the substrate and having a second aperture, the second aperture having a second width extending in the first direction and a second length extending in the second direction, the second length being less than the second width.

2. The device of concept 1, further comprising: RF transmit circuitry coupled to the first RF antenna array and configured to cause the first RF antenna array to transmit first RF signals for determining a distance to a target object; RF receive circuitry coupled to the second RF antenna array and configured to receive second RF signals from the second RF antenna array, the second RF signals generated as a result of the first RF signals being reflected by the target object; and processing circuitry, coupled to the RF receive circuitry, configured to determine a distance between the device and a target object.

3. The device of concept 2, wherein the processing circuitry is further coupled to the RF transmit circuitry.

4. The device of any one of concepts 1-3, wherein the first RF antenna array comprises a first plurality of antennas sized to transmit Terahertz RF signals, wherein the Terahertz RF signals have frequency content in a frequency band of 300 GHz-3 THz, and wherein the second RF antenna array comprises a second plurality of antennas sized to receive Terahertz RF signals.

5. The device of concept 3, wherein the Terahertz RF signals have a bandwidth in the range of 10 GHz-60 GHz.

6. The device of any one of concepts 3-4, wherein the first plurality of antennas comprises between 4 and 128 antennas.

7. The device of any one of concepts 3-6, wherein the second plurality of antennas comprises between 32 and 1024 antennas.

8. The device of any one of concepts 3-7, further comprising: a first semiconductor die mounted on the substrate, the first semiconductor die comprising the first RF antenna array, wherein the first plurality of antennas is integrated on the first semiconductor die.

9. The device of concept 8, further comprising: a second semiconductor die mounted on the substrate, the second semiconductor die comprising the second RF antenna array, the second plurality of antennas integrated on the second semiconductor die.

10. The device of concept 1, further comprising: a first semiconductor die mounted on the substrate, the first semiconductor die comprising the first RF antenna array, the first RF antenna array comprising a first plurality of antennas integrated on the first semiconductor die, the first plurality of antennas sized to transmit Terahertz RF signals having frequency content in the 300 GHz-3 THz frequency band; and a second semiconductor die mounted on the substrate, the second semiconductor die comprising the second RF antenna array, the second RF antenna array comprising a second plurality of antennas integrated on the second semiconductor die, the second plurality of antennas sized to receive Terahertz RF signals having frequency content in the 300 GHz-3 THz frequency band.

11. The device of concept 9, wherein the first semiconductor die further comprises: the transmit circuitry and a first redistribution layer coupling the first plurality of antennas to the transmit circuitry.

12. The device of concept 11, wherein the second semiconductor die further comprises: the receive circuitry; and a second redistribution layer coupling the second plurality of antennas to the receive circuitry.

13. The device of any one of concepts 10-12, wherein the first semiconductor die comprises a first semiconductor type and the second semiconductor type comprises a second semiconductor type different from the first semiconductor type.

14. The device of concept 13, wherein the first semiconductor die comprises a III-V semiconductor.

15. The device of concept 14, wherein the first semiconductor die comprises indium phosphide.

16. The device of any one of concepts 13-15, wherein the second semiconductor die comprises silicon.

17. The device of concept 13, wherein the first semiconductor die comprises indium phosphide and the second semiconductor die comprises silicon.

18. The device of any one of concepts 1-17, wherein the length of the first aperture is between 5 mm and 5 cm and the width of the first aperture is between 0.1 mm and 5 mm.

19. The device of any one of concepts 1-18, wherein the length of the second aperture is between 0.1 mm and 5 mm and the width of the second aperture is between 1 cm and 18 cm.

20. The device of any one of concepts 1-19, wherein the first RF antenna array has a quasi-linear arrangement.

21. The device of any one of concepts 1-20, wherein the second RF antenna array has a quasi-linear arrangement.

22. The device of any one of concepts 1-21, wherein the first RF antenna array has a linear arrangement.

23. The device of any one of concepts 1-22, wherein the second RF antenna array has a linear arrangement.

24. The device of any one of concepts 1-23, wherein: the first RF antenna array comprises a first plurality of antennas sized to transmit RF signals having frequency content in a frequency band of 650-690 GHZ, and the first aperture is sized so that the first RF antenna array has an angular field of view in the first direction that is between 50 and 150 in the frequency band of 650-690 GHz.

25. The device of any one of concepts 1-24, wherein: the first RF antenna array comprises a first plurality of antennas sized to transmit RF signals having frequency content in a frequency band of 650-690 GHz, and the first aperture is sized so that the first RF antenna array has an angular field of view in the second direction that is between 200 and 900 in the frequency band of 650-690 GHz.

26. The device of any one of concepts 2-25, further comprising signal generation circuitry configured to generate reference signals and to provide the reference signals to the first RF antenna array and to the RF receive circuitry.

27. The device of concept 26, wherein the signal generation circuitry comprises: a signal generator configured to generate an initial RF signal; and frequency up-conversion circuitry, coupled to the signal generator, configured to generate the reference signal by up-converting the initial RF signal.

28. The device of concept 27, wherein the frequency up-conversion circuitry comprises a plurality of frequency multipliers for up-converting the initial RF signal in stages.

29. The device of concept 27, further comprising: a first semiconductor die mounted on the substrate, wherein the first semiconductor die comprises the first RF antenna array and at least a portion of the frequency up-conversion circuitry, and wherein the signal generator is mounted on the substrate.

30. The device of concept 27, wherein the signal generator is mounted on the substrate and the frequency up-conversion circuitry is mounted on the substrate.

31. The device of any one of concepts 27-30, wherein the initial RF signal has a time-varying center frequency.

32. The device of concept 30, wherein the time-varying center frequency of the initial RF signal changes linearly over time.

33. The device of concept 30, wherein the time-varying center frequency of the initial RF signal changes non-linearly over time.

34. A device, comprising: a substrate; a first semiconductor die, mounted on the substrate, having a radio-frequency (RF) transmit antenna array integrated thereon; a second semiconductor die, mounted on the substrate, having an RF receive antenna array integrated thereon; and signal generation circuitry at least partially mounted on the substrate, the signal generation circuitry coupled to the first semiconductor die and to the second semiconductor die.

35. The device of concept 34, wherein the signal generation circuitry comprises: an oscillator configured to generate a first signal; a signal generator configured to generate a second signal having a time-varying center frequency by frequency modulating the first signal; and frequency-up conversion circuitry configured to generate a third signal by up-converting the second signal.

36. The device of concept 35, wherein the first signal has a center frequency in a range of 1 GHz-20 GHz, and wherein the frequency up-conversion circuitry is configured to up-convert the second signal by a factor between 30 and 80.

37. The device of concept 35, wherein the time-varying center frequency of the second signal changes linearly over time.

38. The device of concept 35, wherein the time-varying center frequency of the second signal changes non-linearly over time.

39. The device of concept 35, wherein the oscillator and the signal generator are mounted on the substrate and a first portion of the frequency-up conversion circuitry is integrated on the first semiconductor die.

40. The device of concept 39, wherein a second portion of the frequency-up conversion circuitry is mounted on the substrate.

41. The device of concept 35, wherein the frequency-up conversion circuitry comprises: a first plurality of frequency multipliers coupled to the RF transmit antenna array, wherein the first plurality of frequency multipliers is configured to up-convert respective input signals by a frequency multiplication factor; and a second plurality of frequency multipliers coupled to the RF receive antenna array, wherein the second plurality of multipliers is configured to up-convert respective input signals by the frequency multiplication factor.

42. The device of concept 41, wherein the first plurality of frequency multipliers is integrated on the first semiconductor die and the second plurality of multipliers is integrated on the second semiconductor die.

43. The device of concept 42, wherein the first and second pluralities of frequency multipliers are mounted on the substrate.

44. The device of concept 35, wherein the signal generation circuitry further comprises a power divider and the frequency up-conversion circuitry comprises a plurality of frequency multipliers, wherein the power divider is configured to provide the second signal to at least some of the plurality of frequency multipliers.

45. The device of concept 44, wherein the frequency multipliers are coupled to respective antennas of the transmit RF antenna array, and wherein the power divider is configured to cause the antennas of the RF transmit antenna array to transmit RF signals in phase with respect to one another.

46. The device of concept 35, wherein the frequency multipliers are coupled to respective antennas of the transmit RF antenna array, and wherein the signal generation circuitry further comprising a plurality of phase shifters configured to cause the antennas of the RF transmit antenna array to transmit RF signals in phase with respect to one another.

47. The device of concept 44, wherein the plurality of frequency multipliers comprises a plurality of harmonic frequency multipliers.

48. The device of any one of concepts 34-44, wherein the RF transmit antenna array comprises a plurality of RF antennas configured to transmit RF signals having frequency content in a frequency band of 300 GHz-3 THz.

49. A device, comprising: a substrate; a first semiconductor die, mounted on the substrate, having a radio-frequency (RF) transmit antenna array integrated thereon, the transmit antenna array comprising a first plurality of RF antennas sized to transmit first RF signals having frequency content in a frequency band of 300 GHz-3 THz; and a second semiconductor die, mounted on the substrate, having an RF receive antenna array integrated thereon, the receive antenna array comprising a second plurality of RF antennas sized to receive second RF signals having frequency content in the frequency band.

50. The device of concept 49, wherein the antennas of the first plurality of RF antennas are sized to transmit the first RF signals having frequency content in a frequency band of 650-690 GHz.

51. The device of any one of concepts 49-50, further comprising signal generation circuitry configured to generate reference signals having a frequency bandwidth of 10 GHz-60 GHz and to provide the signals to the RF transmit antenna array, wherein the RF transmit antenna array is configured to transmit the first RF signals in response to receiving the reference signals from the signal generation circuitry.

52. The device of any one of concepts 49-50, wherein the first RF antenna array has a frequency bandwidth of 10 GHz-60 GHz.

53. The device of any one of concepts 49-52, wherein the first semiconductor die further comprises: RF transmit circuitry coupled to the RF transmit antenna array and configured to cause the RF transmit antenna array to transmit the first RF signals; and a redistribution layer coupling the first plurality of RF antennas to the transmit circuitry.

54. The device of any one of concepts 49-53, further comprising processing circuitry coupled to the RF receive antenna array and configured to determine a distance between the device and a target object using the second RF signals.

55. The device of concept 54, wherein the processing circuitry is further coupled to the RF transmit antenna array.

56. The device of any one of concepts 49-55, wherein the substrate defines a plane extending in first and second directions substantially orthogonal to one another, and wherein the RF transmit antenna array is configured to transmit the first RF signals in a third direction outside the plane.

57. The device of any one of concepts 49-56, wherein the third direction is substantially perpendicular to the plane.

58. The device of any one of concepts 49-57, wherein the second plurality of RF antennas is arranged to generate differential signals in response to receiving the second RF signals.

59. The device of any one of concepts 49-58, wherein the second semiconductor die further comprises: a plurality of analog-to-digital converters (ADCs) coupled to the second plurality of RF antennas, the plurality of ADCs being configured to digitize third RF signals generated by the second plurality of RF antennas in response to receiving the second RF signals.

60. The device of any one of concepts 51-59, wherein the second semiconductor die further comprises a plurality of sub-harmonic mixers coupled to the second plurality of RF antennas and the plurality of ADCs, the sub-harmonic mixers being configured to generate output signals by mixing the second RF signals with the reference signals generated by the signal generation circuitry and to provide the outputs signals to the plurality of ADCs.

61. The device of concept 60, wherein the plurality of sub-harmonic mixers comprises a plurality of third-harmonic mixers configured to mix the second RF signals with third-harmonics of the plurality of reference signals.

62. The device of concept 60, wherein the plurality of sub-harmonic mixers comprises differential inputs coupled to respective RF antennas of the second plurality of antennas.

63. The device of concept 62, wherein the plurality of sub-harmonic mixers further comprises single-ended inputs configured to receive the reference signals generated by the signal generation circuitry.

64. The device of concept 60, wherein the second semiconductor die further comprises a plurality of down-conversion mixers positioned between the plurality of sub-harmonic mixers and the plurality of ADCs, wherein the down-conversion mixers are configured to mix the output signals with the reference signals generated by the signal generation circuitry.

65. A device, comprising: a substrate; a first semiconductor die of a first semiconductor type, mounted on the substrate, having a radio-frequency (RF) transmit antenna array thereon; and a second semiconductor die of a second semiconductor type, mounted on the substrate, having an RF receive antenna array thereon, wherein the second semiconductor type is different from the first semiconductor type.

66. The device of concept 65, wherein the second semiconductor type is a silicon-based semiconductor type, and the first semiconductor type is not a silicon-based semiconductor type.

67. The device of concept 66, wherein the first semiconductor type is a III-V semiconductor type.

68. The device of any one of concepts 66-67, wherein the first semiconductor type is an indium phosphide (InP) semiconductor type.

69. The device of any one of concepts 65-68, wherein the second type is CMOS-compatible.

70. The device of any one of concepts 65-69, wherein the second semiconductor type is a silicon/germanium-based semiconductor type.

71. The device of any one of concepts 65-70, wherein the first semiconductor type has an electron mobility between 3000 $cm^2V^{-1}s^{-1}$ and 5500 $cm^2V^{-1}s^{-1}$ at 300 K.

72. The device of any one of concepts 65-71, wherein the first semiconductor type has a current gain cutoff frequency ($f_t$) between 0.3 THz and 1 THz.

73. The device of any one of concepts 65-72, wherein the first semiconductor type has a maximum oscillation frequency ($f_{max}$) between 0.7 THz and 1.5 THz.

74. The device of any one of concepts 65-73, wherein the first semiconductor type has a breakdown electric field ($E_{bd}$) between 4×105 $Vcm^{-1}$ and $6\times10^5$ $Vcm^{-1}$.

75. The device of any one of concepts 65-74, further comprising processing circuitry coupled to the RF transmit antenna array and to the RF receive antenna array and configured to determine a distance between the device and a target object.

76. The device of any one of concepts 65-75, wherein the RF transmit antenna array comprises a plurality of RF antennas, and wherein the device further comprises signal generation circuitry configured to generate a first signal and a power divider configured to provide the first signal to the first plurality of RF antennas.

77. The device of concept 76, wherein the power divider is configured to provide the first signal with a same phase to the first plurality of RF antennas.

78. The device of any one of concepts 65-75, wherein the RF transmit antenna array comprises a plurality of antennas, and wherein the device further comprises signal generation circuitry configured to generate a first signal and a plurality of phase shifters configured to provide the first signal with a same phase to the first plurality of RF antennas.

79. The device of any one of concepts 65-78, wherein the RF transmit antenna array is sized to transmit an RF signal in a frequency band of 300 GHz-3 THz.

80. The device of concept 79, wherein the RF transmit antenna array is configured to transmit the RF signal with a power level in a range of 10 dBm-30 dBm in the frequency band.

81. A device, comprising: a substrate; a first semiconductor die, mounted on the substrate, having a radio-frequency (RF) transmit antenna array integrated thereon; a second semiconductor die, mounted on the substrate, having an RF receive antenna array integrated thereon; and a focusing element mounted on the substrate and configured to focus RF signals towards the RF receive antenna array.

82. The device of concept 81, wherein the focusing element is transparent in a frequency band of 300 GHz-3 THz.

83. The device of any one of concepts 81-82, wherein the focusing element is configured to focus, towards the RF receive antenna array, RF signals having frequency content in a frequency band of 300 GHz-3 THz.

84. The device of any one of concepts 81-83, wherein the focusing element at least partially covers the RF receive antenna array and at least partially covers the RF transmit antenna array.

85. The device of any one of concepts 81-84, wherein the focusing element is a first focusing element at least partially covering the RF receive antenna array, and wherein the device further comprises a second focusing element at least partially covering the RF transmit antenna array.

86. The device of any one of concepts 81-85, wherein the focusing element comprises a cylindrical lens having a primary axis extending parallel a first axis.

87. The device of concept 86, wherein the RF receive antenna array has an aperture having a width extending parallel the first axis and a length extending parallel a second axis substantially orthogonal to the first axis, the width being larger than the length.

88. The device of any one of concepts 81-87, wherein the focusing element is formed silicon.

89. The device of any one of concepts 81-85, wherein the focusing element comprises a spherical or elliptical lens.

90. A device comprising: a substrate, a radio-frequency (RF) transmit antenna array, mounted on the substrate, and configured to transmit a first RF signal having a power level between 10 dBm and 30 dBm, the first RF signal having frequency content in a frequency band of 300 GHz-3 THz; an RF receive antenna array, mounted on the substrate, and configured to receive a second RF signal resulting from reflection of the first RF signal from a target object; and processing circuitry coupled to the RF transmit antenna array and to the RF receive antenna array, the processing circuitry being configured to determine the distance of the target object relative to the device using the second RF signal, wherein the processing circuitry has a noise figure (NF) between 10 dB and 40 dB.

91. The device of concept 90, wherein the processing circuitry is configured to determine distances between 1 m and 200 m at a humidity of 60%.

92. The device of concept 90, wherein the RF transmit array has a frequency bandwidth of 15 GHz-25 GHz and a range resolution between 6 mm and 10 mm.

93. The device of any one of concepts 90-92, wherein the RF transmit antenna array has an aperture between 1 $cm^2$ and 5 $cm^2$ and an angular resolution between 0.4° and 1° in the frequency band.

94. The device of any one of concepts 90-93, wherein the substrate has an area between 10 $cm^2$ and 60 $cm^2$.

95. The device of any one of concepts 90-94, wherein the processing circuitry is configured to update the determination of the distance at a refresh rate between 0.1 Hz and 100 Hz.

96. The device of any one of concepts 90-95, further comprising: a first semiconductor die mounted on the substrate, the first semiconductor die comprising the RF transmit antenna array, the RF transmit antenna array comprising a first plurality of antennas integrated on the first semiconductor die.

97. The device of any one of concepts 90-96, further comprising: a second semiconductor die mounted on the substrate, the second semiconductor die comprising the RF receive antenna array, the RF receive antenna array comprising a second plurality of antennas integrated on the second semiconductor die.

98. The device of any one of concepts 90-97, further comprising: a first semiconductor die mounted on the substrate, the first semiconductor die comprising the RF transmit antenna array, the RF transmit antenna array comprising a first plurality of antennas integrated on the first semiconductor die; and a second semiconductor die mounted on the substrate, the second semiconductor die comprising the RF receive antenna array, the RF receive antenna array comprising a second plurality of antennas integrated on the second semiconductor die.

99. The device of concept 98, wherein the first semiconductor die comprises indium phosphide and the second semiconductor die comprises silicon.

100. The device of any one of concepts 90-99, wherein the RF transmit antenna array comprises a first linear antenna array.

101. The device of concept 100, wherein the first linear antenna array comprises between 4 and 128 antennas.

102. The device of any one of concepts 90-101, wherein the RF receive antenna array comprises a second linear antenna array.

103. The device of concept 102, wherein the second linear antenna array comprises between 32 and 1024 antennas.

104. The device of any one of concepts 90-103, wherein the RF transmit antenna array comprises a plurality of transmit antennas, each transmit antenna being configured to transmit electromagnetic energy having a power level between 1 dBm and 2 dBm in the frequency band.

105. The device of any one of concepts 90-104, further comprising a focusing element mounted on the substrate and configured to focus a portion of the second RF signal to the RF receive antenna array.

106. The device of any one of concepts 90-105, wherein the first RF signal comprises a pulse having a duration that is between 0.1 ms and 10 ms.

107. The device of any one of concepts 90-106, wherein the RF transmit antenna array has a gain between 3 and 20 dB.

108. A method of imaging a target object using a device comprising a radio-frequency (RF) transmit antenna array and an RF receive antenna array, the RF transmit antenna array having a first plurality of transmit antennas and a second plurality of transmits antennas, the method comprising: transmitting, using the first plurality of antennas, a first RF signal having frequency content in a frequency band of 300 GHz-3 THz; transmitting, using the second plurality of antennas, a second RF signal having frequency content in the frequency band; generating a first image at least in part by receiving, using the RF receive antenna array, a third RF signal produced by reflection of the first RF signal from the target object; generating a second image at least in part by receiving, using the receive antenna array, a fourth RF signal produced by reflection of the second RF signal from the target object; and determining a state of the target object using the first and second images.

109. The method of concept 108, wherein the first RF signal has frequency content in a frequency band of 650 GHz-690 GHz.

110. The method of any one of concepts 108-109, wherein transmitting the second RF signal is performed subsequent to transmitting the first RF signal.

111. The method of any one of concepts 108-110, wherein: generating the first image comprises determining a phase of the third RF signal; generating the second image comprises determining a phase of the fourth RF signal; and determining the state of the target object comprises determining a difference between the phase of the third RF signal and the phase of the fourth RF signal.

112. The method of any one of concepts 108-111, wherein the transmit antenna array is oriented in a first direction and the receive antenna array in oriented in a second direction perpendicular to the first direction.

113. The method of any one of concepts 108-112, wherein determining a state of the target object comprises determining a position of the target object relative to the device.

114. A method of imaging a target object using a device, the method comprising: transmitting a first plurality of radio-frequency (RF) pulses; receiving a second plurality of RF pulses generated by reflection of the first plurality of pulses from the target object; and generating a plurality of images by integrating data obtained from the second plurality of RF pulses, wherein integrating the data comprises integrating the data in different range bins using different integration rates, the integration rate for a range bin, of the different range bins, being set based on a range associated with the range bin.

115. The method of concept 114, further comprising setting a first rate corresponding to a first range bin and a second rate corresponding to a second range bin, wherein the first range bin represents at least a first range and the second range bin represents at least a second range smaller than the first range, and wherein the first rate is less than the second rate, and wherein the method further comprises integrating the data in the first range bin using the first rate and integrating the data in the second range bin using the second rate.

116. The method of any one of concepts 114-115, wherein integrating the data in different range bins comprises coherently integrating the data in different range bins.

117. The method of any one of concepts 114-116, wherein at least one pulse of the first plurality of pulses has a bandwidth of 10 GHZ-60 GHZ.

118. The method of any one of concepts 114-117, wherein at least one pulse of the first plurality of pulses has a duration of 0.1 ms-10 ms.

119. A method of imaging a target object using a device, the method comprising: transmitting a first radio-frequency (RF) signal having a frequency band having a frequency content in a frequency band of 300 GHZ-3 THz, the frequency band having at least first and second sub-bands; receiving a second RF signal produced by reflection of the first RF signal from the target object; and generating a multi-channel image having a first channel and a second channel, wherein data in the first channel is determined using frequency content of the first RF signal in the first sub-band, wherein data in the second channel is determined using frequency content of the second RF waveform in the second sub-band.

120. The method of concept 119, wherein the frequency band has a bandwidth of 10 GHz-60 GHZ.

121. The method of any one of concepts 119-120, wherein the first frequency sub-band has a bandwidth of 2 GHz-20 GHz.

122. The method of any one of concepts 119-121, further comprising determining a state of the target object using the multi-channel image.

123. The method of any one of concepts 119-122, further comprising: assigning a first color to the data in the first channel; and assigning a second color to the data in the second channel, wherein generating the multi-channel image comprises combining the data in the first channel having the first color assigned thereto with the data in the second channel having the second color assigned thereto.

124. A method for determining a distance between a device and a target object, the device comprising radio-frequency (RF) transmit circuitry coupled to a first RF antenna array and RF receive circuitry coupled to a second RF antenna array, the device defining a plane extending in first and second directions substantially orthogonal to one another, the method comprising: controlling the RF transmit circuitry to cause the first RF antenna array to transmit first RF signals in a direction outside the plane of the device, wherein the first RF antenna array has a first aperture having a first width extending in the first direction and a first length extending in the second direction, the first length being larger than the first width; receiving second RF signals using the second RF antenna array, the second RF signals generated as a result of the first RF signals being reflected by the target object, wherein the second RF antenna array has a second aperture having a second width extending in the first direction and a second length extending in the second direction, the second length being less than the second width; and controlling processing circuitry coupled to the RF receive circuitry to determine the distance between the device and the target object.

125. The method of concept 124, wherein the RF signals have frequency content in a frequency band of 300 GHz-3 THz.

126. The method of concept 124, wherein controlling the RF transmit circuitry to cause the first RF antenna array to transmit the first RF signals comprises generating a reference signal, and wherein receiving the second RF signals using the second RF antenna array comprises providing the reference signal to the second RF antenna array.

127. A method for fabricating a device, comprising: obtaining a first semiconductor die of a first semiconductor type and patterned with a radio-frequency (RF) transmit antenna array; obtaining a second semiconductor die of a second semiconductor type and patterned with an RF receive antenna array, the second semiconductor type being different from the first semiconductor type; and fabricating the device at least in part placing the first semiconductor die and the second semiconductor die on a substrate.

128. The method of concept 127, wherein the second semiconductor type is a silicon-based semiconductor type, and the first semiconductor type is a III-V semiconductor type.

129. The method of concept 127, further comprising attaching a focusing element to the substrate so that the focusing element covers at least a portion of the RF receive antenna array.

130. The method of concept 127, further comprising: prior to placing the first semiconductor die on the substrate, patterning the substrate with an RF power divider having an input and a plurality of outputs; and subsequent to placing the first semiconductor die on the substrate, coupling the outputs of the RF power divider to respective antennas of the RF transmit antenna via wire bonds.

131. A device comprising: a substrate; an indium phosphide (InP)-based die, mounted on the substrate, having a radio-frequency (RF) transmit antenna array integrated thereon, wherein the RF transmit antenna array is sized to transmit an RF signal in a frequency band of 300 GHz-3 THz; a silicon-based die, mounted on the substrate, having an RF receive antenna array integrated thereon; and processing circuitry coupled to the RF transmit antenna array and to the RF receive antenna array and configured to determine a distance between the device and a target object.

132. The device of concept 131, further comprising transmit circuitry coupled to the RF transmit antenna array and configured to cause the RF transmit antenna array to transmit the RF signal with a power level in a range of 10 dBm-30 dBm in the frequency band.

133. The device of concept 131, wherein the RF transmit antenna array is sized to transmit the RF signal in a frequency band of 650 GHz-690 GHz.

134. The device of concept 131, further comprising: signal generation circuitry coupled to the transmit antenna array, the signal generation circuitry comprising frequency up-conversion circuitry configured to receive an input signal having a first frequency and to produce an output signal having a second frequency that is a multiple of the first frequency; and receive circuitry coupled to the receive antenna array and to the signal generation circuitry.

135. The device of concept 134, wherein the frequency up-conversion circuitry comprises one or more diodes 136. The device of concept 134, wherein the receive circuitry comprises a harmonic mixer comprising a silicon-germanium (SiGe) heterojunction bipolar transistor (HBT).

137. The device of concept 131, wherein the RF transmit antenna array comprises between 4 and 128 antennas and the receive antenna array comprises between 32 and 1024 antennas.

138. A device for imaging a target object, comprising: a radio-frequency (RF) transmit antenna configured to transmit a first RF signal having frequency content in a frequency band of 300 GHz-3 THz, the frequency band having at least first and second frequency sub-bands; an RF receive antenna configured to receive a second RF signal produced by reflection of the first RF signal from the target object; and processing circuitry configured to generate a multi-channel image having a first channel and a second channel, wherein the processing circuitry is configured to determine data in the first channel using frequency content of the second RF signal in the first sub-band, and to determine data in the second channel using frequency content of the second RF signal in the second sub-band.

139. The device of concept 138, wherein the frequency band has a bandwidth of 10 GHz-60 GHz.

140. The device of concept 138, wherein the frequency content is in a frequency band of 650 GHz-690 GHz.

141. The device of concept 138, wherein the processing circuitry is further configured to determine a position of the target object relative to the device using the multi-channel image.

142. The device of concept 138, wherein the processing circuitry is further configured to: assign a first color to the data in the first channel, and assign a second color to the data in the second channel, wherein generating the multi-channel image comprises combining the data in the first channel having the first color assigned thereto with the data in the second channel having the second color assigned thereto.

143. The device of concept 138, further comprising: a signal generator configured to generate an RF reference signal; and frequency up-conversion circuitry configured to frequency up-convert the RF reference signal, wherein the processing circuitry is configured to generate the multi-channel image by mixing the second RF signal with the frequency up-converted RF reference signal.

144. The device of concept 143, wherein the frequency up-conversion circuitry is configured to frequency up-convert the RF reference signal by a factor between 30 and 80.

145. The device of concept 143, wherein the signal generator is configured to generate the RF reference signal to be chirped.

146. The device of concept 138, wherein the frequency band further comprises a third frequency sub-band, wherein the multi-channel image further comprises a third channel, and wherein the processing circuitry is further configured to determine data in the third channel using frequency content of the second RF signal in the third sub-band.

Having thus described several aspects of at least one embodiment of this technology, it is to be appreciated that various alterations, modifications, and improvements will readily occur to those skilled in the art.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Unless otherwise specified, the terms "approximately," "substantially" and "about" may be used to mean within ±10% of a target value in some embodiments. The terms "approximately," "substantially" and "about" may include the target value.

What is claimed is:

1. A device, comprising:

a substrate;

a first semiconductor die, mounted on the substrate, having a radio-frequency (RF) transmit antenna array integrated thereon;

a second semiconductor die, mounted on the substrate, having an RF receive antenna array integrated thereon; and signal generation circuitry comprising at least one component mounted on the substrate, the signal generation circuitry coupled to the first semiconductor die and to the second semiconductor die, wherein the RF transmit antenna array comprises a plurality of RF antennas configured to transmit RF signals having frequency content in a frequency band of 300 GHZ-3 THz.

2. The device of claim 1, wherein the signal generation circuitry comprises:

an oscillator configured to generate a first signal;

a signal generator configured to generate a second signal having a time-varying center frequency by frequency modulating the first signal; and frequency up-conversion circuitry configured to generate a third signal by up-converting the second signal.

3. The device of claim 2, wherein the first signal has a center frequency of 1 GHz-20 GHz, and wherein the frequency up-conversion circuitry is configured to up-convert the second signal by a factor between 30 and 80.

4. The device of claim 2, wherein the time-varying center frequency of the second signal changes linearly over time.

5. The device of claim 2, wherein the time-varying center frequency of the second signal changes non-linearly over time.

6. A device, comprising:

a substrate;

a first semiconductor die, mounted on the substrate, having a radio-frequency (RF) transmit antenna array integrated thereon;

a second semiconductor die, mounted on the substrate, having an RF receive antenna array integrated thereon; and signal generation circuitry comprising at least one component mounted on the substrate, the signal generation circuitry coupled to the first semiconductor die and to the second semiconductor die, wherein the signal generation circuitry comprises:

an oscillator configured to generate a first signal;

a signal generator configured to generate a second signal having a time-varying center frequency by frequency modulating the first signal; and frequency up-conversion circuitry configured to generate a third signal by up-converting the second signal, and wherein the oscillator and the signal generator are mounted on the substrate and a first portion of the frequency up-conversion circuitry is integrated on the first semiconductor die.

7. The device of claim 6, wherein a second portion of the frequency up-conversion circuitry is mounted on the substrate.

8. A device, comprising:

a substrate;

a first semiconductor die, mounted on the substrate, having a radio-frequency (RF) transmit antenna array integrated thereon;

a second semiconductor die, mounted on the substrate, having an RF receive antenna array integrated thereon; and signal generation circuitry comprising at least one component mounted on the substrate, the signal generation circuitry coupled to the first semiconductor die and to the second semiconductor die, wherein the signal generation circuitry comprises:

an oscillator configured to generate a first signal;

a signal generator configured to generate a second signal having a time-varying center frequency by frequency modulating the first signal; and frequency up-conversion circuitry configured to generate a third signal by up-converting the second signal, and wherein the frequency up-conversion circuitry comprises:

a first plurality of frequency multipliers coupled to the RF transmit antenna array, wherein the first plurality of frequency multipliers is configured to up-convert respective input signals by a frequency multiplication factor; and a second plurality of frequency multipliers coupled to the RF receive antenna array, wherein the second plurality of frequency multipliers is configured to up-convert respective input signals by the frequency multiplication factor.

9. The device of claim 8, wherein the first plurality of frequency multipliers is integrated on the first semiconductor die and the second plurality of frequency multipliers is integrated on the second semiconductor die.

10. The device of claim 9, wherein the first and second pluralities of frequency multipliers are mounted on the substrate.

11. A device, comprising:

a substrate;

a first semiconductor die, mounted on the substrate, having a radio-frequency (RF) transmit antenna array integrated thereon;

a second semiconductor die, mounted on the substrate, having an RF receive antenna array integrated thereon; and signal generation circuitry comprising at least one component mounted on the substrate, the signal generation circuitry coupled to the first semiconductor die and to the second semiconductor die, wherein the signal generation circuitry comprises:

an oscillator configured to generate a first signal;

a signal generator configured to generate a second signal having a time-varying center frequency by frequency modulating the first signal; and frequency up-conversion circuitry configured to generate a third signal by up-converting the second signal, and wherein the signal generation circuitry further comprises a power divider and the frequency up-conversion circuitry comprises a plurality of frequency multipliers, wherein the power divider is configured to provide the second signal to at least some of the plurality of frequency multipliers.

12. The device of claim 11, wherein the plurality of frequency multipliers is coupled to respective antennas of the transmit RF antenna array, and wherein the power divider is configured to cause the antennas of the RF transmit antenna array to transmit RF signals in phase with respect to one another.

13. The device of claim 11, wherein the plurality of frequency multipliers is coupled to respective antennas of the transmit RF antenna array, and wherein the signal generation circuitry further comprising a plurality of phase shifters configured to cause the antennas of the RF transmit antenna array to transmit RF signals in phase with respect to one another.

14. The device of claim 11, wherein the plurality of frequency multipliers comprises a plurality of harmonic frequency multipliers.

15. The device of claim 6, wherein the RF transmit antenna array comprises a plurality of RF antennas configured to transmit RF signals having frequency content in a frequency band of 300 GHz-3 THz.

16. The device of claim 8, wherein the RF transmit antenna array comprises a plurality of RF antennas configured to transmit RF signals having frequency content in a frequency band of 300 GHz-3 THz.

17. The device of claim 11, wherein the RF transmit antenna array comprises a plurality of RF antennas configured to transmit RF signals having frequency content in a frequency band of 300 GHz-3 THz.

18. The device of claim 6, wherein a second portion of the frequency up-conversion circuitry is mounted on the second semiconductor die.

19. The device of claim 6, wherein the first signal has a center frequency of 1 GHz-20 GHz.

20. The device of claim 8, wherein the first plurality of frequency multipliers and the second plurality of frequency multipliers comprise harmonic frequency multipliers.

* * * * *